(12) United States Patent
Motohashi et al.

(10) Patent No.: US 10,185,903 B2
(45) Date of Patent: Jan. 22, 2019

(54) IMAGE FORMING OUTPUT CONTROL DEVICE AND NON-TRANSITORY RECORDING MEDIUM STORING PROGRAM

(71) Applicants: Hiroomi Motohashi, Chiba (JP); Satoru Tanaka, Tokyo (JP)

(72) Inventors: Hiroomi Motohashi, Chiba (JP); Satoru Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/726,339

(22) Filed: Oct. 5, 2017

(65) Prior Publication Data

US 2018/0101755 A1   Apr. 12, 2018

(30) Foreign Application Priority Data

Oct. 6, 2016  (JP) .................................. 2016-198401
Nov. 14, 2016 (JP) .................................. 2016-221611
Dec. 13, 2016 (JP) .................................. 2016-241208

(51) Int. Cl.
*G06K 15/02* (2006.01)

(52) U.S. Cl.
CPC ..... *G06K 15/1836* (2013.01); *G06K 15/1807* (2013.01); *G06K 15/1823* (2013.01); *G06K 15/1846* (2013.01); *G06K 2215/0042* (2013.01)

(58) Field of Classification Search
CPC ........... G06K 9/00771; G06K 15/1807; G06K 15/1836; G06K 15/1846;

(Continued)

(56) References Cited

U.S. PATENT DOCUMENTS

| 4,682,158 A | 7/1987 | Ito et al. |
| 5,227,847 A * | 7/1993 | Motohashi ............. G03G 21/12 399/27 |

(Continued)

FOREIGN PATENT DOCUMENTS

| JP | 61-016309 | 1/1986 |
| JP | 2002-016749 | 1/2002 |

(Continued)

*Primary Examiner* — Negussie Worku
(74) *Attorney, Agent, or Firm* — Duft & Bornsen, PC

(57) ABSTRACT

An image forming output control device includes a duplicate image information detector to receive instruction information from a processing execution control apparatus, compare image information included in a plurality of objects being unit images constituting the instruction information, and detect a plurality of duplicate image information objects, in which the image information is duplicate with each other, in the objects in which identification information for identifying the objects is different from each other; a drawing information generation controller to control a drawing information generator to generate drawing information according to the instruction information; and a drawing result storage unit to store drawing result information being a drawing result of the image information. The drawing information generation controller controls the drawing information generator to generate the drawing information with the drawing result information of the image information included in the duplicate image information objects detected with the duplicate image information detector.

9 Claims, 50 Drawing Sheets

(58) Field of Classification Search
CPC ....... G06K 2215/0042; H04N 1/00132; H04N 1/00137; H04N 1/00148; H04N 1/32122; H04N 2201/3204; H04N 2201/3205; H04N 2201/3207; H04N 2201/3214; H04N 2201/3215; H04N 2201/3216
USPC ....... 348/125; 358/1.16, 1.18; 382/106, 144, 382/165, 190, 199, 224, 250, 305
See application file for complete search history.

(56) References Cited

U.S. PATENT DOCUMENTS

| | | | | |
|---|---|---|---|---|
| 7,180,628 | B1* | 2/2007 | Motohashi | H04N 1/00127 358/1.9 |
| 2001/0007466 | A1 | 7/2001 | Nishimura | B41J 2/36 347/193 |
| 2001/0026187 | A1* | 10/2001 | Oku | G06K 19/0701 327/536 |
| 2006/0051105 | A1* | 3/2006 | Motohashi | G03G 15/5075 399/8 |
| 2007/0019064 | A1* | 1/2007 | Yamada | B41J 3/4071 347/224 |
| 2007/0150968 | A1* | 6/2007 | Chiba | H04N 1/00846 726/31 |
| 2008/0151288 | A1* | 6/2008 | Matsunoshita | G06F 21/608 358/1.15 |
| 2008/0288509 | A1* | 11/2008 | Mysen | G06F 17/30864 |
| 2010/0197349 | A1* | 8/2010 | Morita | G06K 7/10237 455/558 |
| 2011/0234740 | A1* | 9/2011 | Ohno | B41J 2/45 347/224 |
| 2014/0181057 | A1* | 6/2014 | Euresti | G06F 17/3015 707/698 |
| 2015/0109638 | A1* | 4/2015 | Sasaki | G06F 3/1205 358/1.15 |
| 2016/0202820 | A1* | 7/2016 | Ito | G02F 1/13306 345/173 |
| 2017/0180569 | A1* | 6/2017 | Suzuki | G06F 3/1208 |
| 2017/0255421 | A1* | 9/2017 | Aoki | G06F 3/1205 |
| 2017/0339290 | A1* | 11/2017 | Kim | H04N 1/00037 |

FOREIGN PATENT DOCUMENTS

| | | |
|---|---|---|
| JP | 2010-272117 | 12/2010 |
| JP | 2013-205886 | 10/2013 |

* cited by examiner

FIG. 9

| RECORD NO | OBJECT ID | HEIGHT | WIDTH | LENGTH | BITS PER COMPONENT | COLOR SPACE | FILTER | STREAM HASH | SAME OBJ LIST |
|---|---|---|---|---|---|---|---|---|---|
| 1 | 305 | 1305 | 727 | 163106 | 8 | "DeviceCMYK" | "DCTDecode" | 16BYTE BINARY DATA | [307, 309] |
| 2 | 451 | 1015 | 1000 | 194655 | 8 | "DeviceCMYK" | "DCTDecode" | 16BYTE BINARY DATA | [] |
| 3 | | | | | | | | | |

FIG. 10

| RECORD NO | OBJECT ID | FORM TYPE | B BOX | MATRIX | RESOURCES HASH | STREAM HASH | SAME OBJ LIST |
|---|---|---|---|---|---|---|---|
| 1 | 287 | 1 | [0 0 648 432] | [1 0 0 1 0 0] | 16BYTE BINARY DATA | 16BYTE BINARY DATA | [293] |
| 2 | | | | | | | |

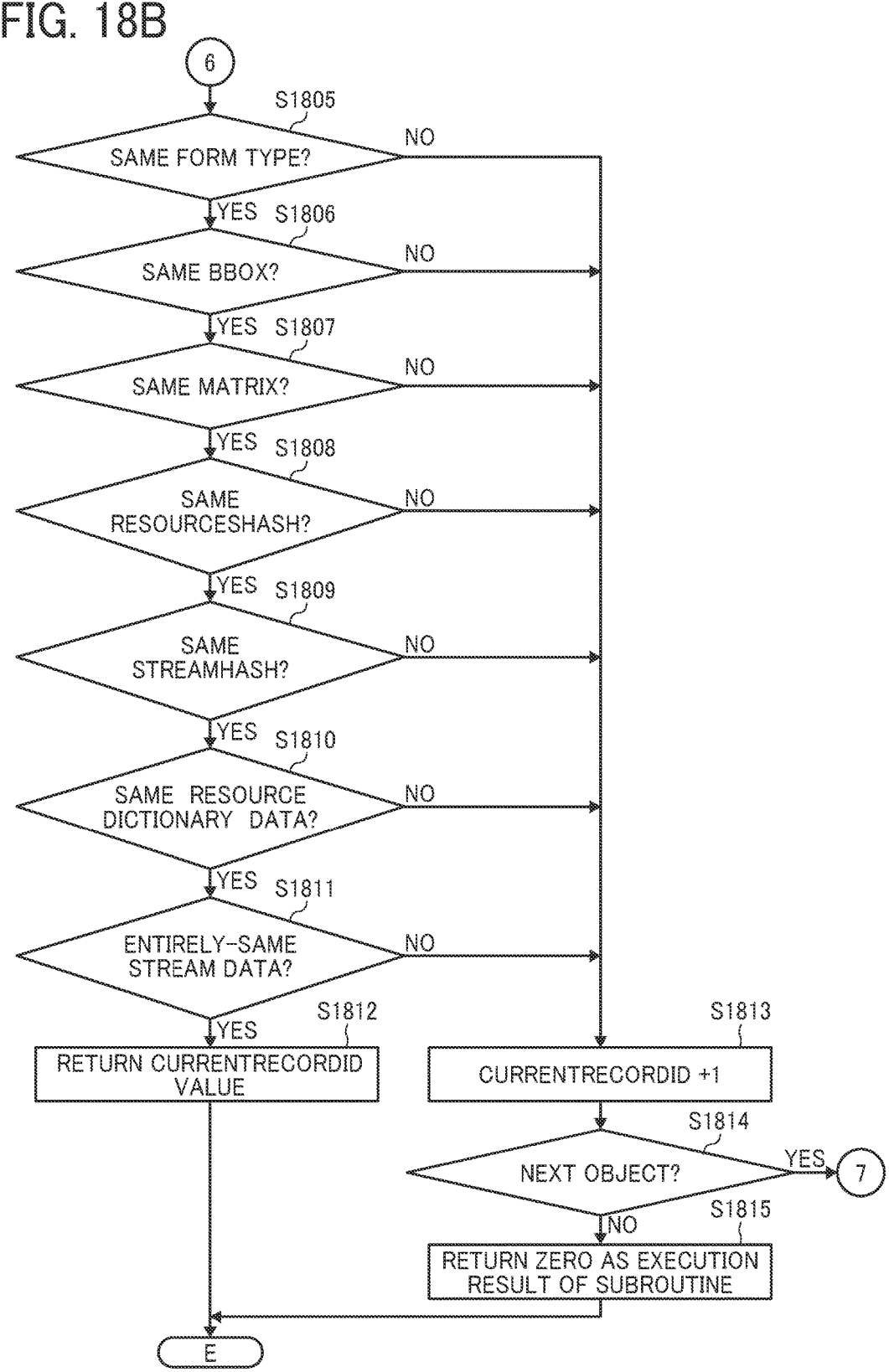

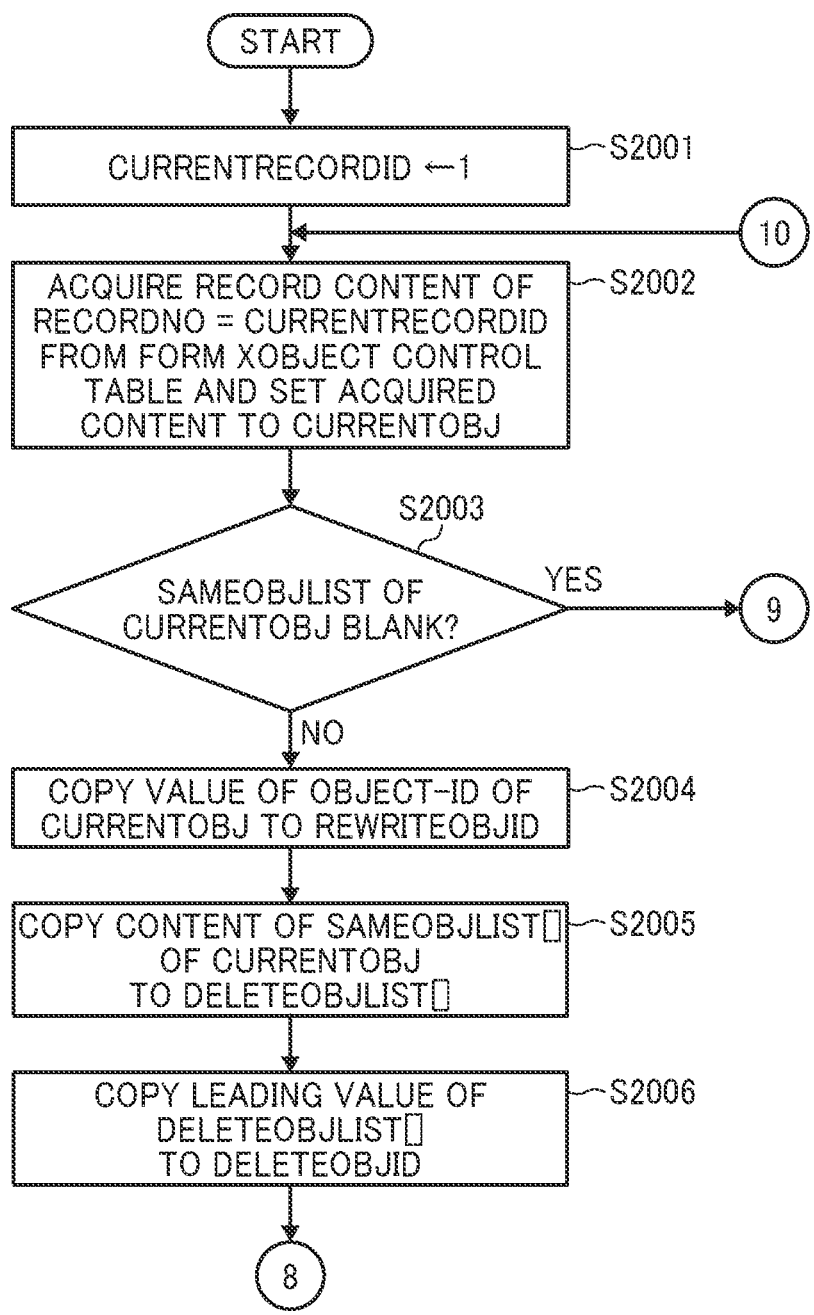

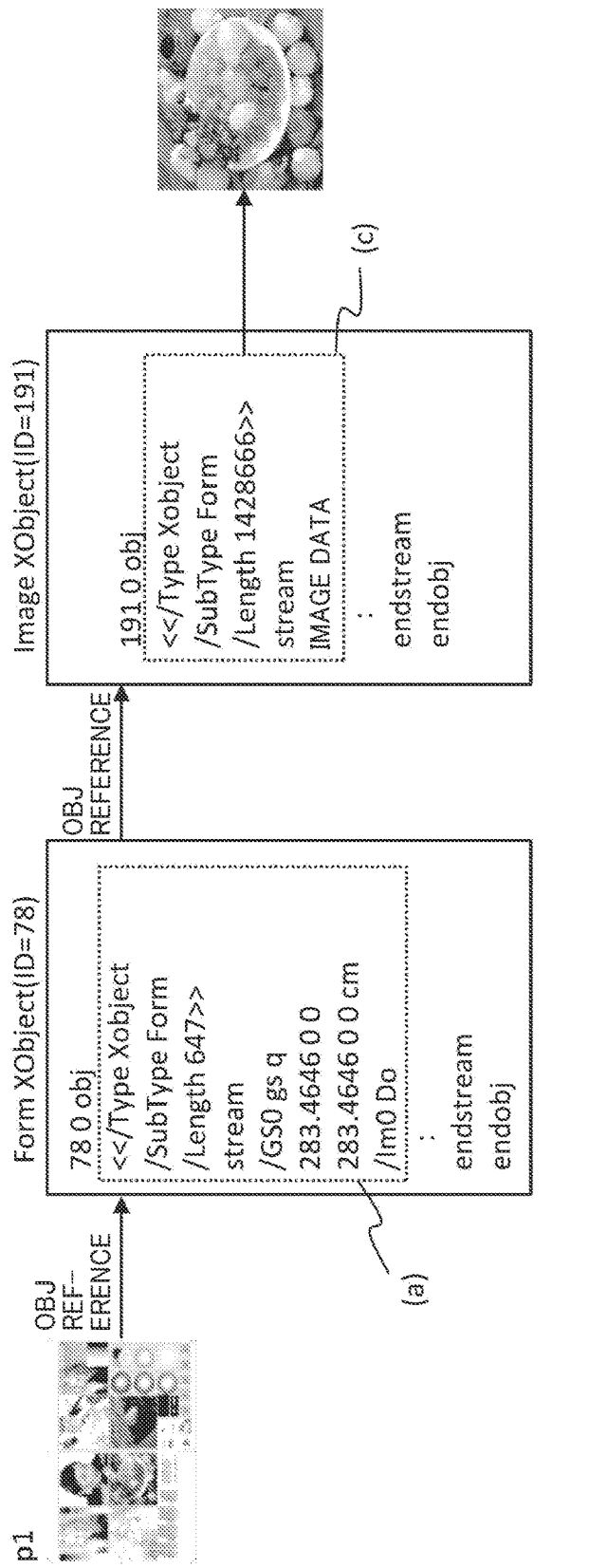

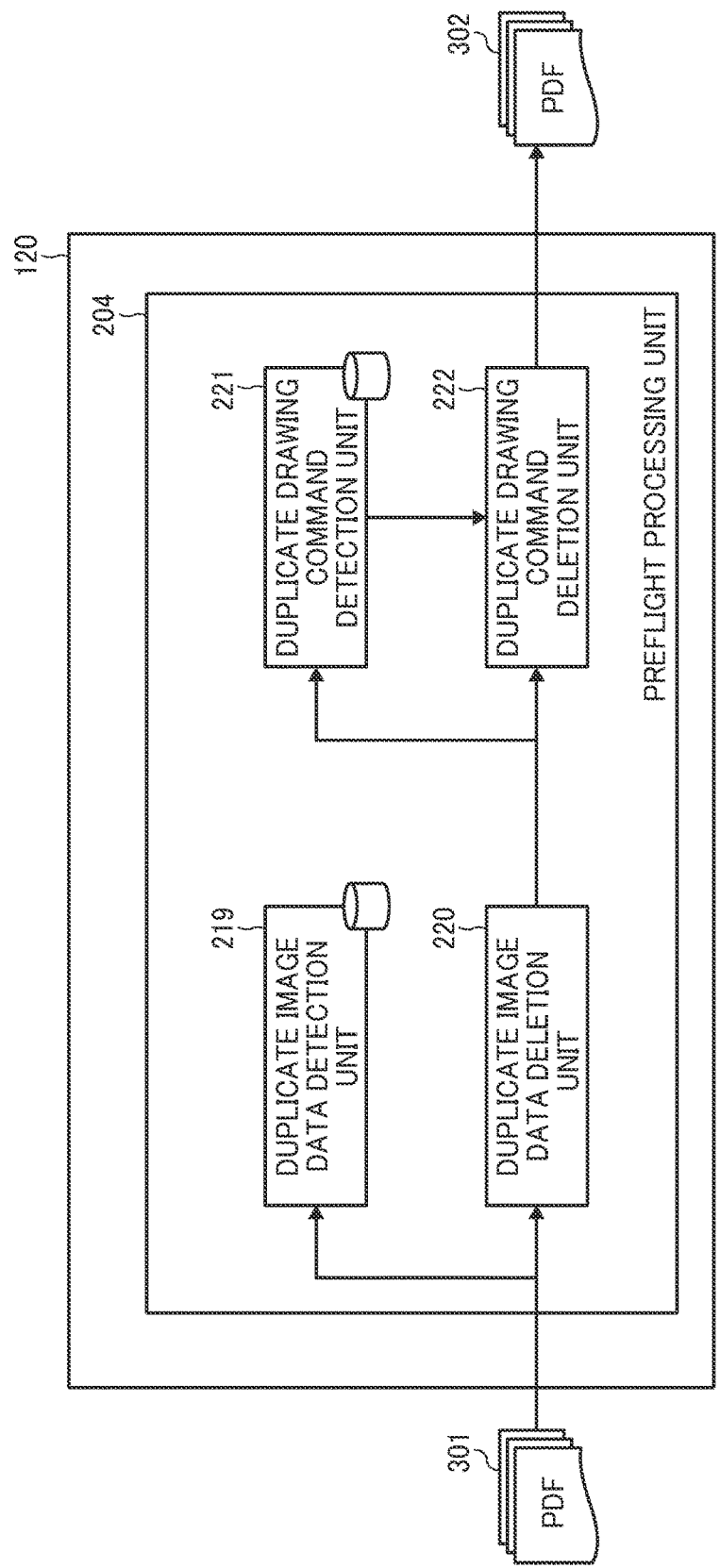

FIRST PAGE

SECOND PAGE

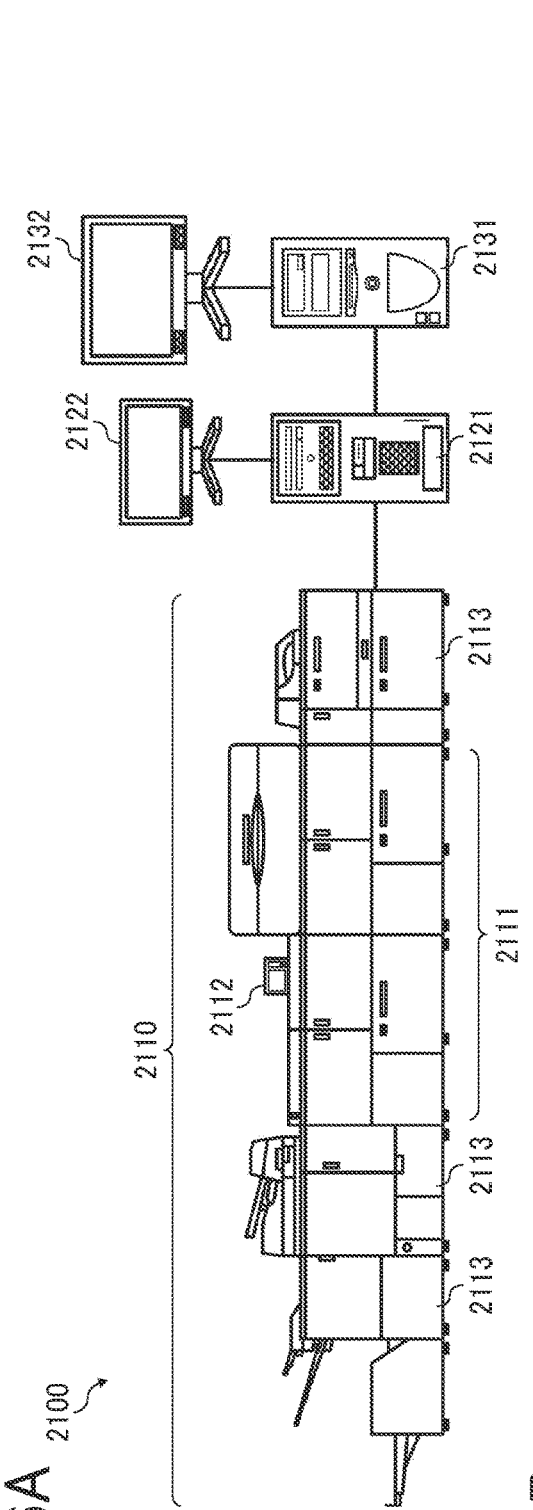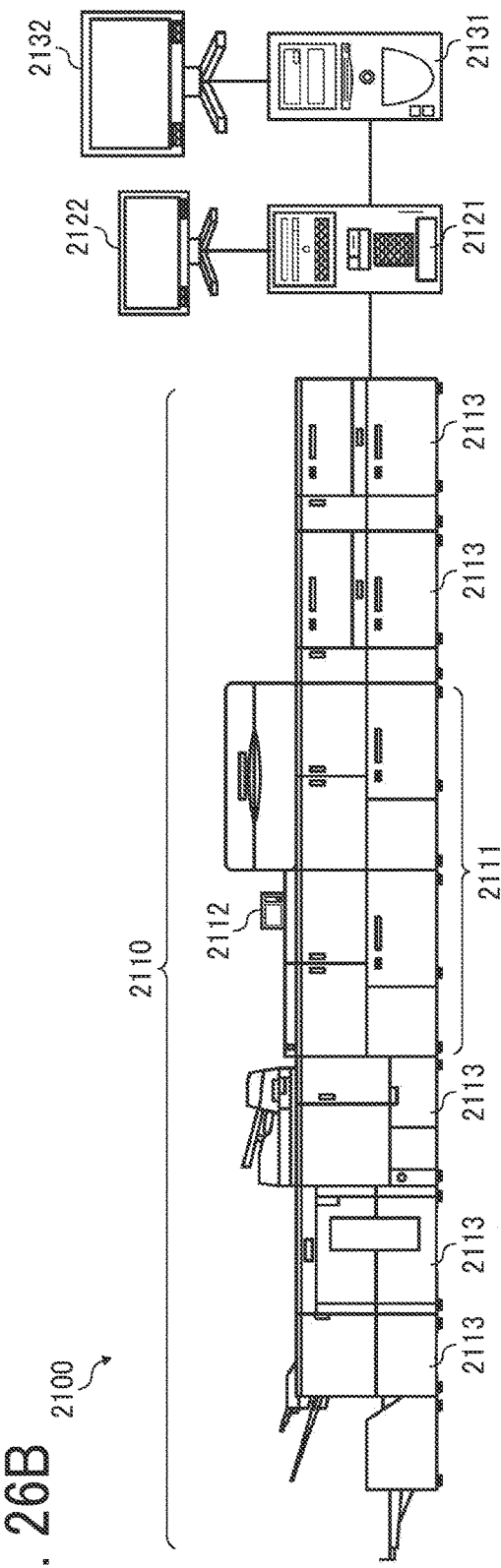
FIG. 26A
FIG. 26B

FIG. 31A

| MACHINE TYPE | NUMBER OF HORIZONTAL PIXELS × NUMBER OF VERTICAL PIXELS | ASPECT RATIO |
|---|---|---|
| PRINTER DISPLAY DEVICE | 1280 × 1024 | 5:4 |
| | 1024 × 600 | 128:75 |
| DFE DISPLAY DEVICE | 1920 × 1080 | 16:9 |
| | 1600 × 1200 | 4:3 |
| | 1024 × 768 | 4:3 |
| | 1280 × 1024 | 5:4 |
| WORKFLOW PC DISPLAY DEVICE | 1920 × 1080 | 16:9 |
| | 1600 × 1200 | 4:3 |
| | 1024 × 768 | 4:3 |
| | 1920 × 1200 | 16:10 |
| | 1366 × 768 | 16:9 |
| | 1280 × 1024 | 5:4 |

FIG. 31B

| MACHINE TYPE | IMAGE SIZE |
|---|---|
| PRINTER DISPLAY DEVICE | 8 INCHES |
| | 10 INCHES |
| DFE DISPLAY DEVICE | 14 INCHES |
| | 16 INCHES |
| | 24 INCHES |
| | 27 INCHES |
| WORKFLOW PC DISPLAY DEVICE | 15 INCHES |
| | 17 INCHES |
| | 22 INCHES |
| | 24 INCHES |
| | 27 INCHES |

IMAGE FORMING OUTPUT CONTROL DEVICE AND NON-TRANSITORY RECORDING MEDIUM STORING PROGRAM

CROSS-REFERENCE TO RELATED APPLICATIONS

This patent application is based on and claims priority pursuant to 35 U.S.C. § 119(a) to Japanese Patent Application Nos. 2016-198401, filed on Oct. 6, 2016, 2016-221611, filed on Nov. 14, 2016, 2016-241208, filed on Dec. 13, 2016, in the Japan Patent Office, the entire disclosure of each of which is hereby incorporated by reference herein.

BACKGROUND

Technical Field

Aspects of the present disclosure relate to an image forming output control device and a non-transitory recording medium storing a program.

Related Art

A printer for a production market used in, e.g., on-demand printing generally includes a combination of a printer-engine main unit and a digital front end (DFE). Such a DFE includes software that performs raster image processing (RIP) (or rendering processing) to generate print output data (hereinafter, referred to as raster data), which is finally referred to at the time of print output in the printer engine side, according to submitted data.

A portable document format (PDF) file is generally used as the submitted data referred in the RIP. The raster data is transferred from the DFE to the print engine and printed out. In the PDF file, for example, image information, drawing commands, text data, and font data are stored as image information in unit of object.

Among such objects, for "Image XObject", which is an image information object for storing image data, and "Form XObject", which is a drawing information object for storing a drawing command, it is permitted to refer to the same object from a plurality of pages in the PDF file. In a certain PDF file, image information objects and drawing information objects referred to from a plurality of pages are referred to as reusable objects.

Such a printer may perform so-called variable printing to print both a variation information part in which contents, such as personal information, are changed page by page and a fixed information part in which contents, such as a company logo, are not changed. When variable printing is performed, image data common to each page is stored as Image XObject, and a PDF file can be created in a format referring to Image XObject from an object for defining contents of each page to be printed. Such a configuration can give the effects of reducing the file size of the PDF file and increasing the efficiency of RIP in the DFE.

In addition, a so-called object caching technique is known in which raster data obtained from image data common to a plurality of pages is stored (cached) in a storage medium inside the DFE to speed up the RIP of another page.

SUMMARY

In an aspect of the present disclosure, there is provided an image forming output control device that includes a duplicate image information detector, a drawing information generator, a drawing information generation controller, and a drawing result storage unit. The duplicate image information detector receives instruction information, which is used to output an image being an image forming output target, from a processing execution control apparatus that controls execution of image forming output processing, compares image information included in a plurality of objects that are unit images constituting the instruction information, and detects a plurality of duplicate image information objects, in which the image information is duplicate with each other, in the plurality of objects in which identification information for identifying the objects is different from each other. The drawing information generator generates drawing information to which an image forming apparatus refers to perform image forming output. The drawing information generation controller controls the drawing information generator to generate the drawing information according to the instruction information. The drawing result storage unit stores drawing result information being a drawing result of the image information. The drawing information generation controller controls the drawing information generator to generate the drawing information with the drawing result information of the image information included in the plurality of duplicate image information objects detected with the duplicate image information detector.

In another aspect of the present disclosure, there is provided an image forming output control device that includes a drawing information generator, a duplicate drawing instruction information detector, a drawing information generation controller, and a drawing result storage unit. The drawing information generator generates drawing information to which an image forming apparatus refers to perform image forming output. The duplicate drawing instruction information detector receives instruction information, which is used to output an image being an image forming output target, from a processing execution control apparatus that controls execution of image forming output processing, compares drawing instruction information included in a plurality of objects that cause the drawing information generator to draw unit images constituting the instruction information, and detects a plurality of duplicate drawing instruction information objects, in which the drawing instruction information is duplicate with each other, in the plurality of objects in which identification information for identifying the objects is different from each other. The drawing information generation controller controls the drawing information generator to generate the drawing information according to the instruction information. The drawing result storage unit stores drawing result information being a drawing result of the drawing instruction information. The drawing information generation controller controls the drawing information generator to generate the drawing information with the drawing result information of the drawing instruction information included in the plurality of duplicate drawing instruction information objects detected with the duplicate drawing instruction information detector.

In still another aspect of the present disclosure, there is provided a non-transitory recording medium that stores a program to execute a method of controlling image forming output. The method includes receiving instruction information, which is used to output an image being an image forming output target, from a processing execution control apparatus that controls execution of image forming output processing; comparing image information included in a plurality of objects that are unit images constituting the instruction information; detecting a plurality of duplicate image information objects, in which the image information is duplicate with each other, in the plurality of objects in which identification information for identifying the objects is different from each other; generating drawing information to which an image forming apparatus refers to perform image forming output; controlling a drawing information generator to generate the drawing information according to the instruction information; and storing drawing result information being a drawing result of the image information. The controlling of the drawing information generator includes controlling the drawing information generator to generate the drawing information with the drawing result information of the image information included in the plurality of duplicate image information objects detected by the detecting.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a diagram of an information configuration of an Image XObject management table according to an embodiment of the present disclosure;

FIG. 10 is a diagram of an information structure of a Form XObject management table according to an embodiment of the present disclosure;

FIG. 22 is a diagram of another configuration of the preflight processing unit according to an embodiment of the present disclosure;

FIGS. 26A and 26B are diagrams of examples of a schematic configuration of hardware of an entire printing system according to an embodiment of the present disclosure;

FIGS. 31A and 31B are diagrams of examples of specifications of display devices included in the printing system according to an embodiment of the present disclosure;

Figure 1:
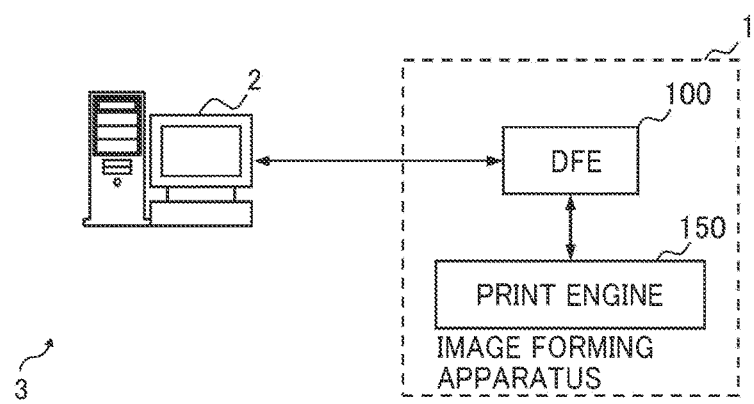
FIG. 1 is a diagram of an operation mode of a printing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure are described with reference to the attached drawings. In the present embodiment, a description is given below of an example of an image processing system 3 including a client terminal 2 to generate a print job and an image forming apparatus 1 to perform image forming output based on a received print job.

Figure 23A:
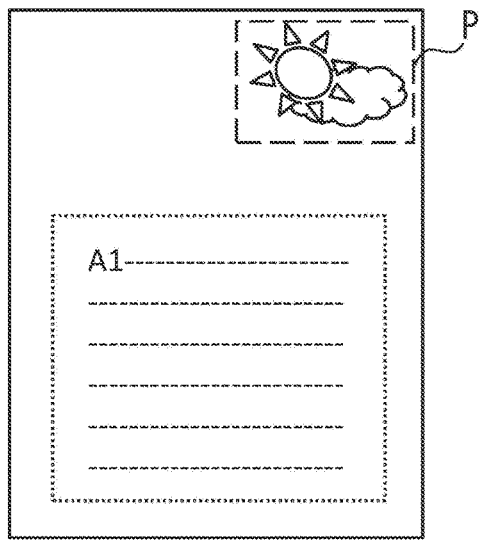
FIGS. 23A and 23B are illustrations of an example of a document file generated using an office application program.
Figure 23B:
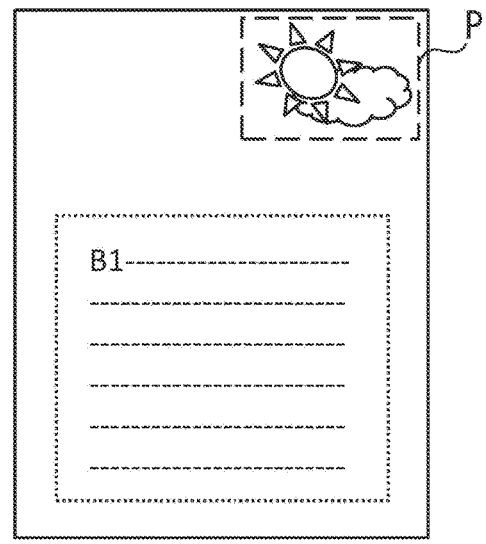

In such a configuration, for example, when a document created using an office application program is printed out on a personal computer (PC), a Portable Document Format (PDF) file may be generated from the created document. FIGS. 23A and 23B are illustrations of an example of a Word document including objects that have the same contents and different object identification information. In each of FIGS. 23A and 23B, the document includes a company logo P that is the same image data.

Figure 24A:
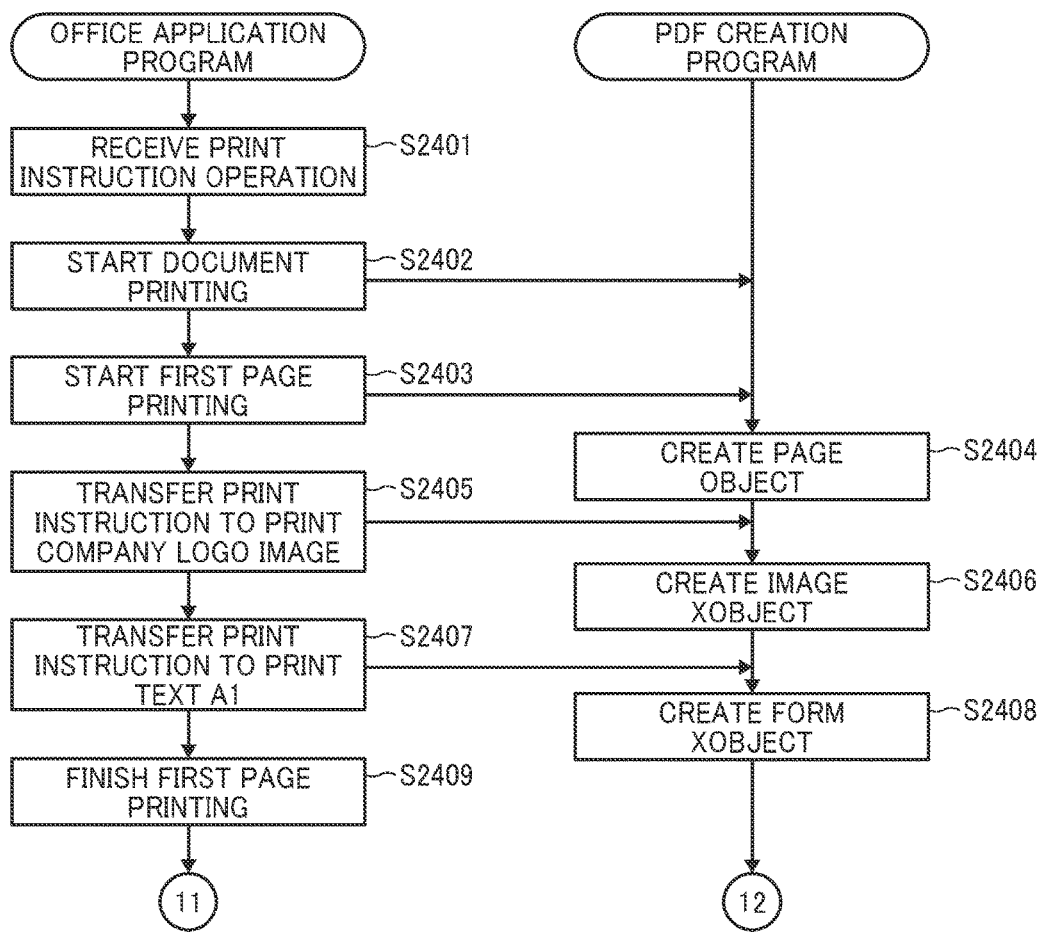
FIG. 24 (including FIGS. 24A and 24B) is a sequence diagram of a process of converting a document file to a PDF file.
Figure 24B:
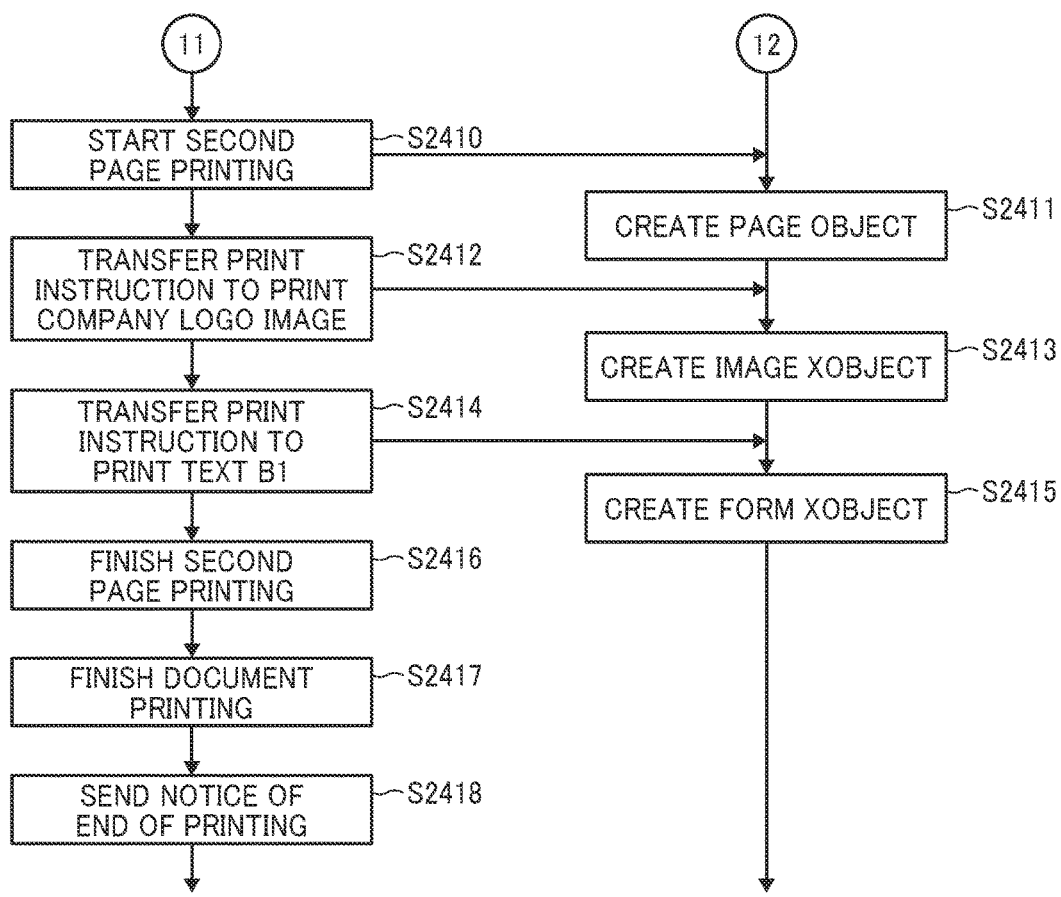

The Word document as illustrated in FIGS. 23A and 23B is converted into a PDF file according to a process illustrated in FIGS. 24A and 24B (collectively, referred to as FIG. 24). FIG. 24 is a sequence diagram of a process of converting a document created using an office application program into a PDF file by a PDF generation program of a printer driver type. Note that, in FIG. 24, the conversion from a Word document to a PDF file is defined as "printing".

As illustrated in FIG. 24, the office application program accepts a print instruction operation performed by a user of the PC (S2401), starts printing the document (S2402), and pass instruction information to the PDF creation program to start the printing from the first page (S2403).

The instruction information includes an instruction to print an image of the company logo P (S2405) and an instruction to print a text A1 (S2407). The PDF creation program sequentially creates a Page object (S2404), Image XObject from the image of the company logo P (S2406), and Form XObject from the text A1 based on the instruction information (S2408).

When the printing of the first page ends (S2409), the office application program passes instruction information to the PDF generation program to start printing the first page (S2410).

The instruction information includes an instruction to print an image of the company logo P (S2412) and an instruction to print the text B1 (S2414). The PDF generating program sequentially generates a Page object (S2411), an Image XObject from the image of the company logo P (S2413), and a Form XObject from the text A1 based on the instruction information (S2415).

When the printing of the second page ends (S2416), the office application program finishes the printing (S2417) and notifies the end of the printing (S2418). As described with reference to FIG. 24, in the PDF generation program of the printer driver type, to generate the Image XObject in each processing of S2406 and S2411, determination processing is not generally executed of determining whether image data as a print target received from the office application program is the same.

Accordingly, when such processing is performed and there are objects having the same contents and different object identification information like the image data of the company logo P, the respective pieces of image data are embedded in the PDF file as independent objects. As described above, according to the present embodiment, print output can be efficiently performed even for a PDF file that includes objects having the same contents and different object identification information.

FIG. 1 is a diagram of an operation mode of the image processing system 3 according to the present embodiment. As illustrated in FIG. 1, the image processing system 3 is configured by connecting the image forming apparatus 1 and the client terminal 2 via a network.

The image forming apparatus 1 is, for example, a printer that performs a printout operation by an electrophotographic method, an inkjet method, or the like, and includes a digital front end (DFE) 100 and a print engine 150. The DFE 100 functions as an image forming output control device being a control unit that controls the print engine 150 to perform digital image forming output. The print engine 150 includes an image forming unit, such as a photoconductor, a developing unit, and a conveying device, and functions as an image forming output device. Therefore, the DFE 100 executes raster image processing (RIP) to generate raster data that is image data to be referred when the print engine 150 executes print output. The raster data is drawing information.

When printout is performed by the image forming apparatus 1, data is transmitted from the client terminal 2 to the DFE 100. The DFE 100 performs the RIP as described above and transmits the raster data generated by the RIP to the print engine 150. The print engine 150 executes print output based on the received raster data. Accordingly, transmitting the print data prior to the RIP to the DFE 100 allows the image forming apparatus 1 to execute print output.

The client terminal 2 is an information processing terminal operated by an operator who uses the system, and is realized by a general personal computer (PC) or the like. The operator operates the client terminal 2 and transmits data to the DFE 100.

Figure 2:
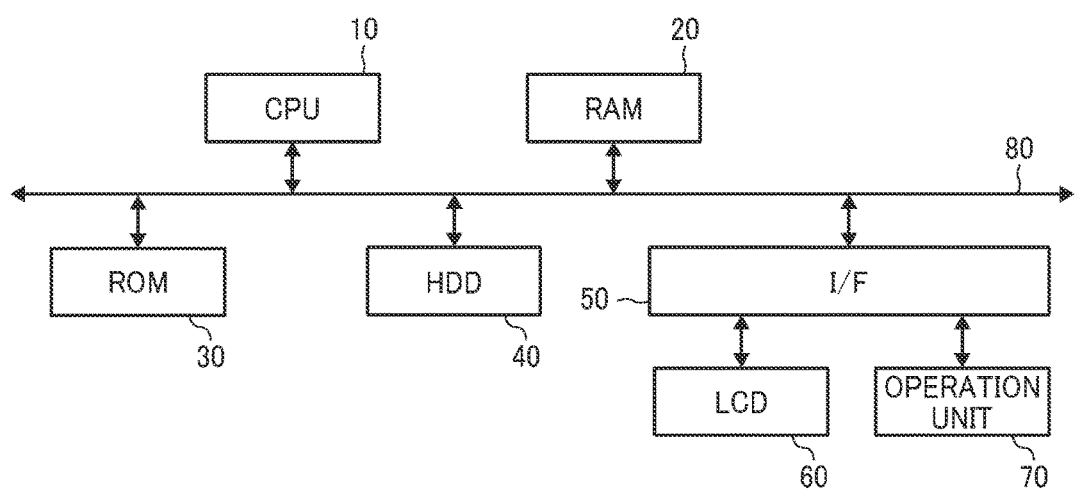
FIG. 2 is a block diagram of a hardware configuration of an information processing apparatus according to an embodiment of the present disclosure.

Next, the hardware configuration of the information processing apparatus, such as the DFE 100 and the client terminal 2, according to the present embodiment is described with reference to FIG. 2. As illustrated in FIG. 2, the DFE 100 and the client terminal 2 include configurations similar to those of a general server, a PC, and the like. That is, in the DFE 100, a central processing unit (CPU) 10, a random access memory (RAM) 20, a read only memory (ROM) 30, a hard disk drive (HDD) 40, and an interface (I/F) 50 are connected via a bus 80. A liquid crystal display (LCD) 60 and an operation unit 70 are connected to the I/F 50.

The CPU 10 is an arithmetic means and controls the operation of the entire information processing apparatus. The RAM 20 is a volatile storage medium that allows data to be read or written at a relatively high speed. The RAM 20 is used as an operation area for the CPU 10 to process the data. The ROM 30 is a read-only non-volatile storage medium, and stores programs, such as a boot loader and a basic input output system (BIOS). The HDD 40 is a non-volatile storage medium that allows data to be read and written, and stores an operating system (OS), various control programs, application programs, and the like.

The I/F 50 connects the bus 80 to various hardware components or networks for control. The LCD 60 is a visual user interface for allowing the user to confirm the state of the information processing apparatus. The operation unit 70 is a user interface, such as a keyboard and a mouse, for a user to input information to the information processing apparatus. Note that, in the DFE 100, user interfaces, such as the LCD 60 and the operation unit 70 may be omitted.

In such a hardware configuration, the CPU 10 performs calculation according to a program stored in the ROM 30 or a program loaded into the RAM 20 from a storage medium, such as the HDD 40 or an optical disc, thereby constituting a software control unit. A functional block achieving the functions of the DFE 100 and the client terminal 2 according to the present embodiment is constituted by a combination of the software controller thus configured and hardware.

Figure 3:
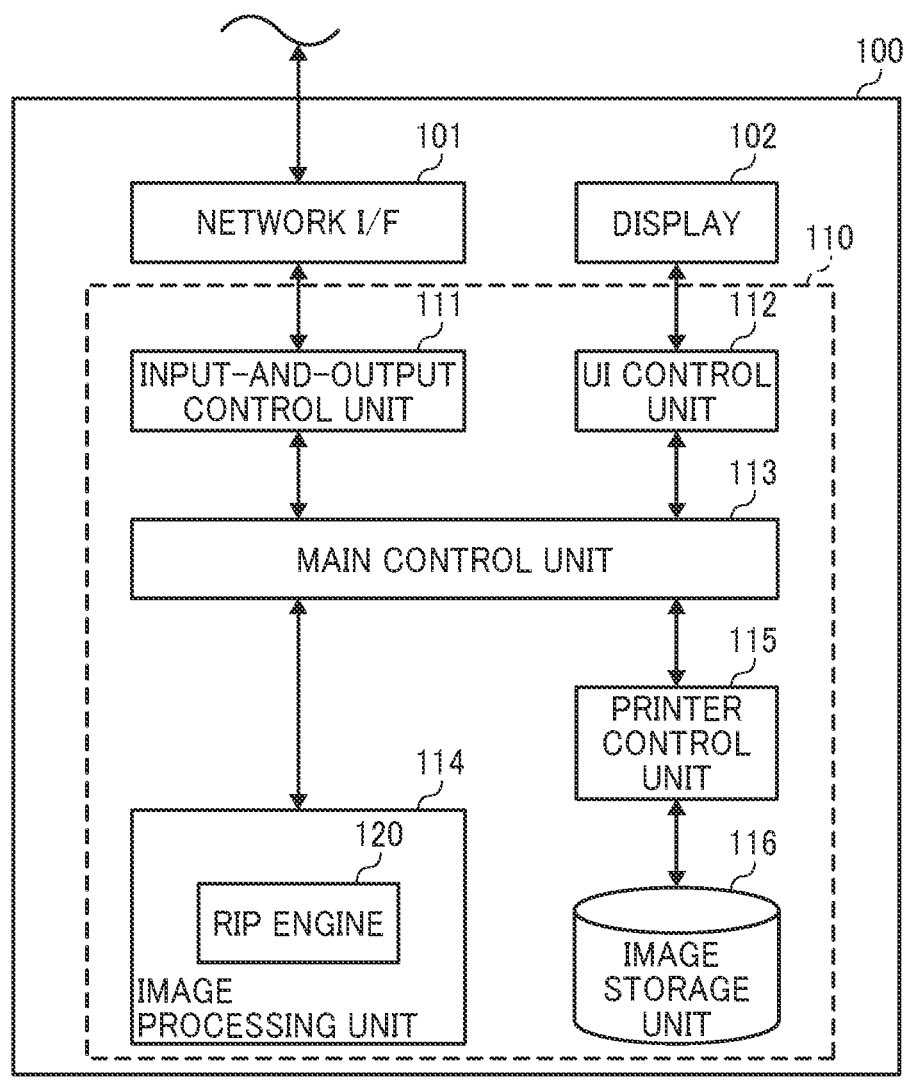
FIG. 3 is a block diagram of a functional configuration of a DFE according to an embodiment of the present disclosure.

Next, a functional configuration of the DFE 100 according to the present embodiment is described with reference to FIG. 3. As illustrated in FIG. 3, the DFE 100 includes a DFE controller 110, a network I/F 101, and a display 102. The network I/F 101 is an interface through which the DFE 100 exchanges information with other devices via the network. The DFE controller 110 performs acquisition of data to be digitally printed out, execution of a print job, and the like. The DFE controller 110 is configured by installing dedicated software into the information processing apparatus.

The DFE 100 receives job data as instruction information of print output from the client terminal 2, controls the received job, controls execution of RIP, and controls the print engine 150. The client terminal 2 transmits the job data to the DFE 100, thereby causing the print engine 150 to execute print output. That is, the DFE 100 functions as a server to provide a digital print function to the client terminal 2.

The job control function provided by the DFE 100 is a control function of a series of operations, such as acceptance of job data, analysis of job data, creation of raster data, and print output by the print engine 150. The execution control of RIP is a control to cause the RIP engine 120 to execute the RIP based on the information generated by analyzing the job data.

The information generated by analyzing the job data is information in which information used for RIP is converted into a format that can be interpreted by the DFE 100. The RIP engine 120 is a drawing information generating unit that generates intermediate data and raster data by executing RIP with reference to information converted into a format that can be interpreted by the DFE 100.

The control function of the print engine 150 is a function of transmitting raster data to the print engine 150 to execute print output. Such functions are achieved by the respective blocks illustrated in FIG. 3. As illustrated in FIG. 2, each block illustrated in FIG. 3 is realized by the CPU 10 performing arithmetic processing according to a program loaded in the RAM 20 and a program stored in the ROM 30 to operate other hardware.

The DFE 100 may have a configuration in which a plurality of RIP engines 120 are mounted therein. Such a configuration is to reduce the difference in print output with other devices when RIP engines are mounted on such other devices that may transmit a job to the DFE 100.

Note that input of job data to the DFE 100 can be input via a portable storage medium, such as an universal serial bus (USB) memory, in addition to input via the network from the client terminal 2. The information processing apparatus that inputs the job data to the DFE 100 functions as a processing execution control apparatus that controls the execution of the image forming output processing.

A main control unit 113 functions as a drawing information generation controller to pass the job data received by the input-and-output control unit 111 to the image processing unit 114. Note that, when the DFE 100 is set to store job data, the main control unit 113 may store the job data in a storage area realized by the RAM 20 and the HDD 40. The storage area may be a storage device connected to the DFE 100 via a USB interface or the like, or a storage device connected via a network.

Further, for example, in the case where it is described in the job data whether to store the job data in the storage area for the purpose of previewing the print content in the DFE 100 or the like, the main control unit 113 follows the description. In such a case, the main control unit 113 acquires print target data included in the job data from the storage area, causes the image processing unit 114 to generate the preview data, and passes the data to an user interface (UI) control unit 112. Thus, the UI control unit 112 causes a display 102 to display a preview of the print content.

When an operator changes the print setting in the DFE 100, the job data is stored in the storage area. In such a case, the main control unit 113 acquires the job data from the storage area and passes the job data to the UI control unit 112. As a result, a UI for changing the print setting specified in the job data is displayed on the display 102, and the operator can perform an operation to change the print setting.

When the operator operates the DFE 100 to change the print setting, the UI control unit 112 receives the changed content and notifies the main control unit 113 of the changed content. The main control unit 113 reflects the received changed content in the target job data and updates the target job data, and stores the updated job data in the storage area.

Upon receiving the job execution instruction, the main control unit 113 transfers the job data stored in the storage area to the image processing unit 114 or a printer control unit 115. An instruction to execute the job is input from the client terminal 2 via the network or by an operator's operation on the DFE 100. Further, for example, when the execution time of a job is set in the job data, the main control unit 113 transfers the job data stored in the storage area to the image processing unit 114 or the printer control unit 115 at a set time.

As described above, the UI control unit 112 accepts display of information on the display 102 and an operator's operation on the DFE 100. In the above-described editing operation of the print setting, the UI control unit 112 interprets print setting information, such as job description format (JDF) information included in the job data and displays the content of the print job on the display 102.

The main control unit 113 performs control relating to the execution of a job based on the execution instruction of the job. For example, the main control unit 113 performs analysis processing of the print setting information, RIP by the image processing unit 114, and control processing of the print engine 150 by the printer control unit 115. Upon receipt of a job execution instruction, the main control unit 113 converts the print setting information included in the job data into a format recognizable by the image processing unit 114.

The main control unit 113 transfers the converted print setting information, which has been converted into a recognizable format in the image processing unit 114, to the image processing unit 114 to execute RIP. The image processing unit 114 causes the plurality of RIP engines 120 to execute internal processing of the RIP to generate raster data.

The image storage unit 116 is a storage unit that stores the raster data generated by the RIP engine 120. The image storage unit 116 is realized by the HDD 40 or the like described in FIG. 2. Alternatively, the image storage unit 116 may be a storage device connected to the DFE 100 via a USB interface or the like, or a storage device connected via a network.

The printer control unit 115 is connected to the print engine 150, reads the raster data stored in the image storage unit 116, and transmits the read raster data to the print engine 150 to execute print output. By acquiring finishing information included in job data from the main control unit 113, control for finishing processing is performed. When the image forming apparatus 1 has a configuration of performing coating processing, the printer control unit 115 controls the execution of coating processing.

The printer control unit 115 can acquire information of the print engine 150 itself by exchanging information with the print engine 150. For example, in the case of the CIP 4 standard, a standard called DevCaps for transmitting and receiving device specification information to and from a printer is defined as a standard of print setting information. There is also known a method of collecting information on a printer using a communication protocol called Simple Network Management Protocol (SNMP) and a database called Management Information Base (MIB).

The input-and-output control unit 111 exchanges information about the device with the client terminal 2 via the network I/F 101 in accordance with specifications, such as MIB and Job Messaging Format (JMF). As a result, the information of the RIP engine 120 included in the DFE 100 and the information of the input-and-output control unit 111 are reflected in a graphical user interface (GUI) displayed on the client terminal 2.

When the print engine 150 is controlled by the printer control unit 115 and the print output is completed, the main control unit 113 notifies the client terminal 2 of the completion of the print job via the network I/F 101.

Figure 4:
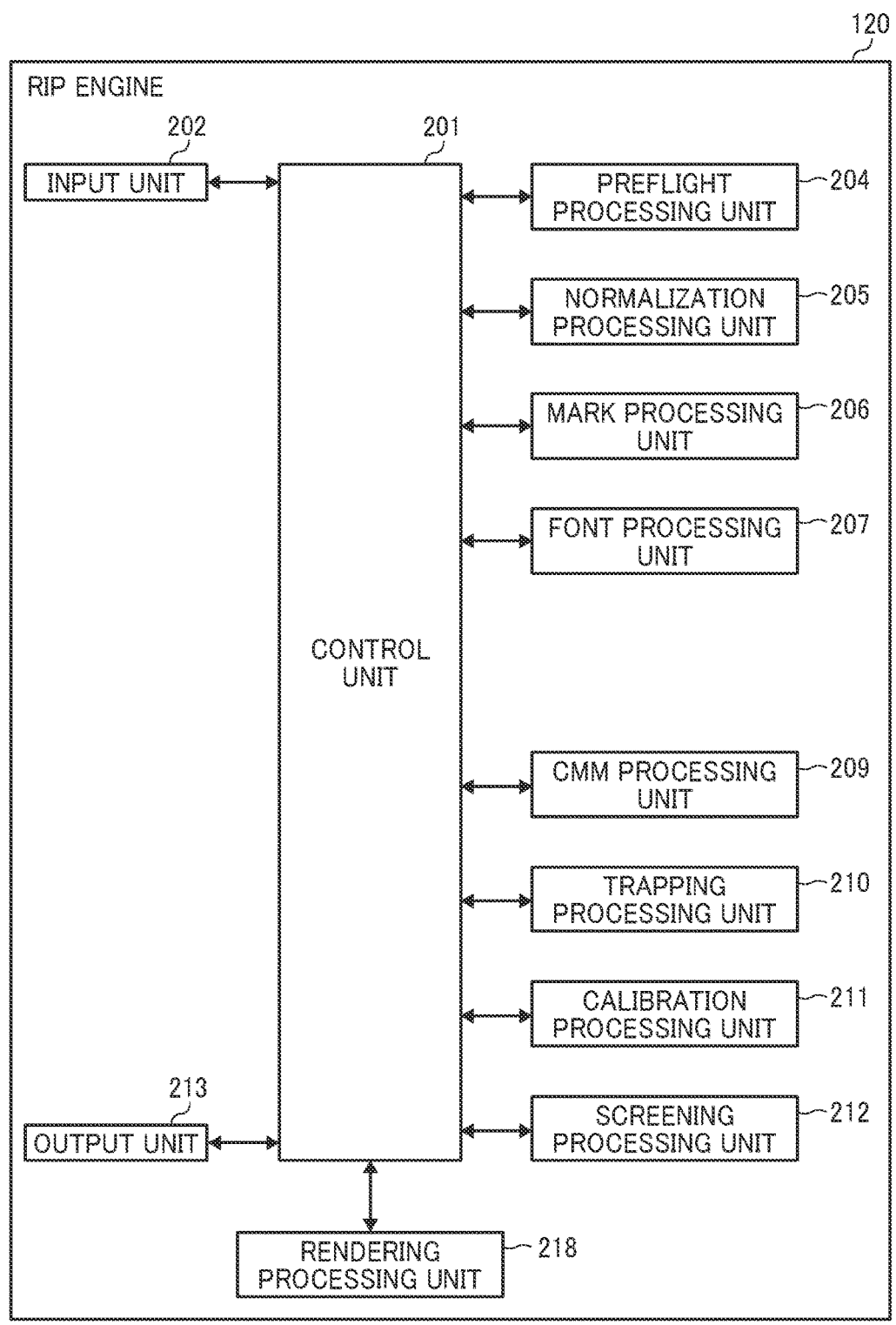
FIG. 4 is a block diagram of a functional configuration of a RIP engine according to an embodiment of the present disclosure.

Next, the functional configuration of the RIP engine 120 according to the present embodiment is described below. FIG. 4 is a diagram of a functional configuration of the RIP engine 120 according to the present embodiment. As described above, the RIP engine 120 is a software module that generates raster data by executing RIP internal processing based on job data. The RIP engine 120 may be based on, for example, Adobe PDF Print Engine (APPE) which is a PDF printing engine provided by Adobe Systems Incorporated.

As illustrated in FIG. 4, the RIP engine 120 includes the control unit 201 and other parts. A portion other than the control unit 201 is an extension unit which can be extended by a vender. The control unit 201 executes RIP by using various functions included as an extension unit.

The input unit 202 receives an initialization request and an execution request of RIP, and notifies the control unit 201 of the request. The control unit 201 determines the order in which respective extension units included in the RIP engine 120 are operated in the RIP. Further, the control unit 201 determines the format of data (e.g., raster image, preview image, PDF, or intermediate data) generated as a result of such processing.

Upon receiving the RIP execution request from the input unit 202, the control unit 201 causes the extension units to operate according to the processing order determined upon receiving the initialization request. The preflight processing unit 204 confirms the validity of the content of the input job data. When an invalid job attribute is found in the content of the input job data, the preflight processing unit 204 notifies the control unit 201 of the finding. Upon receiving this notification, the control unit 201 notifies an external module, such as the image processing unit 114 or the main control unit 113, via an output unit 213 information relating to the finding of invalid job attribute or the like.

By the preflight processing, it is determined, for example, whether an incompatible font is specified, whether there is a duplicate of image data included in job data, and whether there is a duplicate of a drawing command for generating raster data based on image data. As a result of such processing, the RIP is executed based on the confirmed valid information. In addition, as the pre-flight processing, it is determined whether there is information that might cause a situation in which processing by other modules included in the RIP engine 120 becomes impossible.

Figure 5:
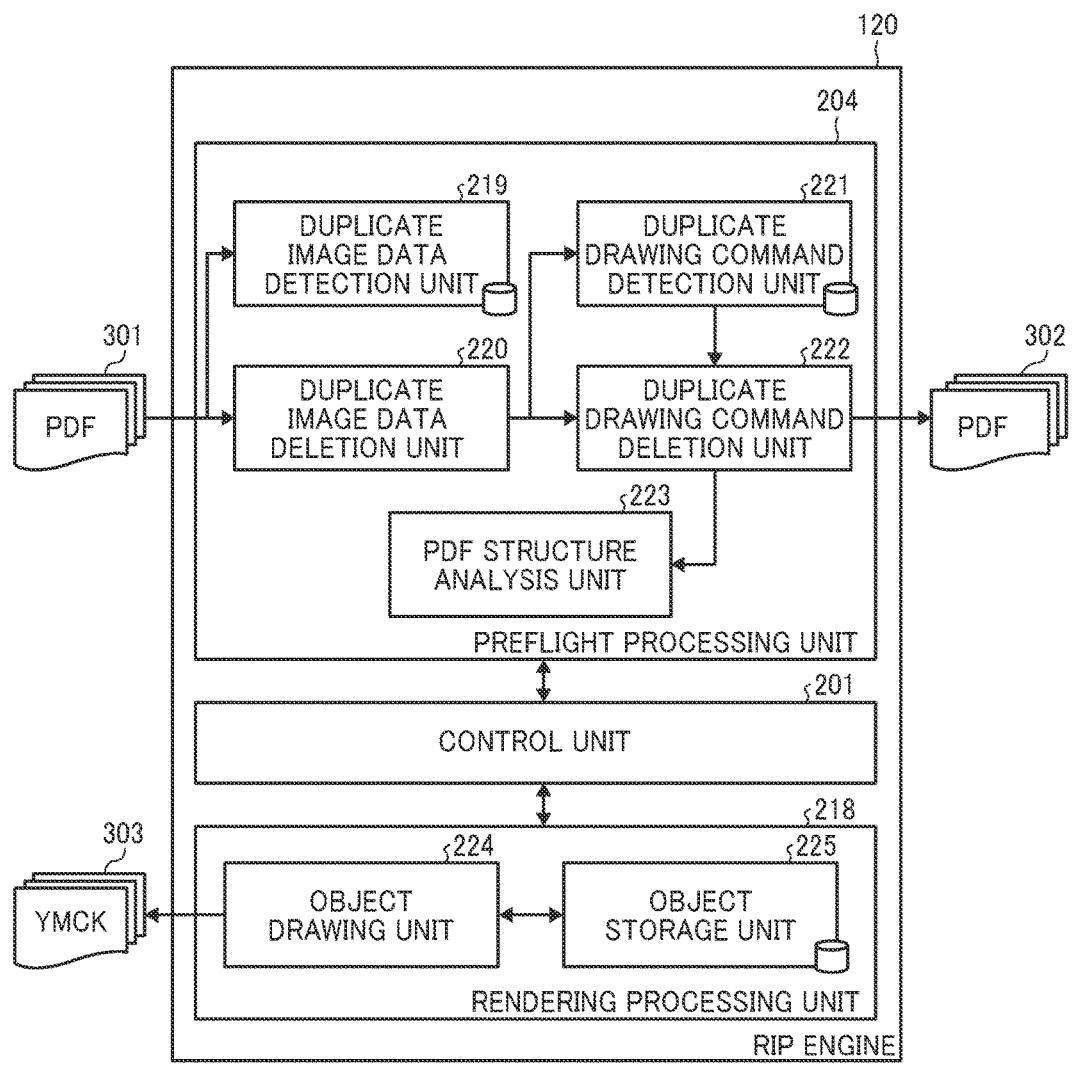
FIG. 5 is a diagram of functional configurations of a preflight processing unit and a rendering processing unit according to an embodiment of the present disclosure.

FIG. 5 is a block diagram of a functional configuration of the preflight processing unit 204 and a rendering processing unit 218 according to the present embodiment. As illustrated in FIG. 5, the preflight processing unit 204 according to the present embodiment includes a duplicate image data detection unit 219, a duplicate image data deletion unit 220, a duplicate drawing command detection unit 221, a duplicate drawing command deletion unit 222, a PDF structure analysis unit 223.

The duplicate image data detection unit 219 functions as a duplicate image information detector to compare the contents of Image XObject, which is an image information object existing in a PDF file 301, and detect whether there is an Image XObject having the same content in another Image XObject. Another Image XObject having the same content detected by the duplicate image data detection unit 219 corresponds to a duplicate image information object.

The duplicate image data deletion unit 220 functions as a duplicate image information control unit to delete other Image XObject having the same content detected by the duplicate image data detection unit 219. The detection result of the duplicate image data detection unit 219 and the processing result of the duplicate image data deletion unit 220 are reflected in an Image XObject management table.

The duplicate drawing command detection unit 221 functions as a duplicate drawing instruction information detection unit to compare the contents of Form XObject that is an object of drawing instruction information present in the PDF file 301 and determines whether there is another Form XObject having the same content among the other Form XObjects. Another Form XObject having the same content detected by the duplicate drawing command detection unit 221 corresponds to a duplicate drawing instruction information object.

The duplicate drawing command deletion unit 222 functions as a duplicate drawing information processing control unit to delete the other Form XObject having the same content detected by the duplicate image data detection unit 219. The result of detection by the duplicate drawing command detection unit 221 and the result of processing by the duplicate drawing command deletion unit 222 are reflected in the Form XObject management table.

Image XObject is an object containing a full-color image, such as a natural image, or a black-and-white image, such as a barcode, in a PDF format file. In the PDF format file, encoded data obtained by using an image compression algorithm, such as Joint Photographic Experts Group (JPEG), can be stored as stream data possessed by Image XObject. In addition, Form XObject is an object containing a drawing command describing procedures for drawing vector figures, fonts, images, and the like.

The PDF structure analysis unit 223 analyzes the PDF format file included in the job data and acquires information on the start position and the number of bytes of each object.

Returning to FIG. 4 again, the function of each expansion unit of the RIP engine 120 is further described below. A normalization processing unit 205 converts input job data into PDF data when the input job data is not PDF data but PostScript data. A mark processing unit 206 expands graphic information of a designated mark and superimposes the graphic information on a designated position in an image to be printed.

A font processing unit 207 extracts font data and performs embedding processing and outline processing of font. A color management module (CMM) processing unit 209 converts a color space of an input image into CMYK (cyan, magenta, yellow, black) based on a color conversion table or the like described in an International Color Consortium (ICC) profile. The ICC profile is color ICC information and device ICC information.

A trapping processing unit 210 performs trapping processing. To prevent a gap from occurring at a boundary portion when misalignment occurs in adjacent color regions adjacent to each other, the trapping processing is performed by extending the respective color regions to fill the gap.

A calibration processing unit 211 performs adjustment work of variations in the coloring balance due to temporal variations and individual differences of an output device to improve the accuracy of color conversion by the CMM processing unit 209. Note that the processing by the calibration processing unit 211 may be executed outside the RIP engine 120.

A screening processing unit 212 executes generation processing of halftone dots in consideration of final output. Note that the processing by the screening processing unit 212 may be executed outside the RIP engine 120, similarly to the processing by the calibration processing unit 211. An output unit 213 transmits a RIP result to the outside. The RIP result is data in any one format of a raster image, a preview image, PDF, and intermediate data determined at the time of initialization.

The rendering processing unit 218 performs rendering processing to generate raster data 303 based on the input data and includes an object drawing unit 224 and an object storage unit 225, as illustrated in FIG. 5. The rendering processing unit 218 refers to cached Image XObject and Form XObject based on information on the start position and the number of bytes of each object, and executes the rendering processing.

In the process of executing RIP on the PDF file to be printed, the raster data obtained by performing the RIP for certain Image XObject and Form XObject for the first time is stored in the object storage unit 225 together with identification information (for example, Object-ID) of the object as cached data.

Figure 6:
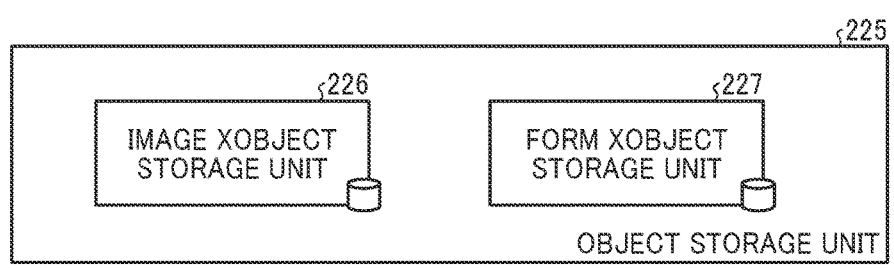
FIG. 6 is a block diagram of a functional configuration of an object storage unit according to an embodiment of the present disclosure.

As illustrated in FIG. 6, the object storage unit 225 includes an Image XObject storage unit 226 and a Form XObject storage unit 227. Each of the Image XObject storage unit 226 and the Form XObject storage unit 227 functions as a drawing result storage unit.

For an object reused in the same PDF file, by referring to the cache data stored in the object storage unit 225, the object drawing unit 224 copies the cache data and executes only the processing of generating raster data without performing the RIP.

The Image XObject storage unit 226 associates an object ID, which is identification information for identifying an Image XObject, with an image generated as a result of rendering the object and stores a drawing result of the Image XObject. The Form XObject storage unit 227 associates an object ID, which is identification information for identifying a Form XObject, with an image generated as a result of rendering the object, and stores a drawing result of the Form XObject.

Among the processing units illustrated in FIG. 4, the processing by the mark processing unit 206 and the font processing unit 207 may be executed simultaneously with the processing in the rendering processing unit 218.

Figure 7:
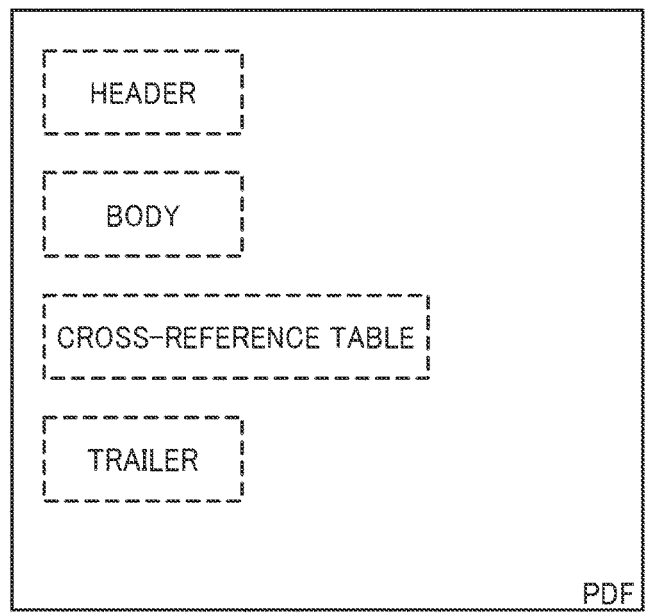
FIG. 7 is a diagram of an information structure of a PDF file according to an embodiment of the present disclosure.

As illustrated in FIG. 7, the PDF format file includes a header, a body, a cross-reference table, and a trailer. The header is information defined to be a PDF format file. The body is a main part of a file in PDF format including, for example, Image XObject illustrated in FIG. 8A, Form XObject illustrated in FIG. 8B.

The cross-reference table is information for randomly accessing the main part of the file in PDF format, and includes the position information of the object. The trailer is information including a file size of a PDF format file, catalog information, a cryptographic dictionary, and the like.

Figure 8A:
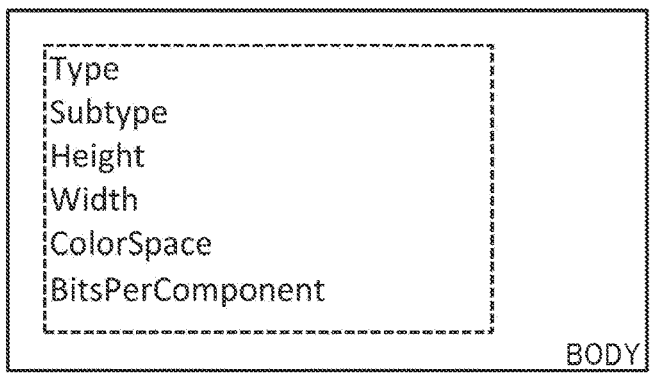
FIGS. 8A and 8B are diagrams of examples of an information configuration of a body part of a PDF file according to an embodiment of the present disclosure.

The duplicate image data detection unit 219 according to the present embodiment has an Image XObject management table to manage an Image XObject by, for example, a information configuration illustrated in FIG. 8A. FIG. 9 is a diagram of the information configuration of the Image XObject management table according to the present embodiment.

The Image XObject management table illustrated in FIG. 9 includes items of "Record No", "Object-ID", "Height", "Width", "Length", "Color Space", "Filter", "Stream Hash", and "Same Obj List".

The "Record No" is information indicating the record number in the Image XObject management table. The "Object-ID" is identification information, such as an object ID for identifying an object which is a unit image included in a PDF format file.

The "Height" is a value indicating the length of the object in the vertical direction. The "Width" is a value indicating the length of the object in the horizontal direction. The "Length" is the length of a byte string of stream data of a compressed object. The "Color Space" is a value indicating color space. The "Filter" is a value indicating the type of a filter applied to a byte string.

The "Stream Hash" is a random fixed-length value calculated from stream data of an image included in an object by a predetermined calculation procedure. The "Same Obj List" is information indicating an Object-ID of an object which is the same image data.

Figure 8B:
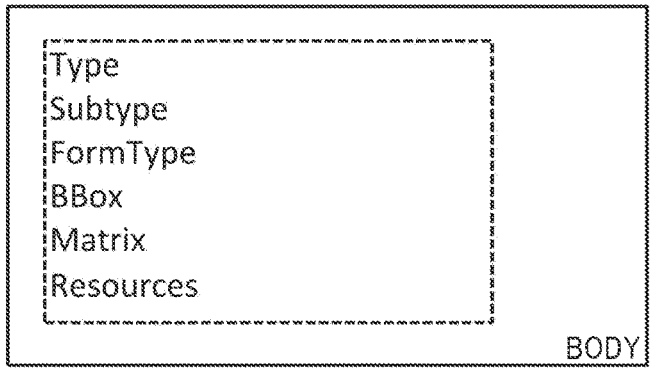

Further, the duplicate drawing command detection unit 221 according to the present embodiment has a Form XObject management table to manage Form XObjects according to, for example, the information configuration illustrated in FIG. 8B. FIG. 10 is a diagram of the information configuration of the Form XObject management table according to the present embodiment.

The Form XObject management table illustrated in FIG. 10 includes items of "Record No", "Object ID", "Form Type", "B Box", "Matrix", "Resources Hash", "Stream Hash", and "Same Obj List".

The "Record No" is information indicating the record number in the Form XObject management table. The "Object-ID" is identification information, such as an object ID for identifying an object included in a file in PDF format.

The "Form Type" is information that defines the format of an object, and the "B Box" is information indicating a drawing area of an object. The "Matrix" is a value indicating a determinant for transforming a form.

The "Resources Hash" is a random fixed-length value calculated by a predetermined calculation procedure from the stream data of resource data included in the object to perform rendering. The "Stream Hash" is a random fixed-length value calculated from stream data of a drawing command included in an object by a predetermined calculation procedure. The "Same Obj List" is information indicating an Object-ID of an object which is the same image data.

As described above, when caching the object data, the duplicate image data detection unit 219 compares the contents of the Image XObject based on the Image XObject management table. Based on the comparison result, the duplicate image data detection unit 219 detects whether there is another Image XObject having the common content, that is, being the same image data, among other Image XObjects.

Based on the detection result of the Image XObject having the same content, the rendering processing unit 218 also manages Image XObjects stored in the Image XObject storage unit 226.

When the duplicate drawing command detection unit 221 caches data of an object, the duplicate drawing command detection unit 221 compares the contents of Form XObjects based on the Form XObject management table. Based on the comparison result, the duplicate drawing command detection unit 221 detects whether there is any other Form XObject having the common content, that is, being the same drawing command.

Based on the detection result of the Form XObject having the same content, the rendering processing unit 218 also manages the Form XObject stored in the Form XObject storage unit 227.

Figure 11:
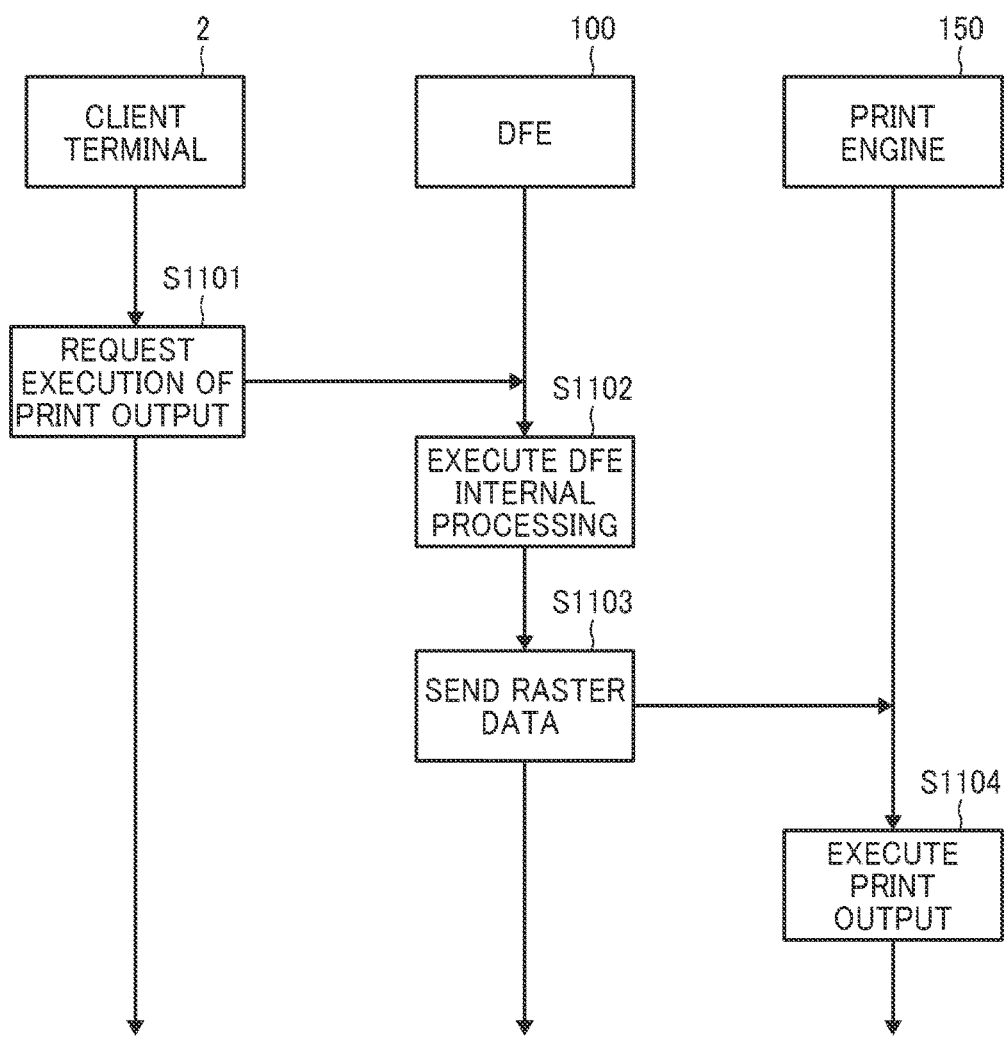
FIG. 11 is a sequence diagram of an overall operation of the printing system according to an embodiment of the present disclosure.

Next, the operation of a system according to the present embodiment is described with reference to FIG. 11. FIG. 11 is a sequence diagram of the operation of a workflow system according to the present embodiment. The client terminal 2 transmits to the DFE 100 job data that is a print output execution request by an operator's operation on the GUI of the system (S1101).

Receiving the job data, the DFE 100 executes RIP as the DFE internal processing of (S1102) and transmits the generated raster data to the print engine 150 (S1103). The print engine 150 prints out raster data (S1104).

Figure 12:
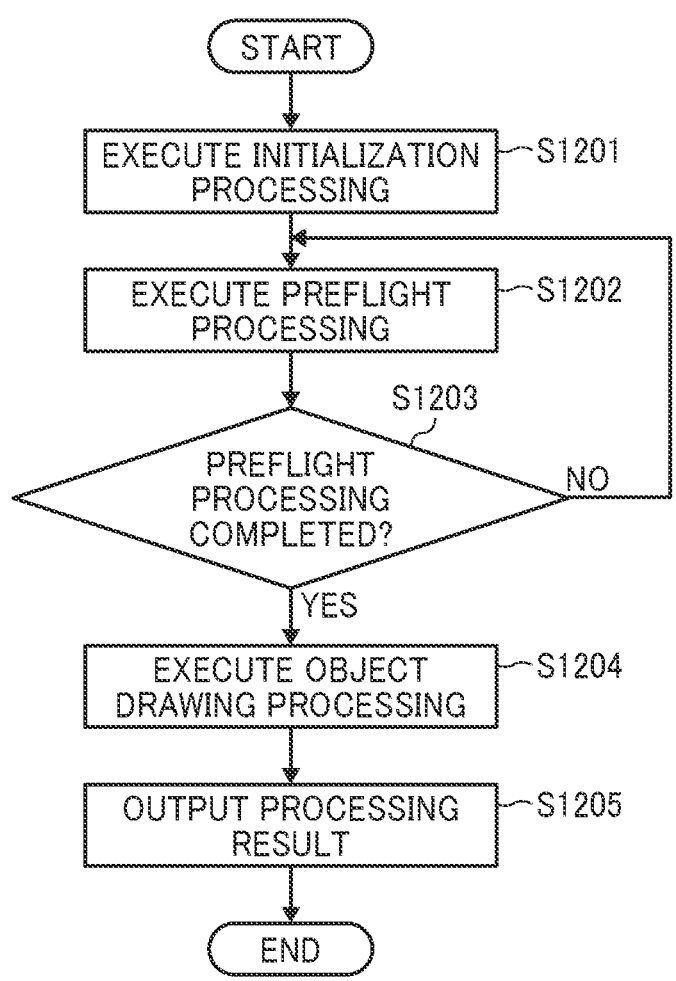
FIG. 12 is a flowchart of a process of RIP according to an embodiment of the present disclosure.

Next, the RIP executed in the DFE internal processing in S1102 of FIG. 11 is described with reference to FIG. 12. As illustrated in FIG. 12, first, the control unit 201 executes initialization processing based on an initialization request to the input unit 202 (S1201). In S1201, among the respective expansion units included in the RIP engine 120, an expansion unit to execute processing and the order in which expansion units execute processing are determined. The format of data generated as a result of processing is determined.

As described above, the preflight processing unit 204 executes preflight processing (S1202) to determine whether, for example, an incompatible font is specified for the PDF file 301 included in the job data, whether duplicate image data is included in the job data, and whether there is any duplication in a drawing command for generating raster data based on image data (S1202). The processing mode of S1202 is described later.

After the preflight processing is completed (YES in S1203), processing is requested according to the processing order determined in S1201, and finally object drawing processing is executed in the rendering processing unit 218 (S1204). Note that, for an Image XObject having the same object ID or a Form XObject having the same object ID, the rendering processing unit 218 generates raster data by referring to the rasterization result that is object-cached in the processing described later.

In such a case, the Image XObject, for which raster data is generated with reference to the object-cached rasterization result is a duplicate image information reference object. The Form XObject, for which raster data is generated with reference to the object-cached rasterization result, is a duplicate drawing instruction information reference object. The rasterization result used for the object caching by the rendering processing unit 218 is drawing result information.

When the processing is executed by the expansion unit and raster data is generated in this manner, the output unit 213 outputs the processing result (S1205). By such processing, the RIP in the RIP engine 120 is completed.

Note that, in S1202, so-called object caching processing s executed to store rasterization results of image data and drawing commands referred to from a plurality of pages in the PDF file. Hereinafter, a process of optimizing the PDF file according to the present embodiment is described.

Figure 13:
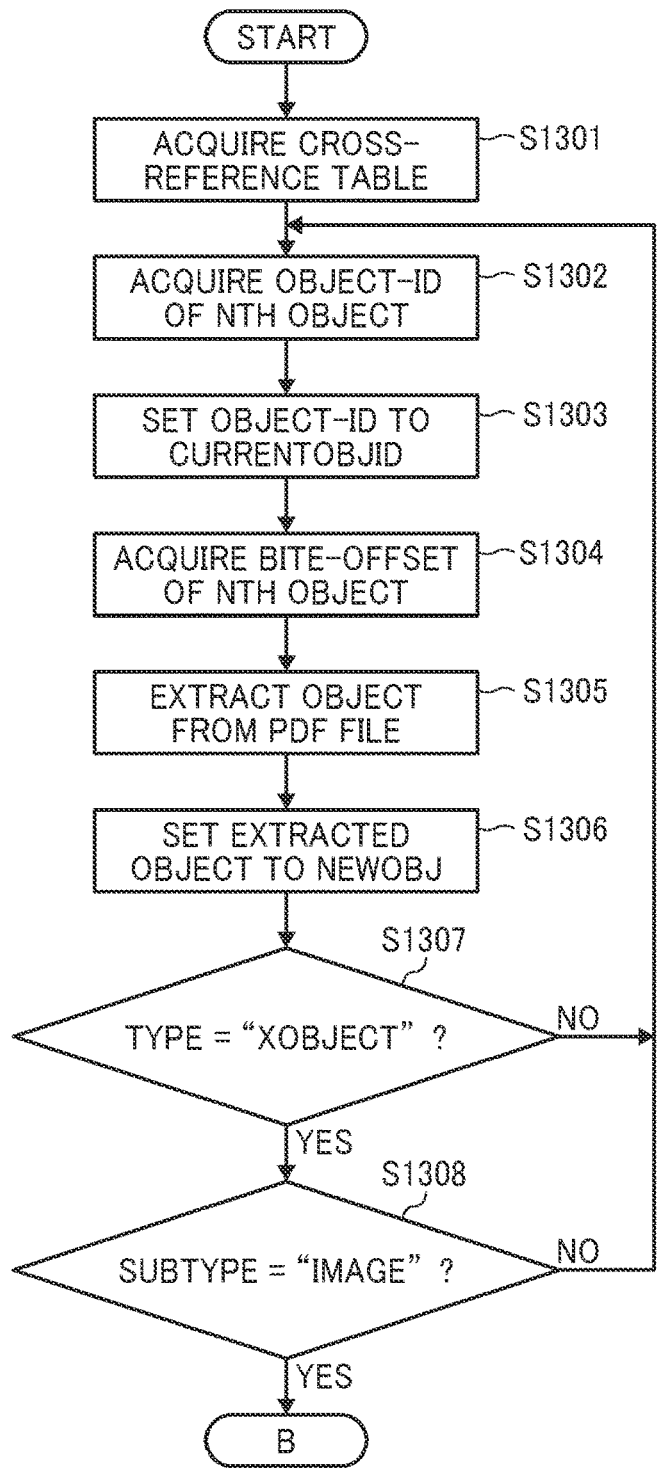
FIG. 13 is a flowchart of a process of detecting duplicate image data according to an embodiment of the present disclosure.
Figure 14A:
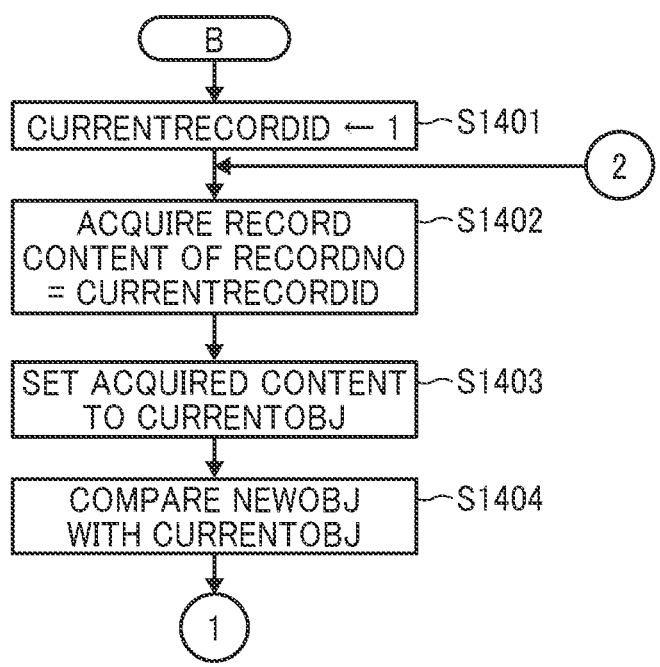
FIG. 14 (including FIGS. 14A and 14B) is a flowchart of a process of detecting duplicate image data according to an embodiment of the present disclosure.
Figure 14B:
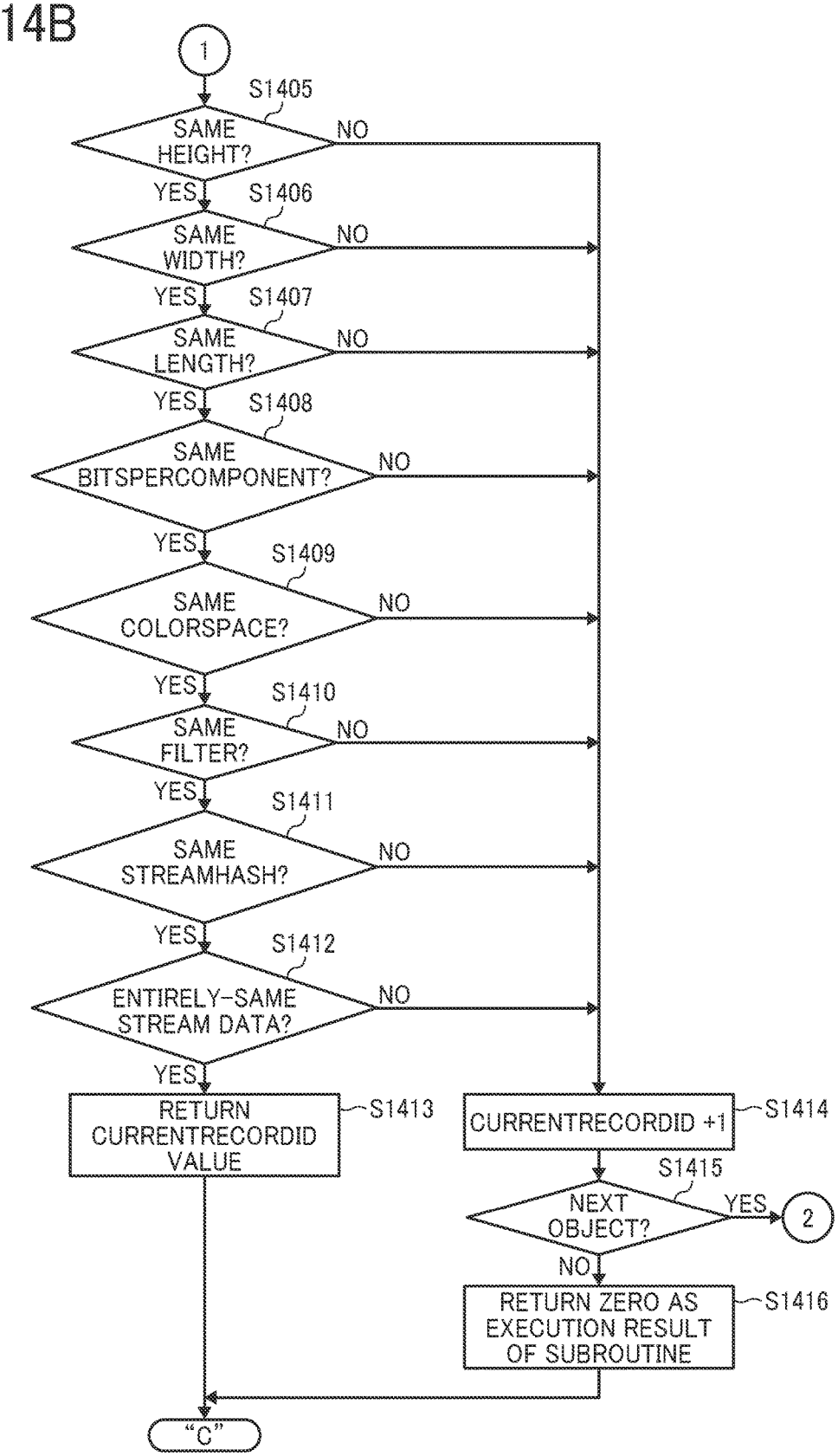
Figure 15:
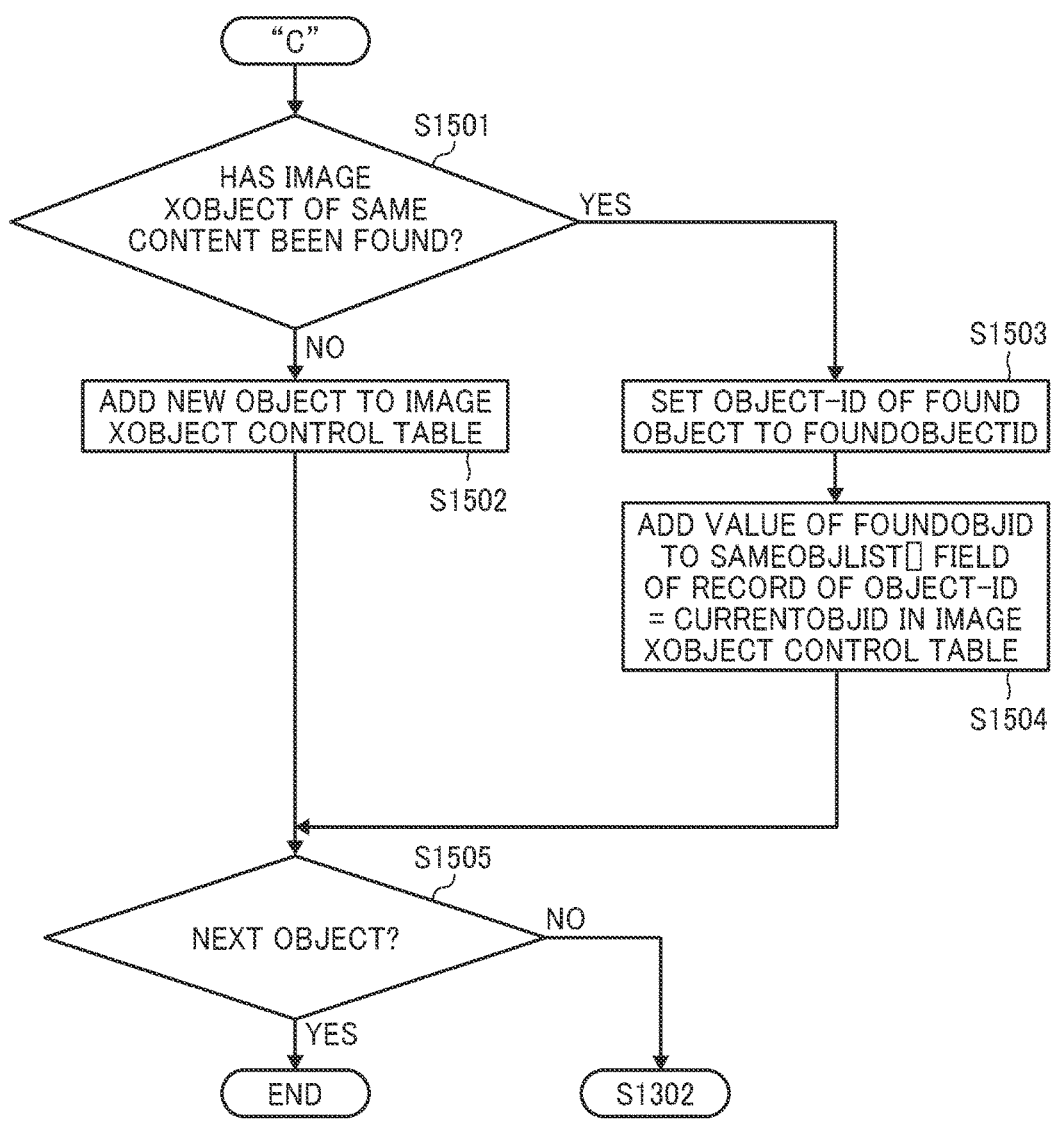
FIG. 15 is a flowchart of a process of detecting duplicate image data according to an embodiment of the present disclosure.

First, a process of detecting duplicate image data is described. FIGS. 13 to 15 are flowcharts of a flow of processing of detecting duplicate image data according to the present embodiment. As described above, the PDF file 301 includes a cross-reference table indicating the positions of objects included in the PDF file 301 to cope with random access. The duplicate image data detection unit 219 acquires the cross-reference table from the PDF file 301 (S1301).

The duplicate image data detection unit 219 acquires an Object-ID of an object from the cross-reference table (S1302) and sets the Object-ID to currentObjId indicating the Object-ID of a comparison source object (S1303). In the process of detecting a duplicate image for the first time, the duplicate image data detection unit 219 assigns a dummy or invalidated Object-ID to the Object-ID whose Record No is set to "0", that is, set to currentObjId.

Next, the duplicate image data detection unit 219 acquires, from the cross-reference table, a byte offset that is position information of the object having the Object-ID set in the currentObjId in the processing of S1303 (S1304). The duplicate image data detection unit 219 extracts an object at the position of the object having the Object-ID from the PDF file 301 (S1305), and sets the extracted object to newObj as information indicating a comparison target object (S1306).

Next, the duplicate image data detection unit 219 confirms the information of newObj. Specifically, the duplicate image data detection unit 219 confirms whether Type of newObj is "XObject" (S1307) and confirms whether Subtype of newObj is "Image" (S1308). Through the process, the duplicate image data detection unit 219 determines whether the object extracted in S1305 is "Image XObject".

In the case of NO in either S1307 or S1308, the duplicate image data detection unit 219 executes the process from S1302 again. Accordingly, at the time of detecting the duplicate image for the first time, the duplicate image data detection unit 219 extracts a dummy or invalidated object from the byte offset of the object having the dummy or invalidated Object-ID. Therefore, at the time of detecting the duplicate image for the first time, the duplicate image data detection unit 219 executes the processing from S1302 again.

In the case of YES in S1307 and YES in S1308, the duplicate image data detection unit 219 determines that newObj is Image XObject. The duplicate image data detection unit 219 executes same-image search processing on the object of newObj and the object having the Object-ID set to currentObjId (process B of FIGS. 14A and 14B).

In performing the same-image search processing, currentRecordId can take a value other than 1 as an initial value. Here, assuming the case where the initial value of currentRecordId is set to 1 (S1401), the subsequent processing is described below. Even if the initial value of currentRecordId is a natural number other than 1, the same processing is executed. The duplicate image data detection unit 219 acquires the record content of RecordNo corresponding to currentRecordId from the Image XObject management table (S1402) and sets the record content to currentObj (S1403).

Next, the duplicate image data detection unit 219 compares the contents of newObj and currentObj (S1404). The duplicate image data detection unit 219 determines whether the values of Height in newObj and currentObj match (S1405). If YES in S1405, the duplicate image data detection unit 219 determines whether the values of Width match between newObj and currentObj (S1406).

If YES in S1406, the duplicate image data detection unit 219 determines whether the values of Length match between newObj and currentObj (S1407). If YES in S1407, the duplicate image data detection unit 219 determines whether the values of BitsPerComponent match between newObj and currentObj (S1408).

If YES in S1408, the duplicate image data detection unit 219 determines whether the values of ColorSpace match between newObj and currentObj (S1409). If YES in S1409, the duplicate image data detection unit 219 determines whether the values of Filter match between newObj and currentObj (S1410). If YES in S1410, the duplicate image data detection unit 219 determines whether the values of StreamHash match between newObj and currentObj (S1411).

Note that the hash value has a constant length regardless of the length of the original data. The same hash value is always obtained from the same data while a completely different hash value is obtained from even a little different data. Since the hash value is calculated through an irreversible calculation process including loss of information amount, the original data cannot be obtained from the hash value.

If YES in S1411, the duplicate image data detection unit 219 determines whether the Stream data matches (S1412). Since it is extremely rare that the same hash value is obtained from different Stream data, it is possible to omit the processing of S1412 to speed up the same-image search processing.

If YES in S1412 (or S1411), the duplicate image data detection unit 219 returns the value of currentRecordId (S1413). On the other hand, in the case of NO in any of the processing from S1405 to S1412, the duplicate image data detection unit 219 increments the currentRecordId by 1 (S1414). If there is a next object (YES in S1415), the duplicate image data detection unit 219 repeats the processing from S1402. If there is no next object, the duplicate image data detection unit 219 returns "0" indicating that there is no same image data as a result of the same-image search processing (S1416).

If YES in S1412 (or S1411), the value of currentRecordId is returned as the result of the same-image search processing (S1413). This indicates that the same image data as the Object-ID corresponding to RecordNo of currentRecordId exists (YES at S1501).

At this time, the duplicate image data detection unit 219 sets the Object-ID of currentRecordId to foundObjId (S1503). In the record of the Object-ID=currentObjId in the Image XObject management table, the duplicate image data detection unit 219 adds the value of foundObjId to the SameObjList [ ] field indicating an object including the same image data (S1504).

If there is a next object (YES in S1505), the duplicate image data detection unit 219 executes the same processing from S1302 again. If there is no next object (NO in S1505), the duplicate image data detection unit 219 terminates the current process.

In the case of NO in S1501, it indicates that there is an object including image data different from the object indicated by the Object-ID corresponding to RecordNo of currentRecordId. At this time, the duplicate image data detection unit 219 adds a new object to the Image XObject management table (S1502).

If there is a next object (YES in S1505), the duplicate image data detection unit 219 executes the same processing from S1302 again. If there is no next object (NO in S1505), the duplicate image data detection unit 219 terminates the current process.

Figure 16A:
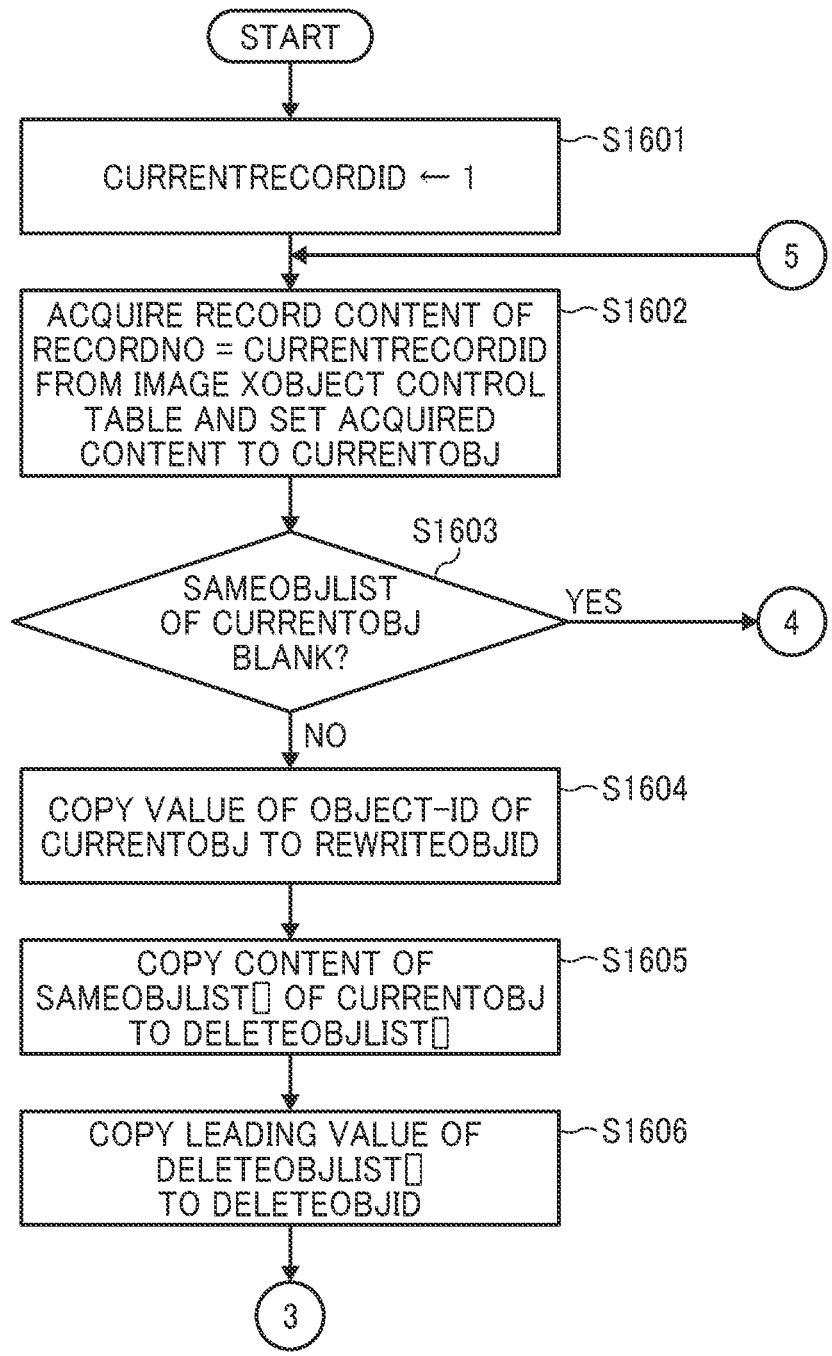
FIG. 16 (including FIGS. 16A and 16B) is a flowchart of a process of deleting duplicate image data according to an embodiment of the present disclosure.
Figure 16B:
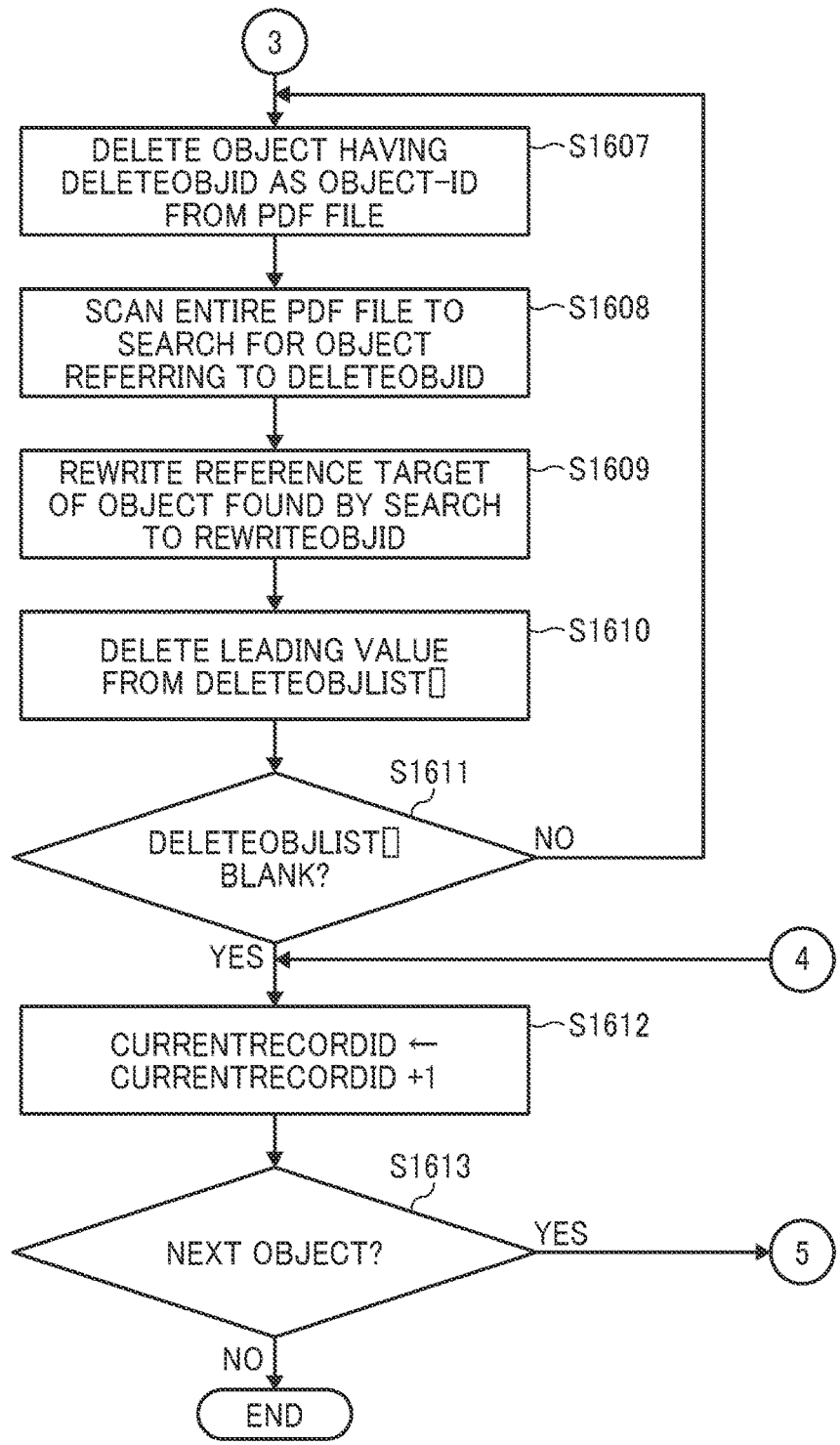

Next, a process of deleting duplicate image data is described. FIG. 16 (including FIGS. 16A and 16B) is a flowchart of a process of deleting duplicate image data according to the present embodiment. When duplicate image data is deleted, currentRecordId can take a value other than 1 as the initial value. Here, the subsequent processing is described assuming that the initial value of currentRecordId is 1 (S1601). Even if the initial value of currentRecordId is a natural number other than 1, the same processing is executed.

The duplicate image data deletion unit 220 acquires the record content of RecordNo=currentRecordId from the Image XObject management table and the record content to currentObj (S1602). If SameObjList [ ] is blank in the information list of currentObj (YES in S1603), the duplicate image data deletion unit 220 increments currentRecordId by 1 (S1612).

If the next object exists (YES in S1613), the duplicate image data deletion unit 220 executes the same processing from S1602 again. If the next object does not exist (NO in S1613), the duplicate image data deletion unit 220 terminates the current process.

When SameObjList [ ] is not blank in the information list of currentObj (NO in S1603), the duplicate image data deletion unit 220 copies the value of the Object-ID of currentObj to rewriteObjId that is information for rewriting the reference destination of the object (S1604). Next, the duplicate image data deletion unit 220 copies the content of SameObjList [ ] of currentObj to the field of deleteObjList [ ] that is information for deleting an object (S1605).

Next, the duplicate image data deletion unit 220 copies the first value of deleteObj List [ ] to deleteObjId (S1606). The duplicate image data deletion unit 220 deletes, from the PDF file 301, the object having the same Object-ID value as the value of deleteObjId (S1607). The duplicate image data deletion unit 220 also scans the entire PDF file 301 and searches an object referring to deleteObjId (S1608). Accordingly, the duplicate image data deletion unit 220 functions as a duplicate image information search unit.

The duplicate image data deletion unit 220 rewrites the reference destination of the object found by the search to rewriteObjId (S1609) and deletes the first value of deleteObjList [ ] (S1610). Accordingly, the duplicate image data deletion unit 220 also functions as an identification information rewriter.

When deleteObjList [ ] is not blank, that is, a value is described in deleteObjList [ ] (NO in S1611), the duplicate image data deletion unit 220 executes the same processing from S1607 again.

When deleteObjList [ ] is blank (YES in S1611), the duplicate image data deletion unit 220 increments currentRecordId by 1 (S1612). By rewriting the reference destination of the object found by the search to rewriteObjId, the Object-ID of currentObj, that is, one piece of image data can be used. Then, the same processing as in S1613 is performed.

As described above, the preflight processing unit 204 according to the present embodiment can detect duplicate same image data in a PDF file even when the information for identifying the object is different. Therefore, in the preflight processing unit 204, the image data determined to be duplicate image data is handled as a subject of object caching in the rendering processing unit 218. Such a configuration allows the rendering processing to be efficiently executed on a reusable object of the image data.

Figure 17:
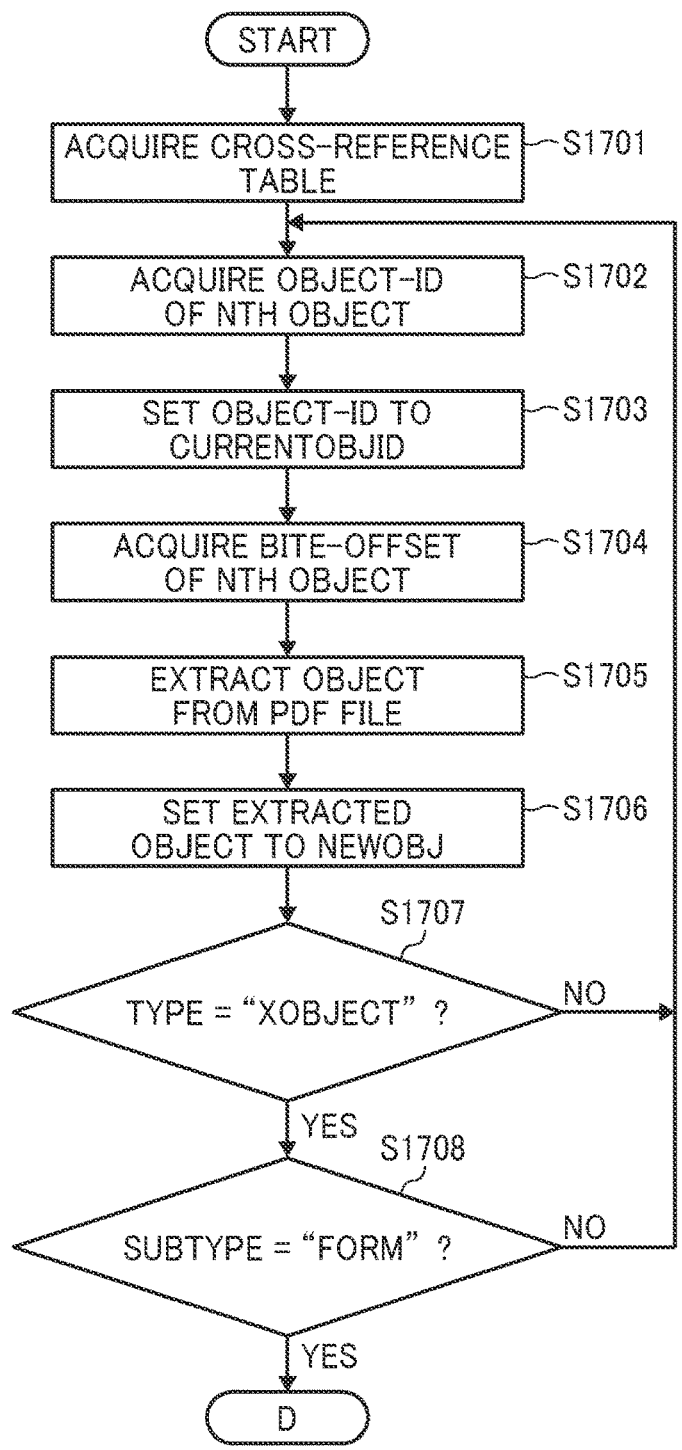
FIG. 17 is a flowchart of a process of detecting duplicate drawing commands according to an embodiment of the present disclosure.
Figure 18A:
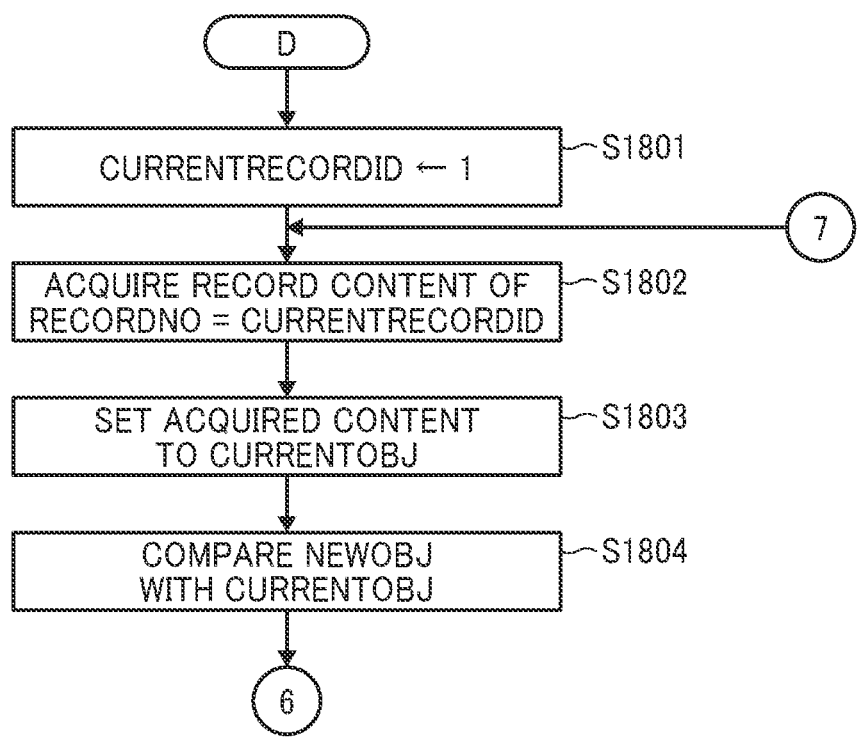
FIG. 18 (including FIGS. 18A and 18B) is a flowchart of a process of detecting duplicate drawing commands according to an embodiment of the present disclosure.
Figure 19:
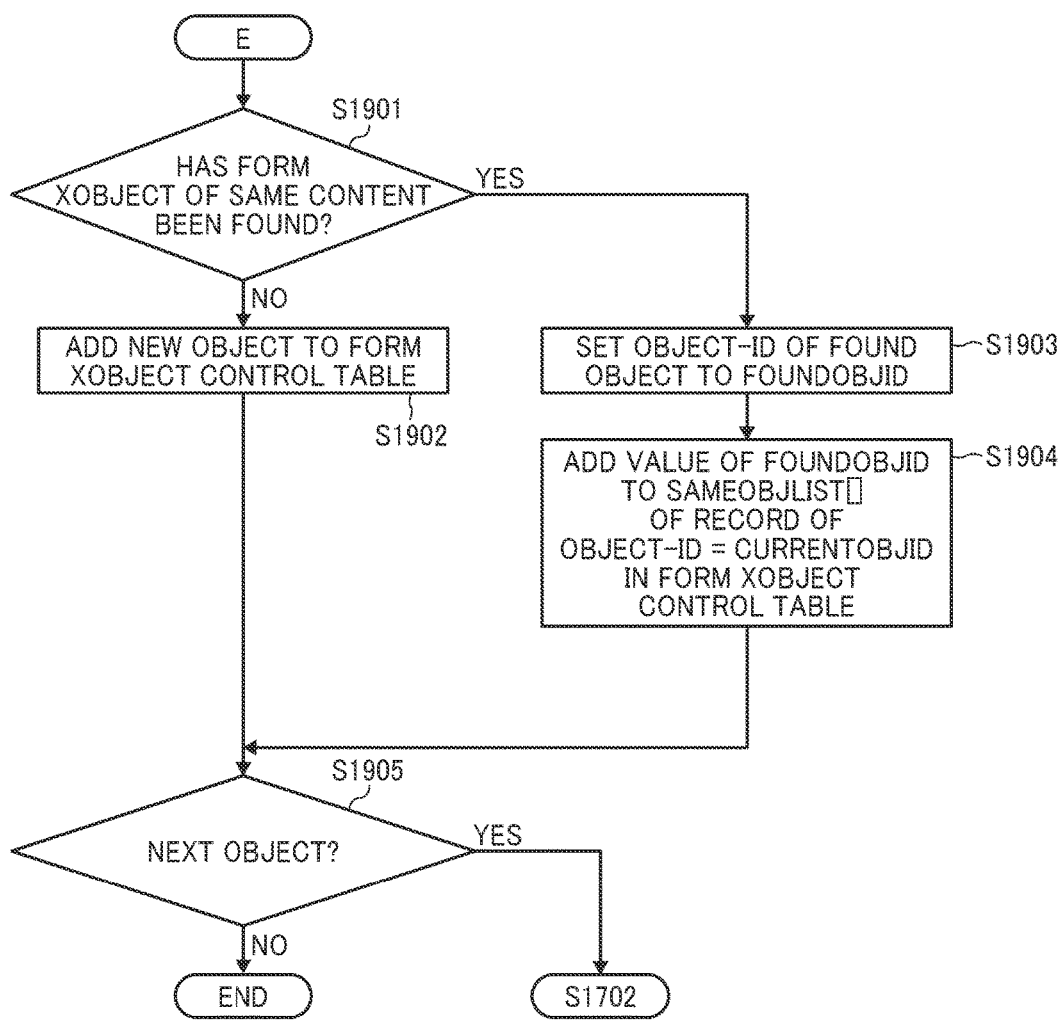
FIG. 19 is a flowchart of a process of detecting duplicate drawing commands according to an embodiment of the present disclosure.

Next, a process of detecting a duplicate drawing command is described. FIGS. 17 to 19 are flowcharts of a flow of processing of detecting duplicate image data according to the present embodiment. As described above, the PDF file 301 includes a cross-reference table indicating the positions of objects included in the PDF file 301 to cope with random access. The duplicate drawing command detection unit 221 functioning as a duplicate drawing instruction information detector acquires the cross reference table from the PDF file 301 (S1701).

The duplicate drawing command detection unit 221 acquires the Object-ID of the object from the cross reference table (S1702) and sets the Object-ID to currentObjId (S1703). In the first detection processing of the duplicate drawing command, the duplicate drawing command detection unit 221 assigns a dummy or invalidated Object-ID to the Object-ID whose RecordNo is set to 0, that is, set to currentObjId.

Next, in S1704, the duplicate drawing command detection unit 221 acquires, from the cross reference table, a byte offset that is position information of the object having the Object-ID set in the currentObjId in the processing of S1703. The duplicate drawing command detection unit 221 extracts an object at the position of the object of the Object-ID from the PDF file 301 (S1705), and sets the extracted object to newObj as information indicating an object to be compared (S1706).

The duplicate drawing command detection unit 221 confirms the information of newObj. For example, the duplicate drawing command detection unit 221 determines whether Type of newObj is "XObject" (S1707), and confirms whether Subtype is "Form" (S1708). Through such process, the duplicate drawing command detection unit 221 determines whether the object extracted in S1705 is "Form XObject".

In the case of NO in either S1707 or S1708, the duplicate drawing command detection unit 221 executes the processing from S1702 again. Accordingly, at the time of detecting the duplicate drawing image for the first time, the duplicate drawing command detection unit 221 extracts a dummy or invalidated object from the byte offset of the object having the dummy or invalidated Object-ID. Accordingly, in the first detecting processing of the duplicate drawing command, the duplicate drawing command detection unit 221 executes the processing from S1702 again.

If YES in S1707 and YES in S1708, newObj is "Image XObject". The duplicate drawing command detection unit 221 executes the same drawing command search processing in the object of newObj and the object having the Object-ID set to currentObjId (D of FIGS. 18A and 18B).

In executing the same drawing command search processing, the subsequent processing is described assuming that currentRecordId is 1 (S1801). The duplicate drawing command detection unit 221 acquires the record content of RecordNo corresponding to currentRecordId from the Image XObject management table (S1802) and sets the record content to currentObj (S1803).

Next, the duplicate drawing command detection unit 221 compares the contents of newObj and current Obj (S1804). The duplicate drawing command detection unit 221 determines whether Form Type matches between newObj and currentObj (S1805). If YES in S1805, the duplicate drawing command detection unit 221 determines whether the values of B Box match between newObj and currentObj (S1806).

If YES in S1806, the duplicate drawing command detection unit 221 determines whether the values of Matrix match between newObj and currentObj (S1807). If YES in S1807, the duplicate drawing command detection unit 221 determines whether the values of ResourcesHash match between newObj and currentObj (S1808). If YES in step S1808, the duplicate drawing command detection unit 221 determines whether StreamHash matches (S1809).

"Resource dictionary data" is information indicating character shapes and characteristics for drawing fonts included in a form. If YES in S1809, the duplicate drawing command detection unit 221 determines whether the entire Resource dictionary data matches between newObj and currentObj (S1810). Since it is extremely rare that the same hash value is obtained from different Stream data, in the case of YES in S1808, it is possible to omit the processing in S1810 to speed up the same drawing command search processing.

"Stream data" is stream data of a drawing command included in an object. If YES in S1810, the duplicate drawing command detection unit 221 determines whether the Stream data matches (S1811). Since it is extremely rare for the same hash value to be obtained from different Stream data, in the case of YES in S1809, it is possible to omit the processing in S1811 to speed up the same drawing command search processing.

If YES in S1811 (or S1809), the duplicate drawing command detection unit 221 returns the value of currentRecordId (S1812). On the other hand, in the case of NO in any processing from S1805 to S1811, the duplicate drawing command detection unit 221 increments the currentRecordId by 1 (S1813). If there is a next object (YES in S1814), the duplicate drawing command detection unit 221 repeats the processing from S1802 again. If there is no next object, the duplicate drawing command detection unit 221 returns "0" indicating that there is no same drawing command as a result of the same drawing command search processing (S1815).

If YES in S1811 (or S1809), the duplicate drawing command detection unit 221 returns the value of currentRecordId as the result of the same drawing command search processing (S1812). This indicates the presence of the same drawing command as the Object-ID corresponding to RecordNo of currentRecordId (YES in S1901).

At this time, the duplicate drawing command detection unit 221 sets the Object-ID of currentRecordId to foundObjId (S1903). In the record of the Object-ID=currentObjId in the Form XObject management table, the duplicate drawing command detection unit 221 adds the value of foundObjId to the SameObjList [ ] field indicating the object including the same drawing command (S1904).

When there is a next object (YES in S1905), the duplicate drawing command detection unit 221 executes the same processing from S1702 again. When there is no next object (NO in S1905), the duplicate drawing command detection unit 221 terminates the current process.

In the case of NO in S1901, it indicates that there is an object including a drawing command different from the object indicated by the Object-ID corresponding to RecordNo of currentRecordId. In such a case, the duplicate drawing command detection unit 221 adds a new object to the Form XObject management table (S1902).

If there is a next object (YES in S1905), the duplicate drawing command detection unit 221 executes the same processing from S1702 again. When there is no next object (NO in S1905), the duplicate drawing command detection unit 221 terminates the current process.

Figure 20B:
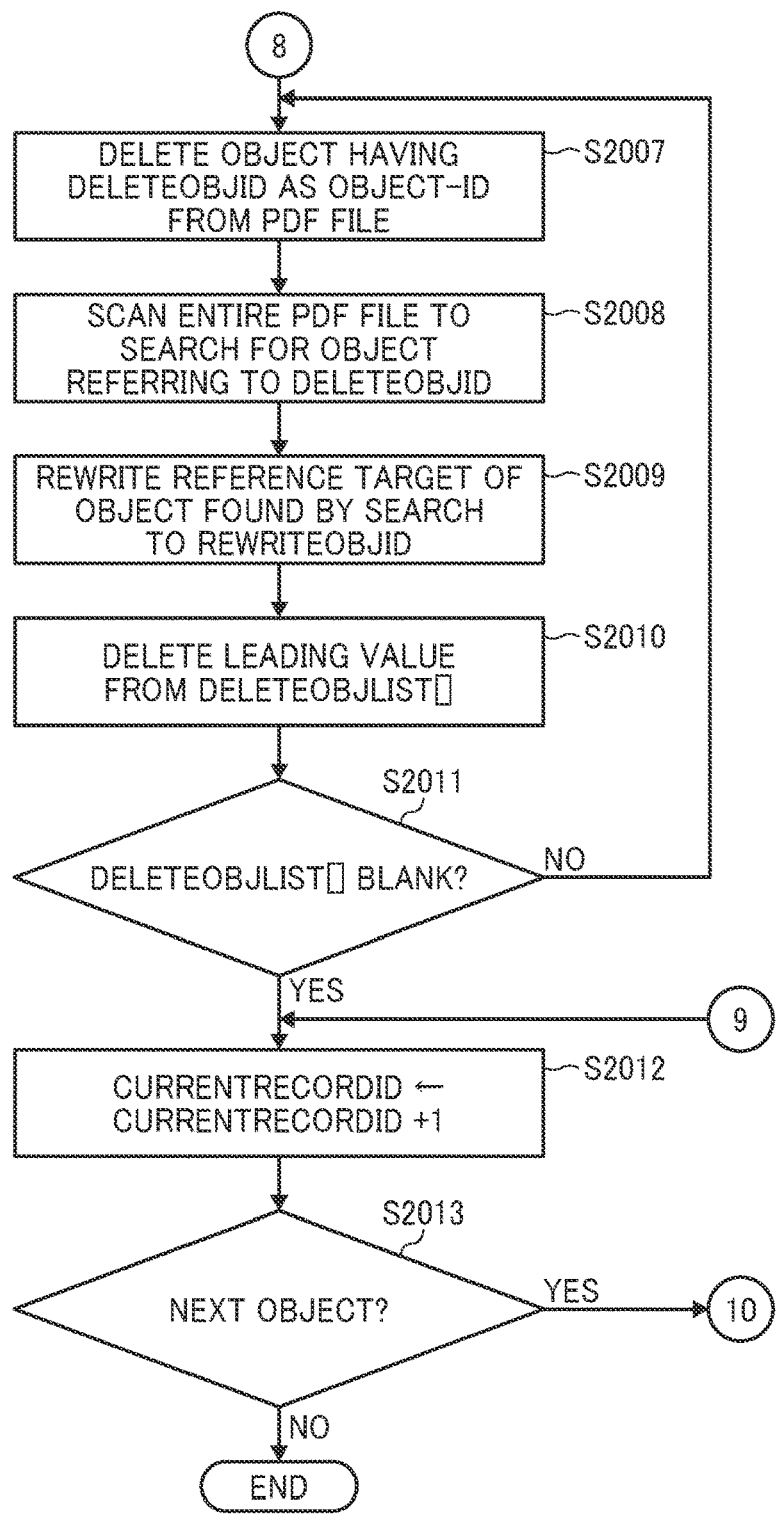
FIG. 20 (including FIGS. 20A and 20B) is a flowchart of a process of deleting duplicate drawing commands according to an embodiment of the present disclosure.

Next, a process of deleting a duplicate drawing command is described. FIG. 20 is a flowchart of a process of deleting a duplicate drawing command according to the present embodiment. In deletion of the duplicate drawing command, the subsequent processing is described assuming that currentRecordId is 1 (S2001).

The duplicate drawing command deletion unit 222 acquires the record content of RecordNo=current RecordId from the Form XObject management table and sets the record content to currentObj (S2002). When SameObjList [ ] in the information list of currentObj is blank (YES in S2003), the duplicate drawing command deletion unit 222 increments currentRecordId by 1 (S2012).

If the next object exists (YES in S2013), the duplicate drawing command deletion unit 222 executes the same processing from S2002 again. If the next object does not exist (NO in S2013), the duplicate drawing command deletion unit 222 terminates the current process.

When SameObjList [ ] is not blank in the information list of currentObj (NO in S2003), the duplicate drawing command deletion unit 222 copies the value of the Object-ID of currentObj to rewriteObjId that is information for rewriting the reference destination of the object (S2004). Next, the duplicate drawing command deletion unit 222 copies the content of SameObjList [ ] of currentObj to the field of deleteObjList [ ] that is information for deleting an object (S2005).

Next, the duplicate drawing command deletion unit 222 copies the first value of deleteObjList [ ] to deleteObjId (S2006). The duplicate drawing command deletion unit 222 deletes, from the PDF file 301, the object whose value of the Object-ID is the same as the value of deleteObjId (S 2007). The duplicate drawing command deletion unit 222 further scans the entire PDF file 301 and searches an object referring to deleteObjId (S2008). Accordingly, the duplicate drawing command deletion unit 222 functions as a duplicate drawing instruction information search unit.

The duplicate drawing command deletion unit 222 rewrites the reference destination of the object found by the search to rewriteObjId (S2009) and deletes the first value of deleteObjList [ ] (S2010). Accordingly, the duplicate drawing command deletion unit 222 functions as an identification information rewriter.

When deleteObjList [ ] is not blank, that is, some value is described in deleteObjList [ ] (NO in S2011), the duplicate drawing command deletion unit 222 executes the same processing from S2007 again.

When deleteObjList [ ] is blank (YES in S2011), the duplicate drawing command deletion unit 222 increments currentRecordId by 1 (S2012). By rewriting the reference destination of the object found by the search to rewriteObjId, the Object-ID of currentObj, that is, one drawing command can be used. Then, the same processing as in S2013 is performed.

As described above, the preflight processing unit 204 according to the present embodiment can detect duplicate same drawing commands in a PDF file even when the information for identifying the object is different. Therefore, in the preflight processing unit 204, the rendering processing unit 218 handles a drawing command determined to be a duplicate drawing command as a subject of object caching. Such a configuration allows the rendering processing to be efficiently executed on a reusable object of the drawing command.

Figure 21B:
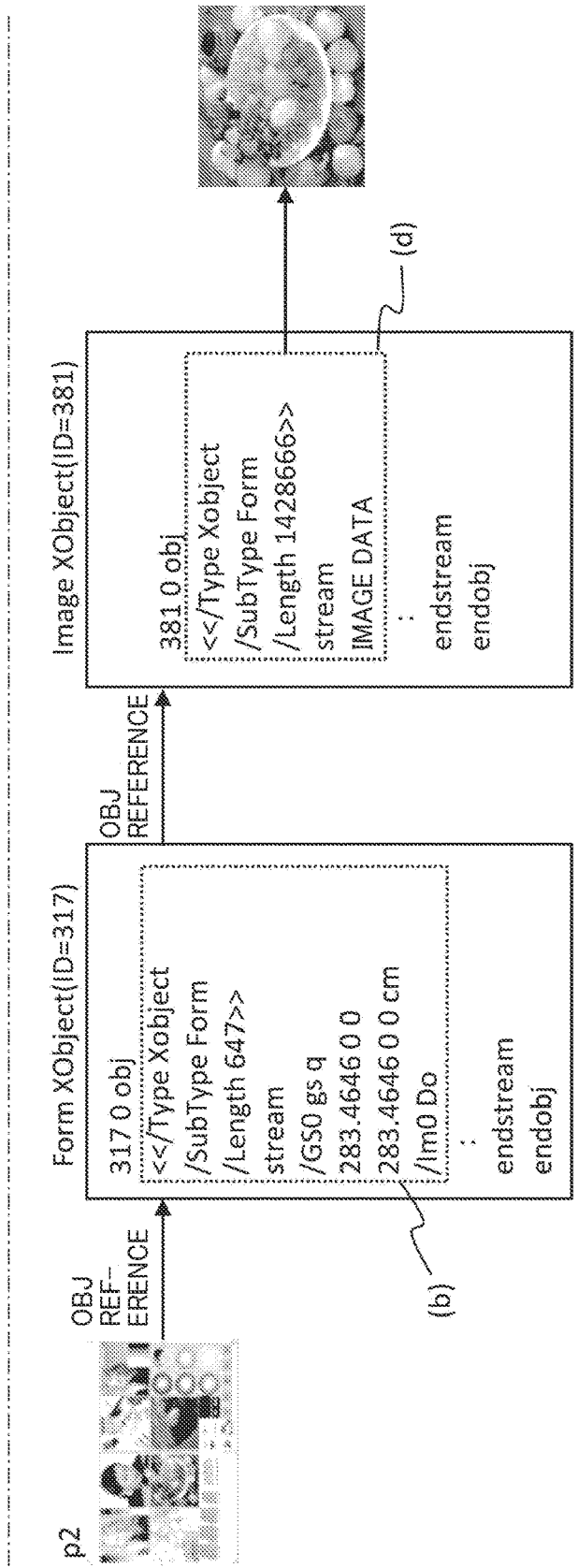
FIG. 21 (including FIGS. 21A and 21B) is a diagram of an example of a PDF format file according to an embodiment of the present disclosure.

FIG. 21 (including FIGS. 21A and 21B) exemplifies the structure of a PDF file 301 including Image XObject and Form XObject that have the same contents and different Object-IDs. As illustrated in (a) of FIG. 21A and (b) of FIG. 21B, p1 and p2 have the same Form XObject but different Object-IDs.

At this time, the duplicate drawing command deletion unit 222 deletes the Form XObject of (b), and adds the Object-ID of the Form XObject of (b) to the SameObjList [ ] field in the Form XObject management table of the Form XObject of (a). Such a configuration allows the rendering processing to be efficiently executed on p2.

Furthermore, as illustrated in (c) of FIG. 21A and (d) of FIG. 21B, p1 and p2 include the same Image XObject and different Object-IDs. At this time, the duplicate image data deletion unit 220 deletes the Image XObject of (d) and adds the Object-ID of the Image XObject of (d) to the SameObjList [ ] field in the Image XObject management table of the Image XObject of (c). Such a configuration allows the rendering processing to be further efficiently executed on p2.

As described above, in the present embodiment, when the same image data or drawing command is detected in a file in PDF format, an object selected from one of the image data and the drawing command is left. In this way, by increasing the number of reusable objects in the PDF file, it is possible to further enhance the effect of object caching, thus allowing rendering processing in DFE to be efficiently executed.

In the PDF format file, even with the same image data and drawing command, object caching cannot be performed in a conventional DFE when the object identification information is different.

For example, when a document is created and edited using an office application program, such as Microsoft Office, on a personal computer (PC), and a Microsoft Word document is converted into a PDF file, a PDF creation program, such as Adobe Acrobat or Cube PDF, is used.

In a PDF file created by using a so-called printer driver type PDF creation program capable of generating a PDF file simply by printing a document to be converted into a PDF file on the application program as described above, a PDF file in which objects different in identification information for identifying an object exists are likely to be generated from even the same image data.

Even with the same image data, if object identification information is different, object caching cannot be applied to the objects of the image data, thus hampering efficient execution of RIP.

However, in the present embodiment, object caching can be performed on such an object having different identification information. Accordingly, more efficient rendering processing can be executed.

Note that the configuration of the preflight processing unit 204 may be expanded as illustrated in FIG. 22 to delete redundant image data included in an input PDF file 301 and output a PDF file 302 with a reduced data size. Such a configuration allows the PDF file 302 to be output with the data size of the PDF file 301 reduced without affecting the rendering result.

By incorporating the preflight processing unit 204 having the configuration illustrated in FIG. 22 into an existing DFE, similarly to the present embodiment, the object caching can be performed when objects have the same image data and drawing command but different identification information. Accordingly, the DFE 100 including the preflight processing unit 204 according to the present embodiment also functions as an image information editing device.

FIG. 25 (including FIGS. 25A to 25H) is a diagram of examples of a printer main unit 2111 and a peripheral device 2113 in an embodiment of the present disclosure. FIG. 25A illustrates the printer main unit 2111. The printer main unit 2111 is a device having a function of forming and fixing an image on a print sheet based on drawing data included in a print job. The printer main unit 2111 also includes a printer display device 2112 having a function as an operation unit, and can display an execution status of print job, error contents, various setting screens, and the like.

Figure 25A:
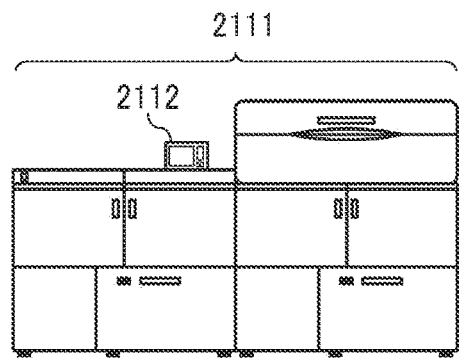
FIGS. 25A, 25B, 25C, 25D, 25E, 25F, 25G, and 25H are diagrams of examples of a printer main unit and peripheral devices according to an embodiment of the present disclosure.
Figure 25B:
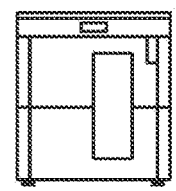
Figure 25C:
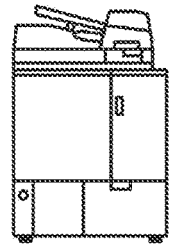
Figure 25D:
Figure 25E:
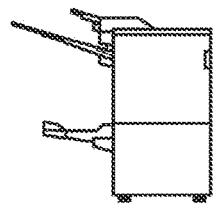
Figure 25F:
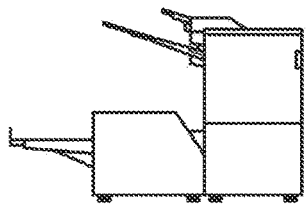
Figure 25G:
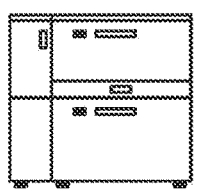
Figure 25H:
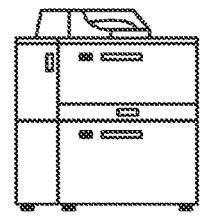

FIGS. 25B to 25H illustrate peripheral devices 113 having various functions, which are optional devices of a printing apparatus 2110. FIG. 25B is an illustration of a stacker to discharge printed materials to a carriage so as to be collectively brought out. FIG. 25C is an illustration of a case binding machine to wrap printed materials with a cover set on a top and bind the wrapped printed materials. FIG. 25D is an illustration of an inserter to insert another sheet between printed sheets. FIG. 25E is a finisher to perform stapling and punching on a printed material. FIG. 25F is an illustration of a finisher with a trimmer that has the finisher function illustrated in FIG. 25E and can cut three sides of a printed matter into a desired size. FIG. 25G is an illustration of a large-capacity sheet feed tray compatible with various sheet sizes. FIG. 25H is a large-capacity sheet feed tray with a bypass tray that includes the large-capacity sheet feed tray illustrated in FIG. 25G and a bypass tray.

The printing apparatus 2110 may have a configuration of a combination of the printer main unit 2111 and the peripheral devices 113 illustrated in FIG. 25. Note that the printing apparatus 2110 may not include the peripheral devices 113, and the printing apparatus 2110 may be configured by only the printer main unit 2111. In the present embodiment, a printing system 2100 includes a combination of a DFE 2121, a workflow PC 2131, and the printing apparatus 2110. Note that the peripheral devices 113 illustrated in FIG. 25 are examples and the printing system 2100 may include peripheral devices other than the peripheral devices 113 illustrated in FIG. 25.

FIGS. 26A and 26B are illustrations of examples of a schematic configuration of hardware of the entire printing system 2100 according to an embodiment of the present disclosure. In FIGS. 26A and 26B, the configuration of the peripheral devices 113 of the printing apparatus 2110 is different.

The printing system 2100 of FIGS. 26A and 26B includes the printing apparatus 2110, the DFE 2121, and the workflow PC 2131 that are connected to communicate with each other according to various communication protocols, such as HTTP, FTP, SMB, and NFS. Similarly to the printer main unit 2111, the DFE 2121 and the workflow PC 2131 also include a DFE display device 2122 and a workflow-PC display device 2132, respectively.

The printing apparatus 2110 is an apparatus that executes a print job, and forms an image with the printer main unit 2111, and performs various processing on a printed matter with the peripheral devices 113. Note that the configuration of the printing apparatus 2110 is not limited to the configurations illustrated in FIGS. 26A and 26B. The configuration of the printing apparatus 2110 having a desired function(s) can be adopted by combining various peripheral devices 113.

The DFE 2121 is an information processing apparatus as a control apparatus that expands a print job sent from the workflow PC 2131, creates drawing data, and instructs the printer main unit 2111 to execute printing. The workflow PC 2131 is an information processing apparatus that performs various types of edit processing, such as imposition, on a print target file created by a user, and transmits the print target file to the DFE 2121 as a print job. The information processing apparatus used as the DFE 2121 and the workflow PC 2131 may be a dedicated terminal or a generally-used personal computer terminal. Each of the DFE display device 2122 and the workflow-PC display device 2132 performs display similarly to the printer display device 2112, and also can display screens according to the functions of the DFE 2121 and the workflow PC 2131.

Figure 27:
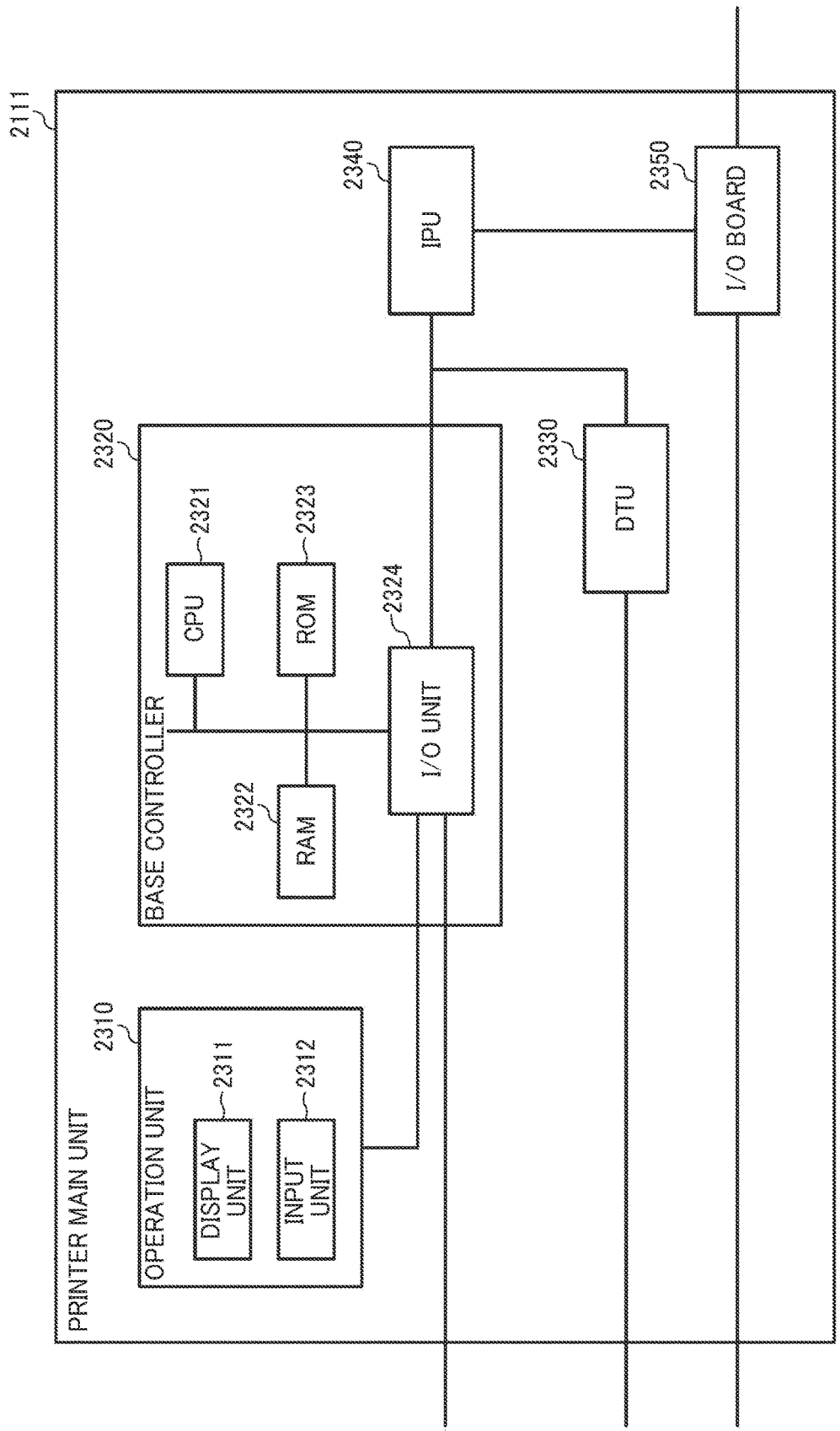
FIG. 27 is a diagram of a hardware configuration included in the printer main unit according to an embodiment of the present disclosure.
Figure 28A:
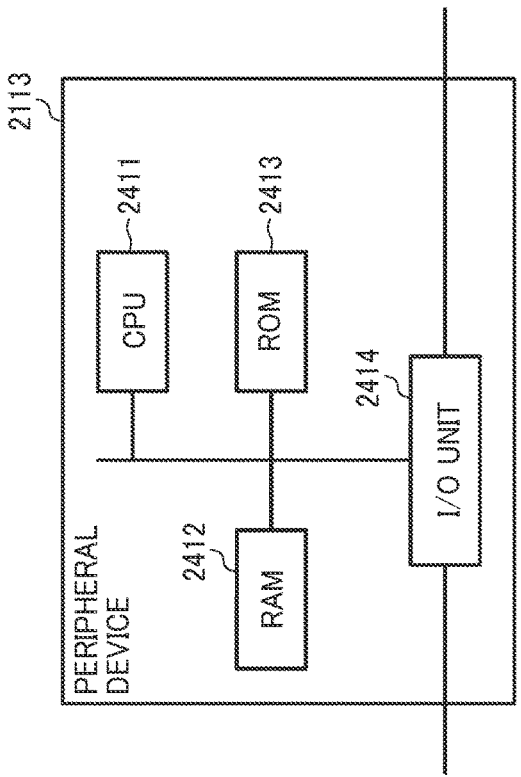
FIGS. 28A and 28B are diagrams of configurations of hardware included in a peripheral device and a DFE according to an embodiment of the present disclosure.
Figure 28B:
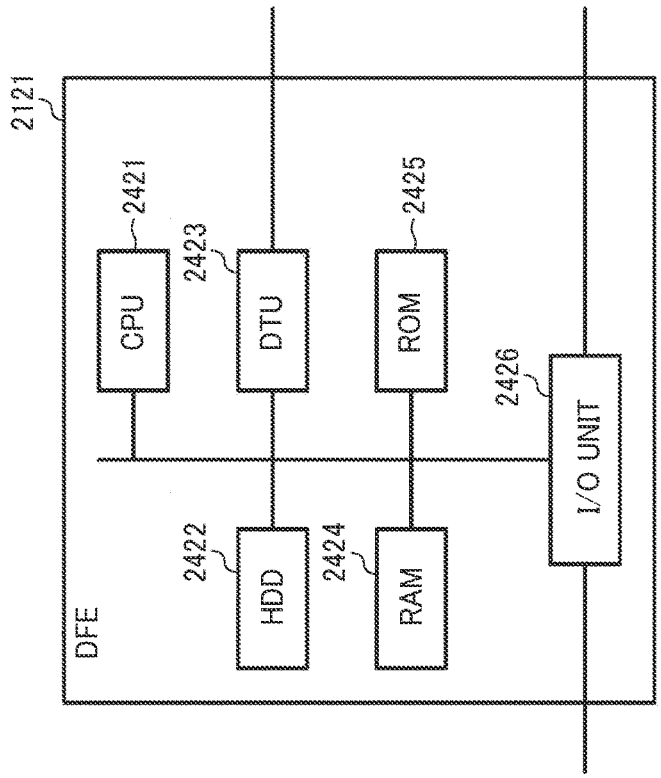

Next, a hardware configuration included in each apparatus constituting the printing system 2100 of the present embodiment is described with reference to FIGS. 27, 28A, and 28B. FIG. 27 is a diagram of a configuration of hardware included in the printer main unit 2111 of the present embodiment. FIG. 28A is a diagram of a configuration of hardware included in the peripheral device 2113. FIG. 28B is a diagram of a configuration of hardware included in the DFE 2121.

First, a description is given of FIG. 27. The printer main unit 2111 includes an operation unit 2310, a base controller 2320, a data transfer unit (DTU) 2330, an image processing unit (IPU) 2340, and an input-and-output (I/O) board 2350.

The operation unit 2310 is a user interface unit to operate the printer main unit 2111 and includes a display unit 2311 and an input unit 2312. The display unit 2311 corresponds to the printer display device 2112 described above. A user can operate the printer main unit 2111 by operating the input unit 2312.

The base controller 2320 is a unit that controls the DTU 2330 and the IPU 2340 by a command transmitted by the DFE 2121 and an operation of the operation unit 2310 and includes a CPU 2321, a RAM 2322, a ROM 2323, and an I/O unit 2324. The CPU 2321 is a device that executes programs to control operations of the printer main unit 2111. The RAM 2322 is a volatile storage device to provide an execution space of a program executed by the printer main unit 2111, and is used to store and expand programs and data.

The ROM 2323 is a nonvolatile storage device to store programs and data executed by the printer main unit 2111, and may have a function as a storage. The I/O unit 2324 is an interface to connect the base controller 2320 to other units, and performs communication by PCI-Express (PCIe), Gigabit Ethernet (GbE), or the like. The I/O unit 2324 is connected to, for example, the DFE 2121 and exchanges commands, status, and the like.

The DTU 2330 receives data to be printed from the DFE 2121 and transfers the data to the IPU 2340. The IPU 2340 expands the data transferred by the DTU 2330 into drawing data. The I/O board 2350 transmits the drawing data to another peripheral device 2113, and controls the operation of the peripheral device 2113.

For example, the DTU 2330 receives image data to be printed from the DFE 2121 and transfers the image data to the IPU 2340. The IPU 2340 performs various image processing, such as density adjustment and edge correction, on the image data transferred by the DTU 2330. The I/O board 2350 controls the operation of the entire printing apparatus 2110 by exchanging various control commands and status notifications on the peripheral device side with other peripheral devices 113. As an example, the I/O board 2350 is connected to a sheet feed tray, a finisher, etc., and controls sheet conveyance, post-processing of printed matter, and the like.

Next, FIG. 28A is described. The peripheral device 2113 includes a CPU 2411, a RAM 2412, a ROM 2413, and an I/O unit 2414. Since the CPU 2411, the RAM 2412, and the ROM 2413 are functions corresponding to the functions of the above-described printer main unit 2111, detailed descriptions thereof are omitted below. The I/O unit 2414 is an interface that connects to and communicates with other devices. Examples of the connection destination of the I/O unit 2414 are the printer main unit 2111, peripheral devices in upstream processes, peripheral devices in downstream processes, and the like. Note that the peripheral devices 113 include hardware corresponding to the function of each device besides the hardware illustrated in FIG. 28A.

Next, FIG. 28B is described. The DFE 2121 includes a CPU 2421, an HDD 2422, a DTU 2423, a RAM 2424, a ROM 2425, and an I/O unit 2426. Since the CPU 2421, the DTU 2423, the RAM 2424, and the ROM 2425 are functions corresponding to the functions of the above-described printer main unit 2111, detailed descriptions thereof are omitted.

The HDD 2422 is a storage that stores an operating system (OS) of the DFE 2121, various programs, data, and the like. Note that such a storage is not limited to the HDD 2422 and, for example, a solid state drive (SSD) having a similar storage function can be used instead of the HDD. The I/O unit 2426 is an interface to communicate with the printer main unit 2111 and the workflow PC 2131. In the I/O unit 2426, for example, commands, such as a print job, the status of the printing apparatus 2110, and so on are communicated by PCIe, GbE, or the like.

Figure 29:
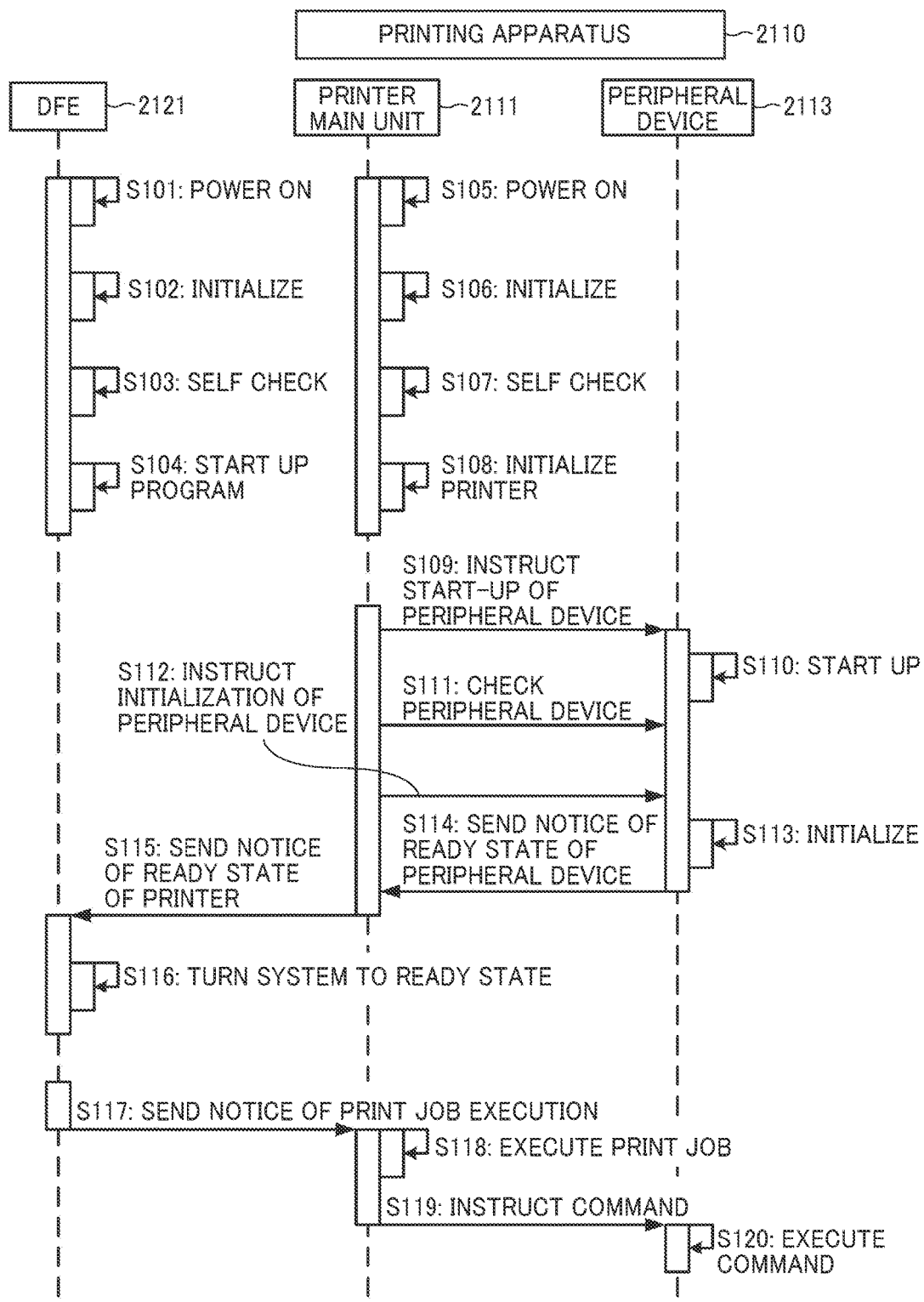
FIG. 29 is a sequence diagram of processing executed by the printing system according to an embodiment of the present disclosure.

Up to this point, the hardware included in the printing system 2100 according to the present embodiment is described above. Next, the processing executed in the present embodiment is described. FIG. 29 is a sequence diagram of processing executed by the printing system 2100 according to the present embodiment. In FIG. 29, the DFE 2121, the printer main unit 2111, and the peripheral device 2113 are illustrated.

First, the DFE 2121 turns on a power supply in step S101, initializes the device in step S102, performs self-diagnosis of the device in step S103, and starts the OS and system programs in step S104. Further, the printer main unit 2111 turns on a power supply in step S105, initializes, e.g., the base controller 2320 in step S106, performs self-diagnosis in step S107, and initializes, e.g., the fixing unit to form an image in step S108. Note that there is no particular limitation on the order of turning on the power of the DFE 2121 and turning on the power of the printer main unit 2111.

The printer main unit 2111 performs printer initialization in step S108, and instructs start-up of each peripheral device 2113 included in the printing apparatus 2110 in step S109. The peripheral device 2113 receives the start-up instruction and starts up in step S110. Further, in step S111, the printer main unit 2111 checks the peripheral device 2113 to acquire various information on the devices constituting the printing apparatus 2110, such as the number and functions of the peripheral devices connected to the printing apparatus 2110.

Such checking of the device configuration allows determination of whether the arrangement of the devices is appropriate. When the arrangement is not appropriate, the printer main unit 2111 displays an error to prompt a user to correct the error. Various kinds of data, such as image information for displaying its own device, configuration, guide, and jam processing, may be stored in the peripheral devices 113 in advance. When the printing system 2100 starts up, the printing apparatus 2110 may acquire such data from the peripheral devices 113.

In step S112, the printer main unit 2111 instructs each peripheral device 2113 to perform initialization. Receiving the initialization instruction, the peripheral device 2113 perform initialization in step S113. After the initialization, in step S114, the peripheral device 2113 sends to the printer main unit 2111 a notice that the peripheral device 2113 has normally started up and is in a ready state.

Receiving the notice of the ready state from the peripheral device 2113, in step S115, the printer main unit 2111 sends to the DFE 2121 a notice that the printer main unit 2111 and the peripheral device 2113 have normally started up and the printing apparatus 2110 is in a ready state, and waits for a print job from the DFE 2121. In step S116, the DFE 2121 enters a system ready state and waits for a print job from the workflow PC 2131.

Receiving the print job from the workflow PC 2131, the DFE 2121 sends to the printer main unit 2111 a notice of execution of the print job in step S117. In step S118, the printer main unit 2111 executes a print job from the DFE 2121. In step S119, based on the print job, the printer main unit 2111 instructs various commands on, e.g., sheet feeding and finishing processing to each peripheral device 2113. The peripheral device 2113 can perform a series of process of forming an image by executing the instructed commands in step S120.

Note that the workflow PC 2131 is a workflow software installed in a general personal computer terminal and can start up regardless of the processes illustrated in FIG. 29.

The processing executed by the printing system 2100 according to the present embodiment is described above. Meanwhile, when the above-described various processes are executed, the status of the printing system 2100 or the like may be displayed for the user. Examples of displaying the status include the system status, occurrence of a jam (sheet jam), error of the apparatus, and the like. To display such a status, to facilitate the visual capturing of, e.g., the occurrence of an error, it may be preferable to display the status together with, for example, a machine configuration diagram of the printing apparatus 2110, a diagram of jam processing, a guide diagram, and guide information. However, for the display devices with different numbers of pixels or different screen sizes, such as the printer display device 2112, the DFE display device 2122, the workflow-PC display device 2132, the visibility of the configuration diagram may be impaired in some cases.

Figure 30:
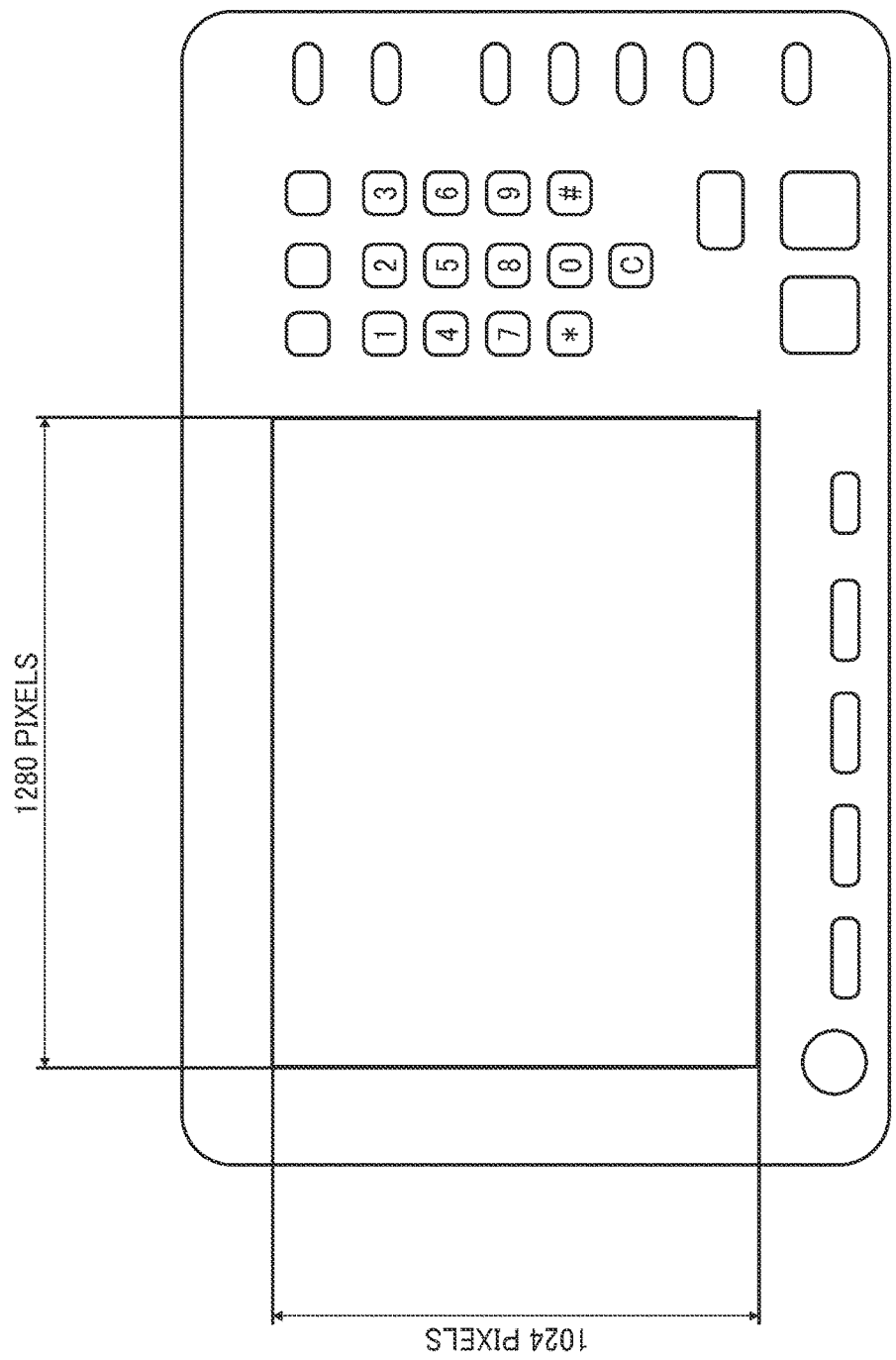
FIG. 30 is a diagram of an example of an operation unit of the printer main unit.

Here, a display device included in the printing system 2100 according to the present embodiment is described. FIG. 30 is a diagram of an example of the operation unit 2310 of the printer main unit 2111. The operation unit 2310 includes the printer display device 2112 as a display. In the printer display device 2112 illustrated in FIG. 30, the number of horizontal pixels is 1280, the number of vertical pixels is 1024, and the aspect ratio is 5:4.

Note that the number of pixels and the aspect ratio of the printer display device 2112 are not limited to the above-described values. For example, the number of horizontal pixels may be 800, the number of vertical pixels may be 600, and the aspect ratio may be 4:3.

On the other hand, as illustrated in FIGS. 31A and 31B, specifications, such as the size and the number of pixels, of each display device are generally different depending on the application. FIGS. 31A and 31B are diagrams of examples of specifications of each display device included in the printing system 2100 according to the present embodiment. FIG. 31A illustrates examples of the number of pixels and aspect ratio of each display device. FIG. 31B illustrates examples of the size of each display device.

For example, one printing system 2100 has various specifications, such as 8 inch with 1280×1024 pixels for the printer display device 2112, 16 inch with 1920×1080 pixels for the DFE display device 2122, and 22 inch with 1920×1200 pixels for the workflow-PC display device 2132. As described above, when different display devices having different unique specifications display an image based on single image display data in bitmap format, the visibility may be impaired.

Figure 32A:
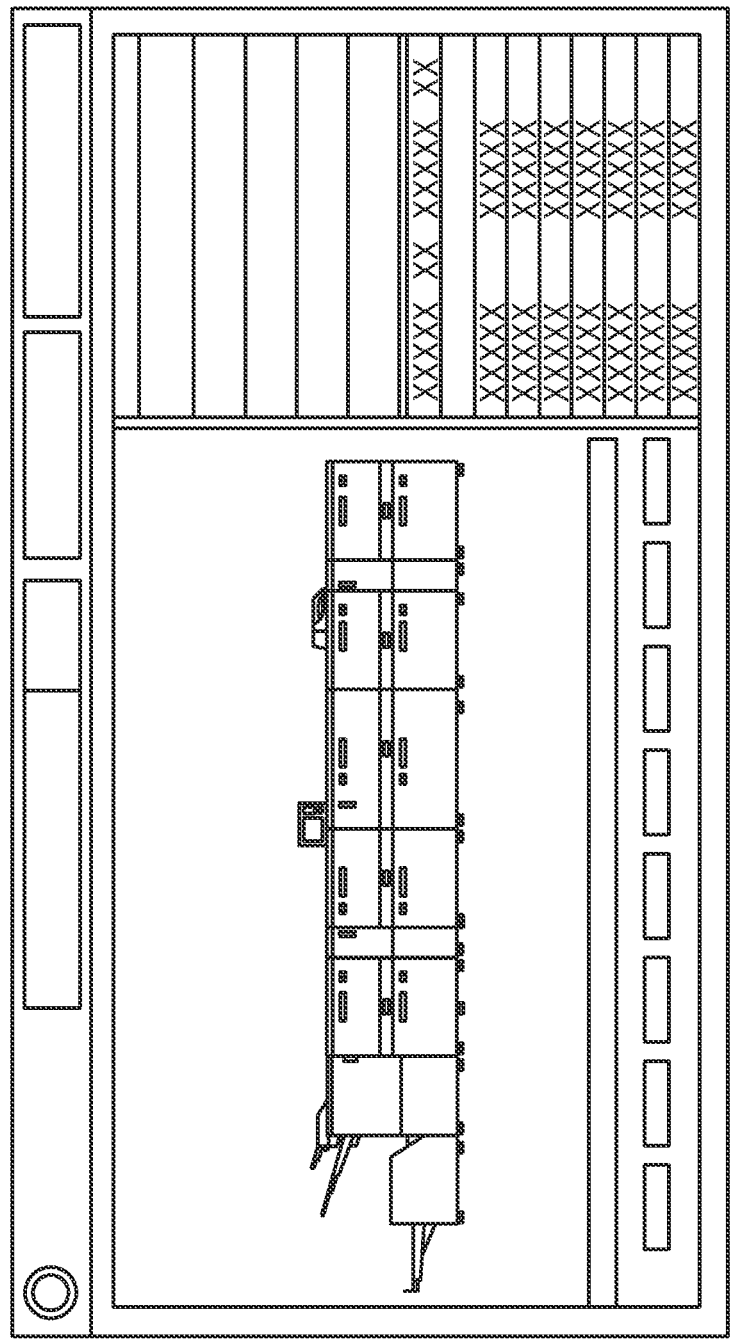
FIGS. 32A and 32B are diagrams of examples of an image of a machine configuration diagram displayed on a DFE display device.
Figure 32B:
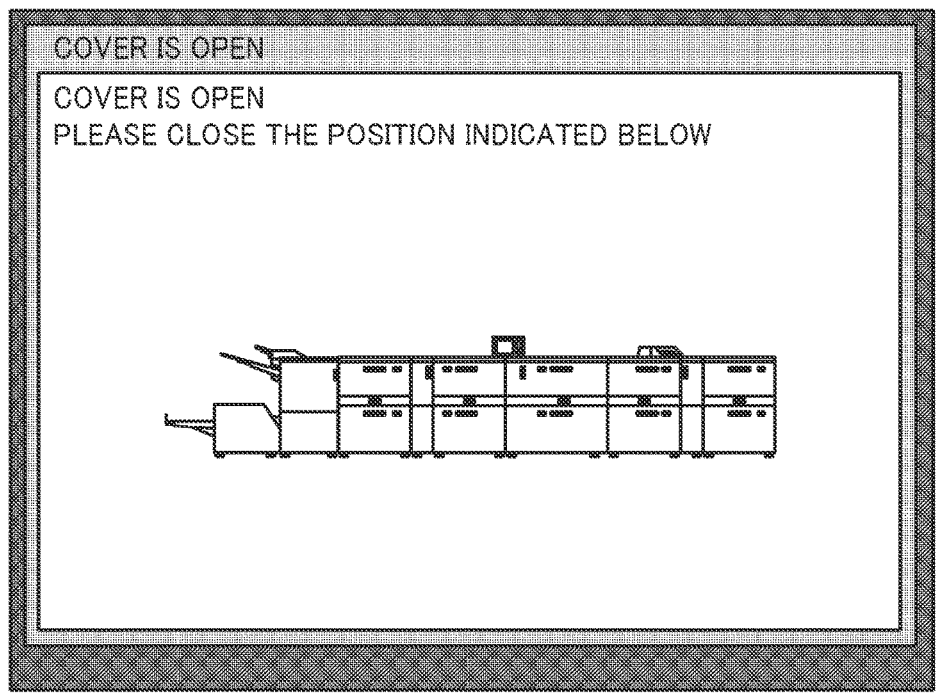

Below, a description is given of an example in which an image of the machine configuration diagram of the printing apparatus 2110 having the configuration illustrated in FIG. 26A is displayed on each display device. FIG. 32A is a diagram illustrating an example of an image of a machine configuration diagram displayed on the DFE display device 2122. FIG. 32B is a diagram illustrating an example of an image of a machine configuration diagram displayed on the printer display device 2112. In the DFE display device 2122 illustrated in FIG. 32A and the printer display device 2112 displayed in FIG. 32B, for example, the progress, status, and error message of the print job are displayed together with the machine configuration diagram of the printing apparatus 2110. However, for example, in a printing system, when the image display data of the machine configuration diagram of a printing apparatus is not stored in a storage of the apparatus connected to each display device, the machine configuration diagram cannot be displayed.

Figure 33:
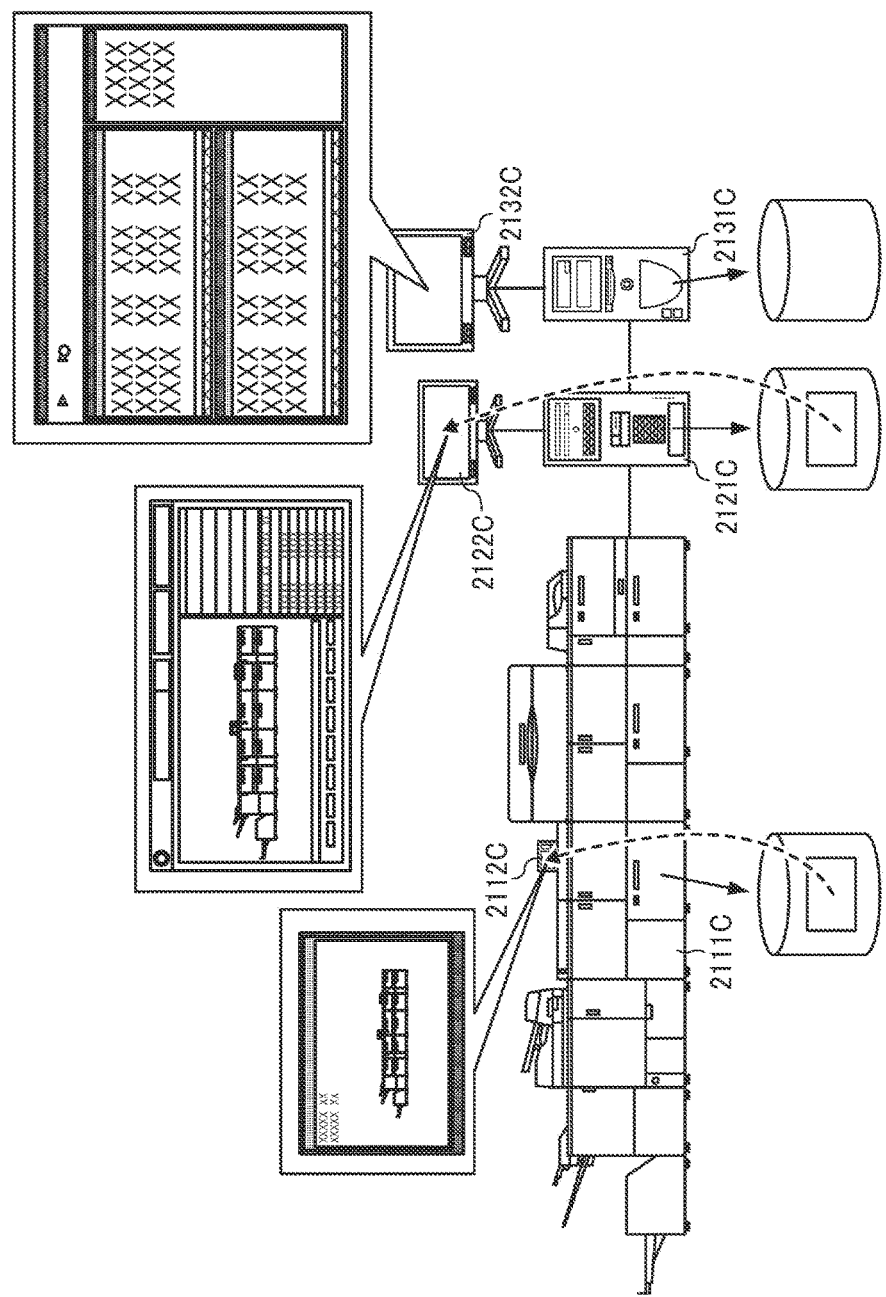
FIG. 33 is a diagram of an example of images displayed on display devices in a comparative example of a printing system.

FIG. 33 is a diagram of an example of displaying an image on each display device in a printing system 2100C according to a comparative example. As illustrated in FIG. 33, in the printing system 2100C according to the comparative example, the image display data of a machine configuration diagram displayed on a printer display device 2112C is stored in a storage of a printer main unit 2111C. The image display data of the machine configuration diagram displayed on a DFE display device 2122C is stored in the storage of a DFE 2121C. The image display data stored in each storage is image display data in bitmap format created according to specifications, such as the number of pixels, aspect ratio, and size, of the connected display device. Accordingly, as illustrated in FIG. 33, the image of a printing apparatus 2110C can be displayed on the printer display device 2112C and the DFE display device 2122C.

On the other hand, in a workflow-PC display device 2132C, since a workflow PC 2131C does not have the image display data, such as the machine configuration diagram of the printing apparatus 2110C, as illustrated in FIG. 33, the workflow-PC display device 2132C cannot display the image. This is due to the fact that the workflow PC 2131C has a configuration in which workflow software is installed in a general personal computer terminal. The developer of the workflow software cannot know what type of configuration the printing apparatus 2110C connected to the workflow PC has. Accordingly, as illustrated in FIG. 33, the workflow-PC display device 2132C stays to the extent of displaying the status of the printing apparatus 2110C.

In such a case, to display the image of the printing apparatus 2110 on the workflow-PC display device 2132, for example, there is a method of reading the image display data from the storage of the printer main unit 2111 or the DFE 2121 and displaying the image. However, as described above, the image display data stored in the respective storages are data in bitmap format created according to the specifications of the respective display devices. If the display data are displayed on the workflow-PC display device 2132 having different specifications, there is a possibility that the image becomes unnatural and the displayed image becomes difficult to see for the user.

As described above, when a plurality of display devices having different specifications is present in the same system, a displayed image varies depending on the specification of each display device even if the displayed image is displayed based on the same image display data. Even in such a case, to appropriately display an image on each display device, in the present embodiment, the following two methods can be employed. That is, one is a method of distributing image display data stored in a vector format and converting the image display data into a bitmap format conforming to the specification of each display device for each distribution destination (first embodiment). The other is a method of acquiring the specification of a display device being a distribution destination in advance, generating and storing image display data in a bitmap format according to the specification, and distributing the image display data (second embodiment). The two embodiments are described with reference to FIGS. 34A, 34B, and 34C.

Figure 34A:
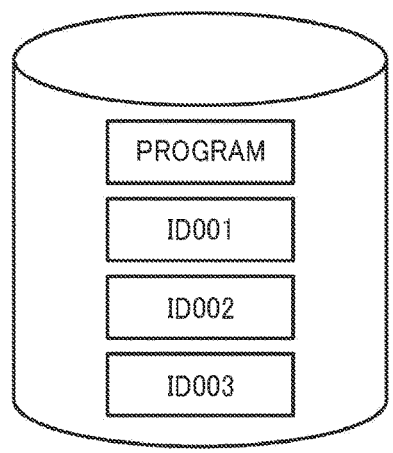
FIGS. 34A, 34B, and 34C are diagrams of examples of information stored in a storage of the DFE in an embodiment of the present disclosure.
Figure 34B:
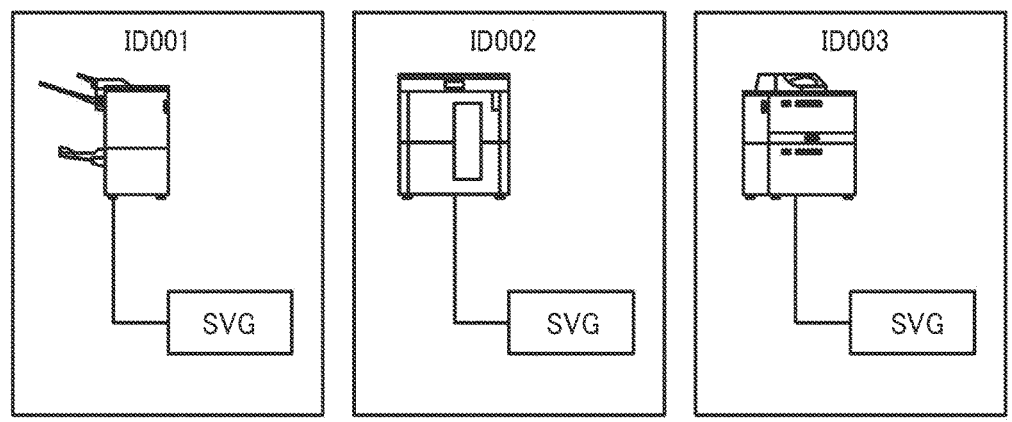
Figure 34C:
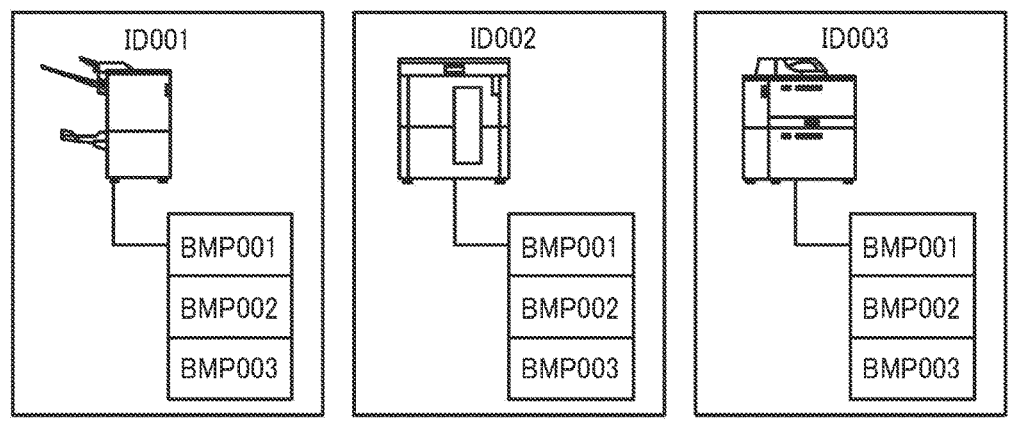

FIGS. 34A to 34C are diagrams of examples of information stored in the storage of the DFE 2121 or the printer main unit 2111 in the present embodiment. FIG. 34A illustrates an example of information held in the storage area of the DFE 2121 or the printer main unit 2111. FIG. 34B illustrates image display data held in the first embodiment. FIG. 34C illustrates image display data held in the second embodiment.

As illustrated in FIG. 34A, for example, a program (PROGRAM) to control the operation of the DFE 2121 or the printer main unit 2111 and image display data of the printer main unit 2111 and the peripheral device 2113 constituting the printing apparatus 2110 are stored in the storage area. The image display data are separately stored for the respective devices, and model names (e.g., ID001, ID002, ID003) as codes for identifying the respective devices are allocated.

The image display data stored in the storage include, for example, a machine configuration diagram, a jam processing diagram, a guide diagram, and guide information, and are stored in a vector format or a bitmap format according to the embodiment. The display data of images may be stored in the storage of the DFE 2121 in advance. Alternatively, the DFE 2121 may acquire the image information of its own device held by each device or apparatus via the printer main unit 2111 by the initialization process at the time of turning on the power supply.

The display data of images may be stored in the storage of the printer main unit 2111 in advance. Alternatively, the printer main unit 2111 may acquire the image information of each device or apparatus held by its own apparatus or device through the initialization process at the time of turning on the power supply.

Further, in accordance with the configuration of the printing apparatus 2110, a user can additionally install image display data. Storing the image display data as described above allows distribution of the image display data conforming to the configuration of the printing apparatus 2110. Even when a peripheral device 2113 newly released after the sale of the printing apparatus 2110 is added to the configuration, an image of the peripheral device 2113 can be appropriately displayed.

Next, the first embodiment is described with reference to FIG. 34B. The diagram illustrated in FIG. 34B exemplifies the image display data stored in the storage of FIG. 34A in the first embodiment. The image display data of ID001, ID002, and ID003 are stored in Scalable Vector Graphics (SVG) format that is one type of vector format. The SVG format is an image file format for recording a two-dimensional vector image based on extensible markup language (XML), and is an example of the present embodiment. Therefore, the format of the display data stored in the present embodiment is not limited to the SVG format but may be any other suitable format.

Next, a second embodiment is described with reference to FIG. 34C. The diagram illustrated in FIG. 34C exemplifies the image display data stored in the storage of FIG. 34A in the second embodiment. The image display data of ID001, ID002, and ID003 are stored in Bitmap format (BMP001, BMP002, and BMP003). Here, BMP001, BMP002, and BMP003 illustrated in FIG. 34C are image display data in bitmap format according to the specifications of various display devices. For example, the BMP001 is converted and stored as image display data for displaying on an 8-inch display device with the number of pixels of 1280×1024 in association with the printer display device 2112. The BMP002 is converted and stored as image display data for displayed on a 16-inch display device with 1920×1080 pixels in association with the DFE display device 2122.

As described above, the specifications of the printer display device 2112 or the DFE display device 2122 are not limited to the above-described examples. For example, the BMP001 may be converted and stored as image display data for displaying on an 8-inch display device with the number of pixels of 800×600 in association with the printer display device 2112. The BMP002 may be converted and stored as image display data for displayed on a 20-inch display device with 1920×1080 pixels in association with the DFE display device 2122.

The information stored in the storage of the DFE 2121 and the printer main unit 2111 in the present embodiment has been described above with reference to FIGS. 34A to 34C. Each embodiment is further described below. First, the first embodiment is described with reference to FIGS. 35 to 37.

Figure 35:
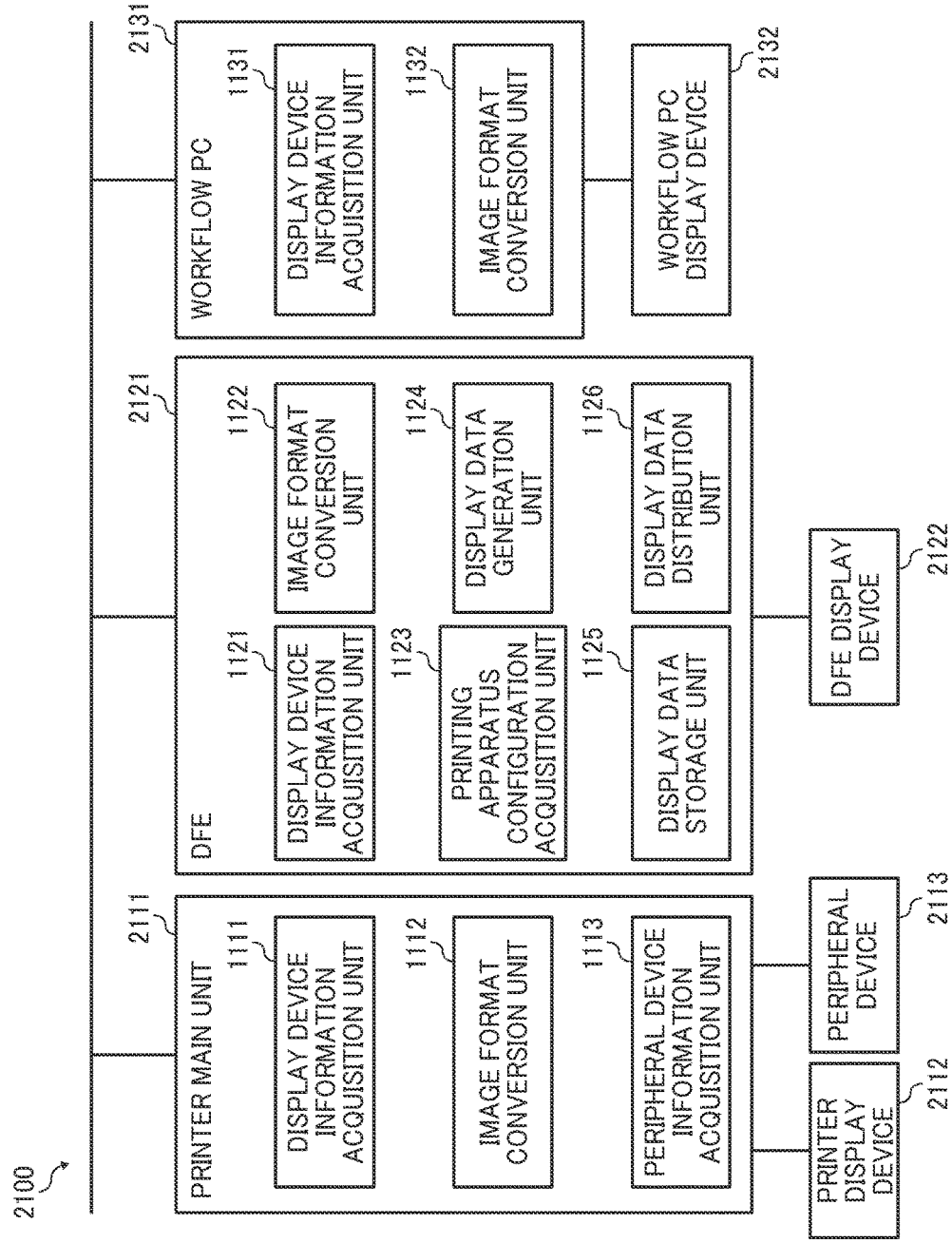
FIG. 35 is a software block diagram of the printing system according to an embodiment of the present disclosure.

FIG. 35 is a software block diagram of the printing system 2100 according to the first embodiment. The printer main unit 2111 includes a display device information acquisition unit 1111, an image format conversion unit 1112, and a peripheral device information acquisition unit 1113. Further, the DFE 2121 includes a display device information acquisition unit 1121, an image format conversion unit 1122, a printing apparatus configuration acquisition unit 1123, a display data generation unit 1124, a display data storage unit 1125, and a display data distribution unit 1126. Further, the workflow PC 2131 includes a display device information acquisition unit 1131 and an image format conversion unit 1132. Each functional block is further described below.

The display device information acquisition units 1111, 1121, and 1131 acquire, for example, the specifications of each display device and display device information, such as MAC address, IP address, and terminal name. For example, the display device information acquisition unit 1111 of the printer main unit 2111 acquires the information of the printer display device 2112. The display device information acquisition unit 1121 of the DFE 2121 acquires the information of the DFE display device 2122. The device information acquisition unit 1131 of the workflow PC 2131 acquires the information of the workflow-PC display device 2132. Here, the specifications of the display device to be acquired are information, such as the number of pixels, the aspect ratio, and the size.

The image format conversion units 1112, 1122, and 1132 convert, into the bitmap format, the image display data in vector format distributed from the DFE 2121. The image format conversion units 1112, 1122, and 1132 convert the image data into image display data in bitmap format compatible with each display device, based on the specifications of each display device acquired by each of the display device information acquisition units 1111, 1121, and 1131.

The peripheral device information acquisition unit 1113 acquires information of the peripheral device 2113 constituting the printing apparatus 2110. For example, in S111 of FIG. 29, the peripheral device information acquisition unit 1113 acquires the model name for specifying the functions of the peripheral device 2113 included in the printing apparatus 2110, and the configuration information, such as the order of connection of the peripheral devices 113 the type name of each peripheral device, and sends the acquired information to the DFE 2121. The peripheral device information acquisition unit 1113 can also acquire various display data, such as image information for displaying the image of each device, configuration, guide, and jam processing, which are stored in each peripheral device 2113.

The printing apparatus configuration acquisition unit 1123 acquires the configuration information of the printing apparatus 2110 based on the information of the peripheral device 2113 acquired by the peripheral device information acquisition unit 1113. The DFE 2121 can generate various display data, such as the machine configuration diagram of the printing apparatus 2110, by acquiring the configuration information of the printing apparatus 2110 by the printing apparatus configuration acquisition unit 1123.

Based on the configuration information of the printing apparatus 2110 acquired by the printing apparatus configuration acquisition unit 1123, the display data generation unit 1124 combines the images of the printer main unit 2111 and the peripheral devices 113 to generate image display data, such as the machine configuration diagram of the printing apparatus 2110. As one example, the display data generation unit 1124 generates display data of the machine configuration diagram as illustrated in FIGS. 32A or 32B in vector format. Note that the images of the peripheral devices 113 may be held in the DFE 2121 in advance or may be acquired from each peripheral device 2113 via the printer main unit 2111.

The display data storage unit 1125 stores the vector-format display data generated by the display data generation unit 1124 and corresponds to the storage area of the DFE 2121.

The display data distribution unit 1126 distributes display data in vector format stored in the display data storage unit 1125 so as to be adapted to the printer display device 2112, the workflow-PC display device 2132, or the like. Various communication protocols, such as hyper text transfer protocol (HTTP), file transfer protocol (FTP), server message block (SMB), and network file system (NFS), can be used for distribution of display data. As for the timing of distributing the display data, the display data may be delivered as a trigger, for example, when the printing system 2100 turns into a ready state or when an event accompanying the display of an image, such as the machine configuration diagram of the printing apparatus 2110, has occurred.

The display data distribution unit 1126 distributes the vector-format display data and the image format conversion units 1112, 1122, and 1132 of the respective apparatuses convert the vector-format display data into the display data of the bitmap format image suitable for each display device. Thus, the machine configuration diagram of the printing apparatus 2110 can be displayed corresponding to the specification of the display device.

Figure 36:
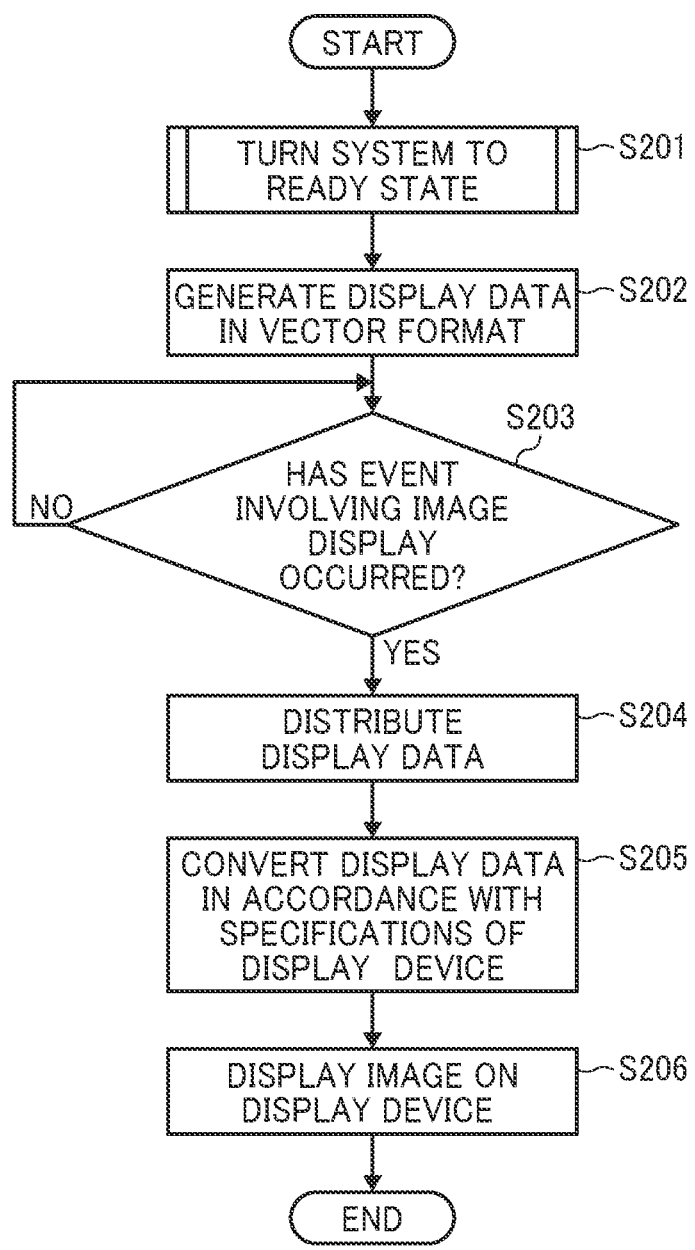
FIG. 36 is a flowchart of a process in which the printing system of FIG. 35 displays an image.

Next, the processing executed by each of the above-described functional units is described. FIG. 36 is a flowchart of a process of displaying an image in the printing system 2100 according to the first embodiment.

First, when the process starts, in step S201, the printing system 2100 turns into a system ready state. In the processing of step S201, the processing of each of the steps S101 to S116 described with reference to FIG. 29 is executed to turn the printing system 2100 into the system ready state. Note that it is preferable that the display device information acquisition units 1111, 1121, and 1131 acquire the information of each display device at the startup of the printing system 2100.

Next, in step S202, the display data generation unit 1124 generates display data, such as the machine configuration diagram of the printing apparatus 2110, in vector format, based on the configuration information of the printing apparatus 2110 acquired by the printing apparatus configuration acquisition unit 1123. The display data generated in step S202 is stored in the display data storage unit 1125 of the DFE 2121.

In step S203, it is determined whether an event involving image display has occurred. Examples of the event involving image display include the occurrence of jam and errors of the apparatus. When such an event occurs, the error content is displayed together with the machine configuration diagram of the printing apparatus 2110, thus facilitating the user to visually grasp the place where the error has occurred. That is, by viewing the displayed machine configuration diagram, the user can easily grasp where the error has occurred, thus allowing appropriate handling.

When no event involving image display has occurred (NO in step S203), the process returns to step S203 to wait for the occurrence of the event. If an event involving image display has occurred (YES in step S203), the process proceeds to step S204.

In step S204, the display data distribution unit 1126 distributes the vector-format display data stored in the display data storage unit 1125 to the image format conversion units 1112, 1122, and 1132 of the respective apparatuses. Note that the image format conversion unit 1122 of the DFE 2121 may directly acquire from the display data storage unit 1125 without going through the display data distribution unit 1126.

Next, in step S205, the image format conversion units 1112, 1122, and 1132 of the respective apparatuses convert the distributed vector-format display data into the bitmap format according to the specifications of the display device connected to each apparatus. In step S206, the converted bitmap-format display data is displayed on each display device, and the process terminates in step S207.

Figure 37:
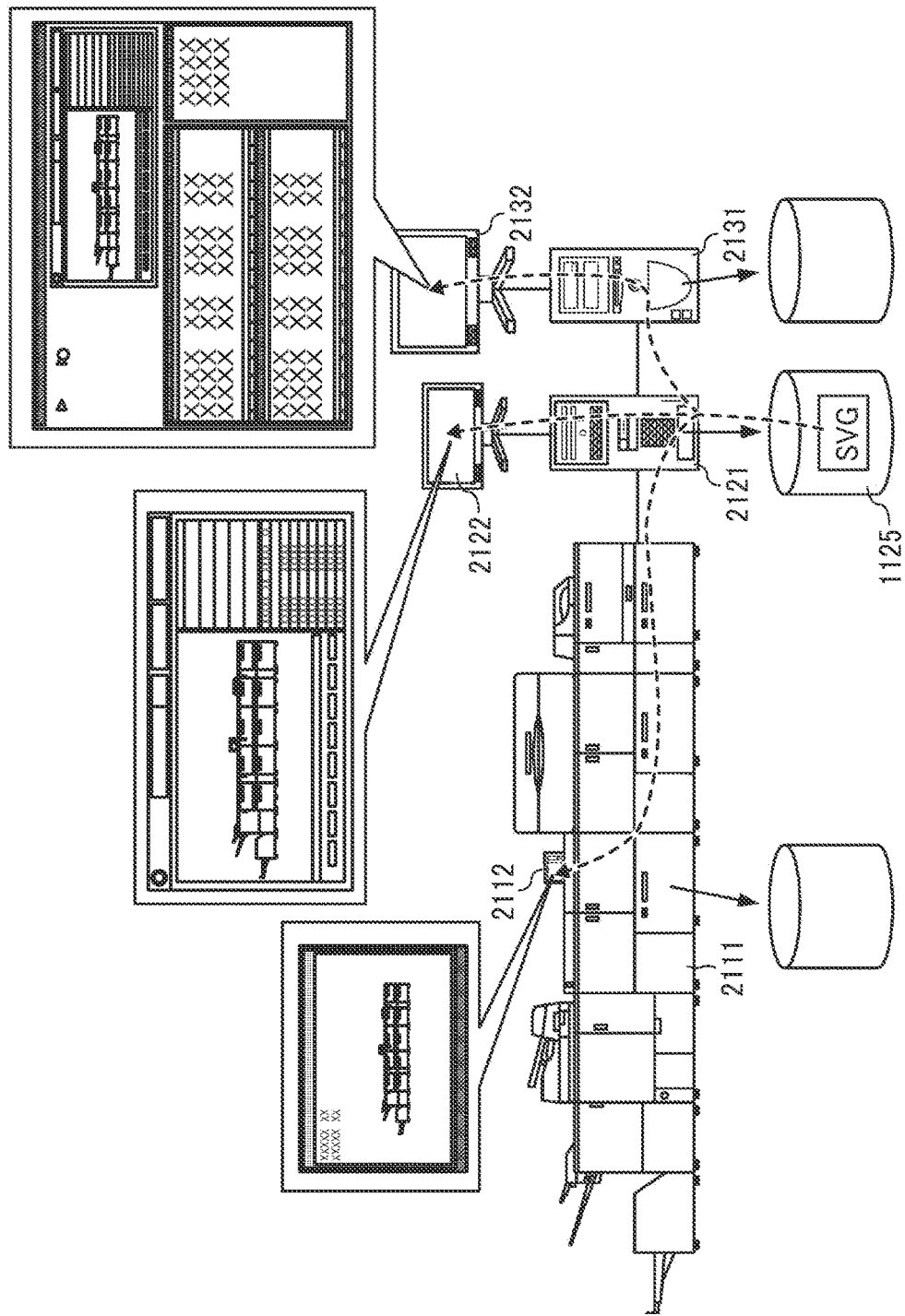
FIG. 37 is a diagram of an example of images displayed on display devices in the printing system of FIG. 35.

The above-described process allows the distribution of display data in vector format and the display of an image suitable for each display device. Next, an example of displaying an image on each display device by the above-described process is described with reference to FIG. 37. FIG. 37 is a diagram of an example of displaying an image on each display device in the printing system 2100 according to the first embodiment.

As illustrated in FIG. 37, the display data storage unit 1125 of the DFE 2121 stores display data in SVG format. By distributing the display data to the printer main unit 2111 and the workflow PC 2131 and converting the display data into bitmap format, an image suitable for each display device can be displayed.

That is, in the comparative example of FIG. 33, since the storage of the workflow PC 2131C does not hold the display data, the machine configuration diagram is not displayed on the workflow-PC display device 2132C. However, according to the configuration of the present embodiment, an image can be displayed even on a display device connected to an apparatus that does not hold the display data. In addition, since images can be displayed even if the storages of the printer main unit 2111 and the workflow PC 131 do not hold the display data, the capacity of each storage can be saved.

According to the first embodiment described above, the image display data in vector format can be distributed to each apparatus and an image conforming to the specification of each display device can be displayed. Further, in the first embodiment, since it is sufficient to store only the image display data in vector format in the display data storage unit 1125, the resources of the storage area can be saved.

Figure 38:
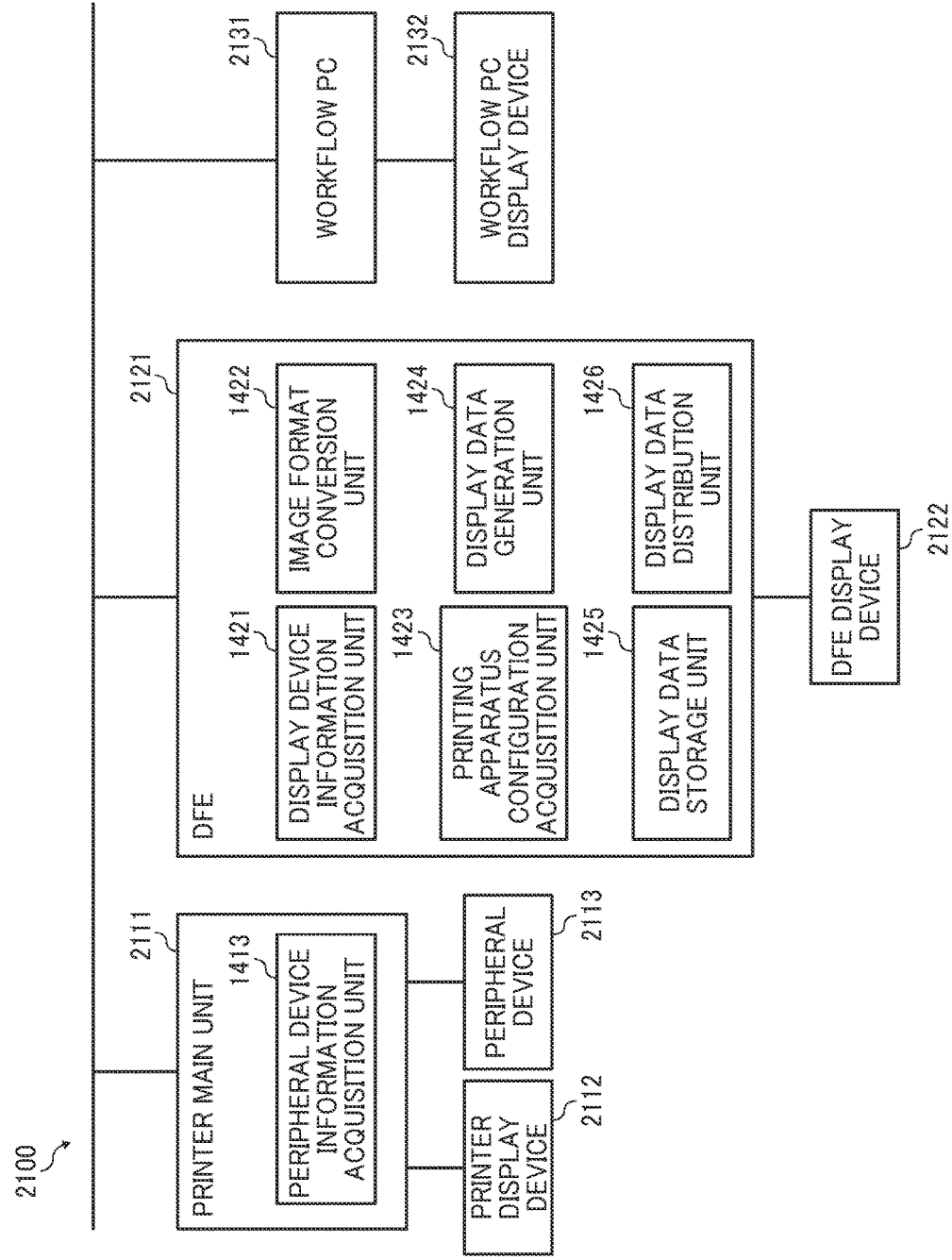
FIG. 38 is a software block diagram of a printing system according to an embodiment of the present disclosure.
Figure 39:
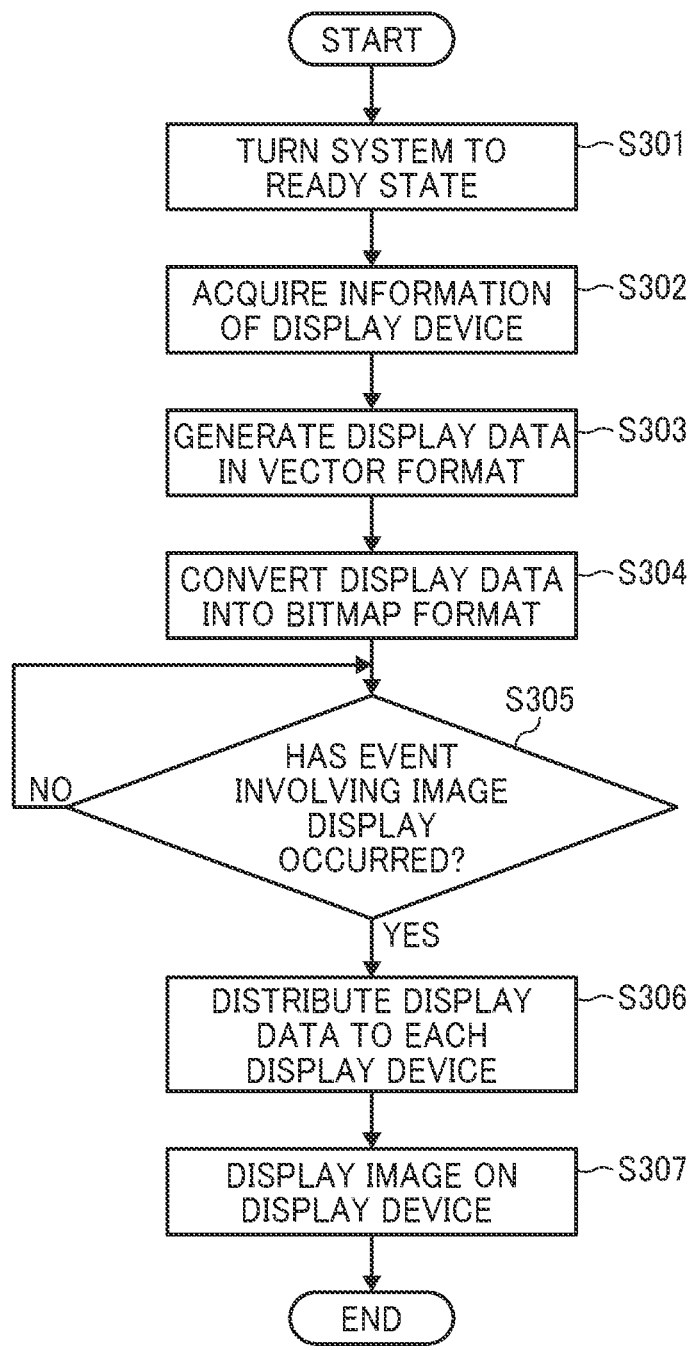
FIG. 39 is a flowchart of a process in which the printing system of FIG. 38 displays an image.

Next, a second embodiment is described with reference to FIGS. 38 to 40. FIG. 38 is a software block diagram of the printing system 2100 according to the second embodiment.

The printer main unit 2111 includes a peripheral device information acquisition unit 1413. Further, the DFE 2121 includes a display device information acquisition unit 1421, an image format conversion unit 1422, a printing apparatus configuration acquisition unit 1423, a display data generation unit 1424, a display data storage unit 1425, and a display data distribution unit 1426. Details of each functional block is described below.

Similarly to the peripheral device information acquisition unit 1113 illustrated in FIG. 35, the peripheral device information acquisition unit 1413 acquires information on the peripheral devices 113 that constitute the printing apparatus 2110. For example, in S111 of FIG. 29, the peripheral device information acquisition unit 1413 acquires the model name for specifying the functions of the peripheral device 2113 included in the printing apparatus 2110, and the configuration information, such as the order of connection of the peripheral devices 113 the type name of each peripheral device, and sends the acquired information to the DFE 2121. The peripheral device information acquisition unit 1113 can also acquire various display data, such as image information for displaying the image of each device, configuration, guide, and jam processing, which are stored in each peripheral device 2113.

The display device information acquisition unit 1421 acquires, e.g., the specifications of each display device and display device information, such as MAC address, IP address, and terminal name. The display device information acquisition unit 1421 acquires information on the printer display device 2112, the DFE display device 2122, and the workflow-PC display device 2132. Here, the specifications of the display device to be acquired are information, such as the number of pixels, the aspect ratio, and the size.

The image format conversion unit 1422 converts the image display data in vector format generated by the display data generation unit 1424 into bitmap format conforming to the specification of each display device. The display data converted by the image format conversion unit 1422 is stored in the display data storage unit 1425. The image format conversion units 1422 converts the image display data into image display data in bitmap format compatible with each display device, based on the specifications of each display device acquired by the display device information acquisition unit 1421.

The printing apparatus configuration acquisition unit 1423 acquires the configuration information of the printing apparatus 2110 based on the information of the peripheral device 2113 acquired by the peripheral device information acquisition unit 1413. The DFE 2121 can generate various display data, such as the machine configuration diagram of the printing apparatus 2110, by acquiring the configuration information of the printing apparatus 2110 by the printing apparatus configuration acquisition unit 1423.

Based on the configuration information of the printing apparatus 2110 acquired by the printing apparatus configuration acquisition unit 1423, the display data generation unit 1424 combines the images of the printer main unit 2111 and the peripheral devices 113 to generate image display data of the printing apparatus 2110. As one example, the display data generation unit 1424 generates display data of the machine configuration diagram as illustrated in FIG. 32A or 32B in vector format. Note that the images of the peripheral devices 113 may be held in the DFE 2121 in advance or may be acquired from each peripheral device 2113 via the printer main unit 2111.

The display data storage unit 1425 stores the bitmap-format display data converted by the image format conversion unit 1422 and corresponds to the storage area of the DFE 2121.

The display data distribution unit 1426 distributes display data in bitmap format stored in the display data storage unit 1425 so as to be adapted to the printer display device 2112, the workflow-PC display device 2132, or the like. Various communication protocols, such as hyper text transfer protocol (HTTP), file transfer protocol (FTP), server message block (SMB), and network file system (NFS), can be used for distribution of display data. As for the timing of distributing the display data, the display data may be delivered as a trigger, for example, when the printing system 2100 turns into a ready state or when an event accompanying the image display of the printing apparatus 2110 has occurred.

Distributing the bitmap-format display data by the display data distribution unit 1426 described above allows the display of the machine configuration diagram of the printing apparatus 2110 conforming to the specification of each display device.

Next, the processing executed by each of the above-described functional units is described. FIG. 39 is a flowchart of a process in which the printing system 2100 displays an image in the second embodiment.

First, when the process starts, in step S301, the printing system 2100 turns into a system ready state. In the processing of step S301, the processing of each of the steps S101 to S116 described with reference to FIG. 29 is executed to turn the printing system 2100 into the system ready state.

Next, in step S302, the display device information acquisition unit 1421 acquires information on each display device. Next, in step S303, the display data generation unit 1424 generates display data, such as the machine configuration diagram of the printing apparatus 2110, in vector format, based on the configuration information of the printing apparatus 2110 acquired by the printing apparatus configuration acquisition unit 1423.

In step S304, the image format conversion unit 1422 converts the display data generated by the display data generation unit 1424 into bitmap format. The conversion of the image format in step S304 is performed based on the information of each display device acquired in step S302, and the display data converted in bitmap format is stored in the display data storage unit 1425 of the DFE 2121.

In step S305, it is determined whether an event involving image display has occurred. Examples of the event involving image display include the occurrence of jam and errors of the apparatus. When such an event occurs, the error content is displayed together with the machine configuration diagram of the printing system 2100, thus facilitating the user to visually grasp the place where the error has occurred. That is, by viewing the displayed configuration diagram, the user can easily grasp where the error has occurred and perform appropriate handling.

When no event involving image display has occurred (NO in step S305), the process returns to step S305 to wait for the occurrence of the event. If an event involving image display has occurred (YES in step S305), the process proceeds to step S306.

In step S306, the display data distribution unit 1426 distributes the display data in bitmap format stored in the display data storage unit 1425 to each apparatus. The display data in bitmap format is distributed for each display device, based on the information on the display device acquired in step S302. The DFE 2121 can select which display data to distribute to which device by acquiring the specifications of the respective display devices at the time of starting up the system, and can distribute the display image data so as to conform to the specifications of the display device connected to each apparatus. For example, by acquiring the specifications of the display device connected to each apparatus at the timing of turning into the system ready state in step S116 of FIG. 29, it is possible to determine which bitmap data to distribute to which device.

Next, in step S307, each apparatus displays the distributed bitmap-format display data on each display device connected to the apparatus, and the process terminates in step S308.

Through the above-described process, distributing the display data in bitmap format for each display device allows the display of an image conforming to each display device. Next, an example of displaying an image on each display device by the above-described process is described with reference to FIG. 40. FIG. 40 is a diagram of an example of displaying an image on each display device in the printing system 2100 according to the second embodiment.

Figure 40:
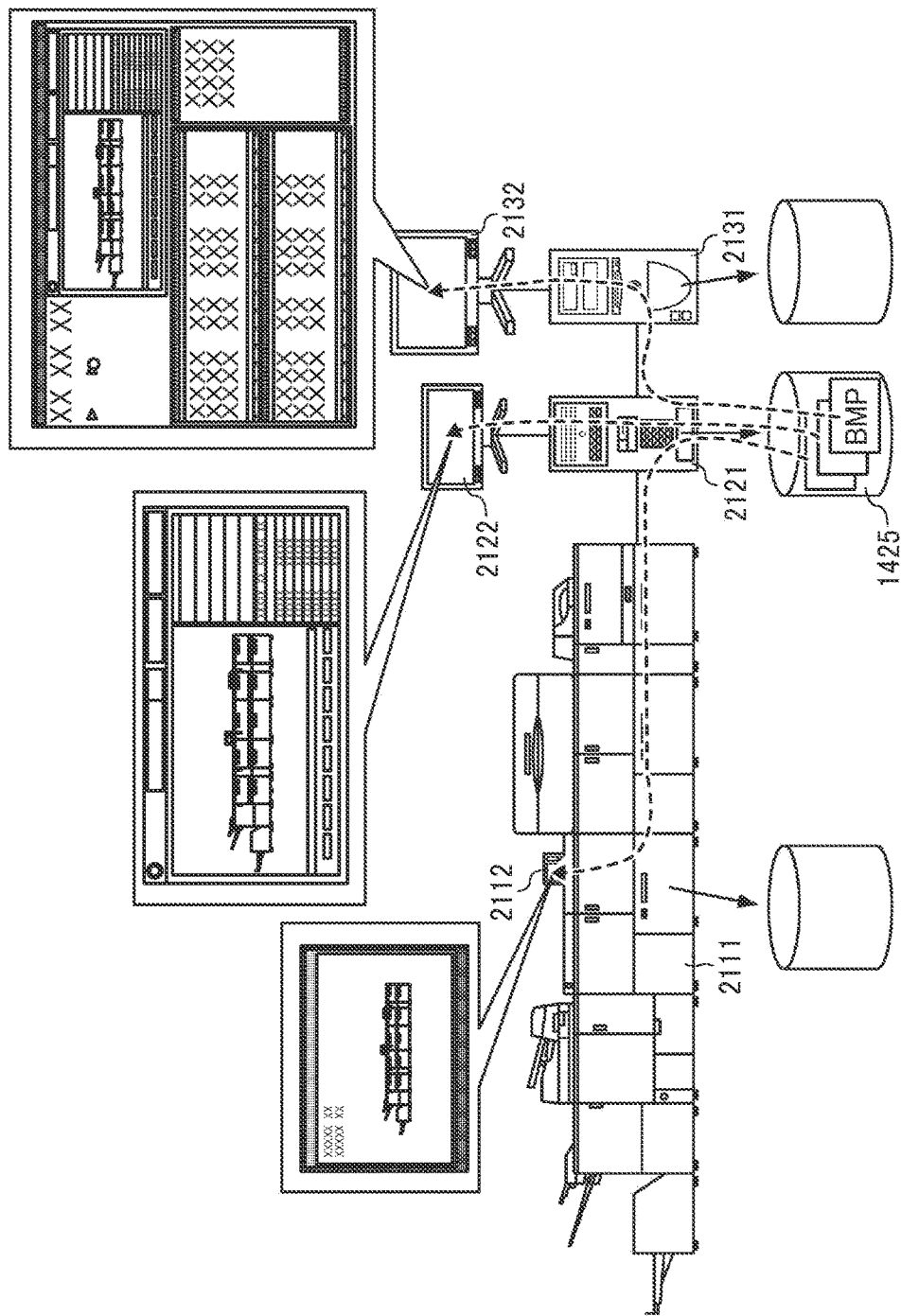
FIG. 40 is a diagram of an example of images displayed on display devices in the printing system of FIG. 38.

As illustrated in FIG. 40, the display data storage unit 1425 of the DFE 2121 stores display data in bitmap format. The display data is converted in accordance with the specifications of each of the printer display device 2112, the DFE display device 2122, and the workflow-PC display device 2132. Distributing the display data in bitmap format to each display device allows an image to be displayed on a display device connected to an apparatus that does not hold the display data.

That is, in the comparative example of FIG. 33, since the storage of the workflow PC 2131C does not hold the display data, the machine configuration diagram is not displayed on the workflow-PC display device 2132C. However, according to the configuration of the present embodiment, an image can be displayed even on a display device connected to an apparatus that does not hold the display data. In addition, since images can be displayed even if the storages of the printer main unit 2111 and the workflow PC 2131 do not hold the display data, the capacity of each storage can be saved.

According to the above-described second embodiment, image display data in bitmap format can be distributed to a plurality of apparatuses in accordance with the specifications of a display device of each apparatus, thus allowing an appropriate image to be displayed on each display device. Further, in the second embodiment, since the image display data in bitmap format is distributed, an image can be displayed without performing conversion processing in each apparatus.

In each of the above-described embodiments, the image information of each device or apparatus may be stored in the display data storage unit 1125 or 1425 in advance. Alternatively, for example, the image information may be held in each peripheral device 2113 included in the printing system 2100, acquired from each peripheral device 2113 at the startup of the printing system 2100, and stored in the display data storage unit 1125 or 1425.

Further, in each of the above-described embodiments, the DFE 2121 can distribute the image display data conforming to the configuration of the printing apparatus 2110 by acquiring the configuration information of the printing apparatus 2110 at the startup of the printing system 2100. For example, even if the peripheral device 2113 newly released after the sale of the printing apparatus 2110 is added to the configuration of the printing system 2100, an appropriate image of the peripheral device 2113 can be displayed by storing in advance the image information for displaying its own image in the peripheral device 2113.

By distributing the image display data stored in the display data storage unit 1125 or 1425 of the DFE 2121 to the printing apparatus 2110 and the workflow PC 2131 as described above, a screen that is easy for the user to see can be provided regardless of the specifications of the display device. Furthermore, in the present embodiment, since the DFE 2121 disposed between the workflow PC 2131 and the printing apparatus 2110 holds the display data, the time taken to distribute the display data to each apparatus can be reduced.

A third embodiment is described with reference to FIGS. 41 to 43.

Figure 41:
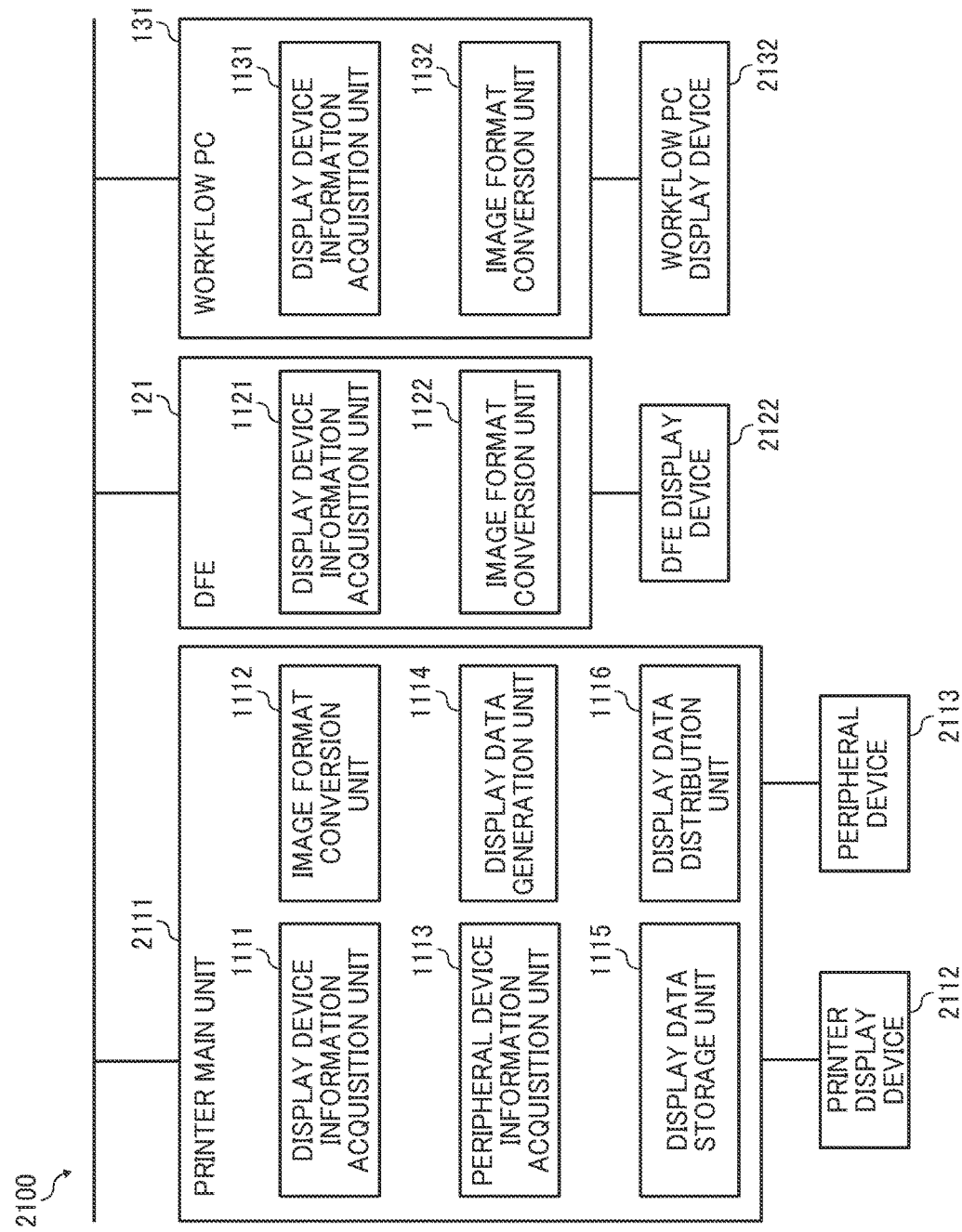
FIG. 41 is a software block diagram of the printing system according to an embodiment of the present disclosure.
Figure 42:
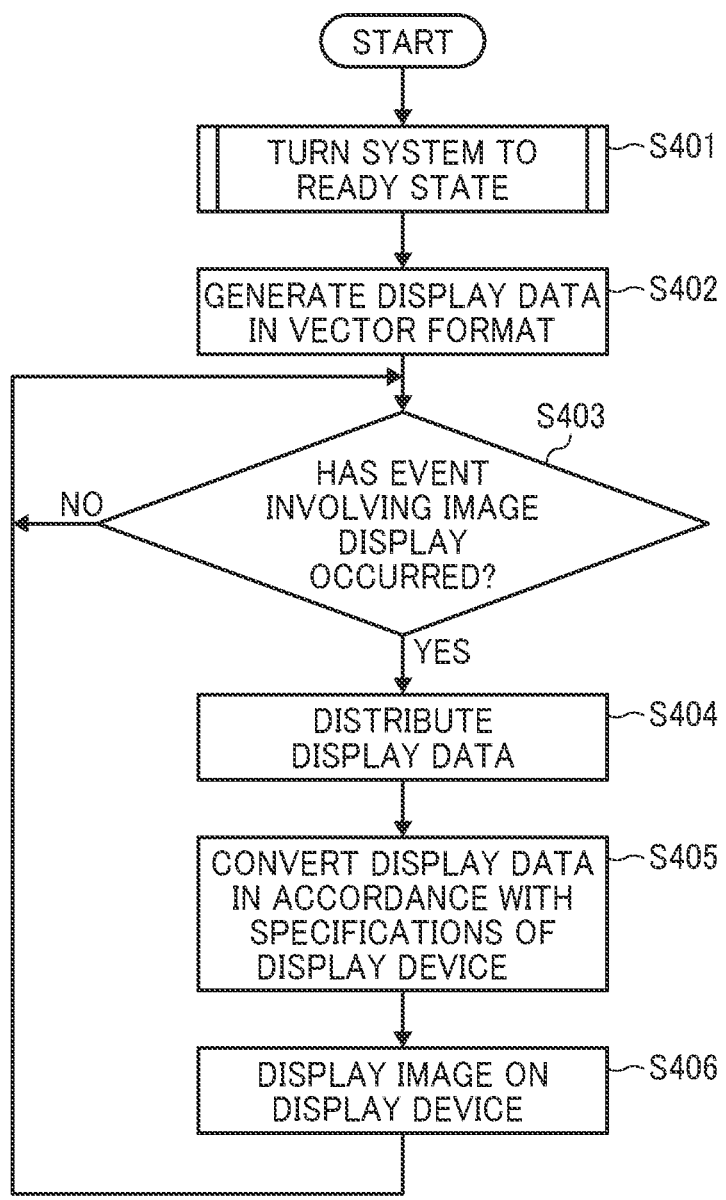
FIG. 42 is a flowchart of a process in which the printing system of FIG. 41 displays an image.

FIG. 41 is a software block diagram of the printing system 2100 according to the first embodiment. The printer main unit 2111 includes a display device information acquisition unit 1111, an image format conversion unit 1112, a peripheral device information acquisition unit 1113, a display data generation unit 1114, a display data storage unit 1115, and a display data distribution unit 1116. Further, the DFE 2121 includes a display device information acquisition unit 1121 and an image format conversion unit 1122. Further, the workflow PC 2131 includes a display device information acquisition unit 1131 and an image format conversion unit 1132. Each functional block is further described below.

The display device information acquisition units 1111, 1121, and 1131 acquire, for example, the specifications of each display device and display device information, such as MAC address, IP address, and terminal name. For example, the display device information acquisition unit 1111 of the printer main unit 2111 acquires the information of the printer display device 2112. The display device information acquisition unit 1121 of the DFE 2121 acquires the information of the DFE display device 2122. The device information acquisition unit 1131 of the workflow PC 2131 acquires the information of the workflow-PC display device 2132. Here, the specifications of the display device to be acquired are information, such as the number of pixels, the aspect ratio, and the size.

The image format conversion units 1112, 1122, and 1132 convert, into bitmap format, the image display data in vector format distributed from the printer main unit 2111. The image format conversion units 1112, 1122, and 1132 convert the image data into image display data in bitmap format compatible with each display device, based on the specifications of each display device acquired by each of the display device information acquisition units 1111, 1121, and 1131.

The peripheral device information acquisition unit 1113 acquires information of the peripheral device 2113 constituting the printing apparatus 2110. For example, in S111 of FIG. 29, the peripheral device information acquisition unit 1113 acquires the model name for specifying the functions of the peripheral device 2113 included in the printing apparatus 2110, and the configuration information, such as the order of connection of the peripheral devices 113 the type name of each peripheral device. The peripheral device information acquisition unit 1113 can also acquire various display data, such as image information for displaying the image of each device, configuration, guide, and jam processing, which are stored in each peripheral device 2113. As described above, by acquiring the information of the peripheral device 2113, the printer main unit 2111 can acquire the image and configuration information of the printing apparatus 2110 including the printer main unit 2111 and can generate various display data, such as the machine configuration diagram of the printing apparatus 2110.

Based on peripheral device information acquired by the peripheral device information acquisition unit 1113 and the configuration information of the printing apparatus 2110, the display data generation unit 1114 combines the images of the printer main unit 2111 and the peripheral devices 113 to generate image display data, such as the machine configuration diagram of the printing apparatus 2110. As one example, the display data generation unit 1114 generates display data of the machine configuration diagram as illustrated in FIG. 32A or 32B in vector format. Note that the images of the peripheral devices 113 may be held in the printer main unit 2111 in advance or the printer main unit 2111 may acquire the images of the peripheral devices 113 from the respective peripheral devices 113.

The display data storage unit 1115 stores the vector-format display data generated by the display data generation unit 1114 and corresponds to the storage area of the printer main unit 2111.

The display data distribution unit 1116 distributes the display data in vector format stored in the display data storage unit 1115 to other apparatus to display an image on, e.g., the DFE display device 2122 or the workflow-PC display device 2132. Various communication protocols, such as hyper text transfer protocol (HTTP), file transfer protocol (FTP), server message block (SMB), and network file system (NFS), can be used for distribution of display data. As for the timing of distributing the display data, the display data may be delivered as a trigger, for example, when the printing system 2100 turns into a ready state or when an event accompanying the display of an image, such as the machine configuration diagram of the printing apparatus 2110, has occurred.

The display data distribution unit 1116 distributes the vector-format display data and the image format conversion units 1112, 1122, and 1132 of the respective apparatuses convert the vector-format display data into the display data of the bitmap format image suitable for each display device. Thus, the machine configuration diagram of the printing apparatus 2110 can be displayed corresponding to the specification of the display device.

Next, the processing executed by each of the above-described functional units is described. FIG. 42 is a flowchart of a process of displaying an image in the printing system 2100 according to the third embodiment.

First, when the process starts, in step S401, the printing system 2100 turns into a system ready state. In the processing of step S401, the processing of each of the steps S101 to S116 described with reference to FIG. 29 is executed to turn the printing system 2100 into the system ready state. Note that It is preferable that the display device information acquisition units 1111, 1121, and 1131 acquire the information of each display device at the startup of the printing system 2100.

Next, in step S402, the display data generation unit 1114 generates display data, such as the machine configuration diagram of the printing apparatus 2110, in vector format, based on, e.g., the information on the peripheral device 2113 acquired by the peripheral device information acquisition unit 1113 and the configuration information of the printing apparatus 2110. The display data generated in step S402 is stored in the display data storage unit 1115 of the printer main unit 2111.

In step S403, it is determined whether an event involving image display has occurred. Examples of the event involving image display include the occurrence of jam and errors of the apparatus. When such an event occurs, the error content is displayed together with the machine configuration diagram of the printing apparatus 2110, thus facilitating the user to visually grasp the place where the error has occurred. That is, by viewing the displayed machine configuration diagram, the user can easily grasp where the error has occurred, thus allowing appropriate handling.

When no event involving image display has occurred (NO in step S403), the process returns to step S403 to wait for the occurrence of the event. If an event involving image display has occurred (YES in step S403), the process proceeds to step S404.

In step S404, the display data distribution unit 1116 distributes the vector-format display data stored in the display data storage unit 1115 to the image format conversion units 1112, 1122, and 1132 of the respective apparatuses. Note that the image format conversion unit 1112 of the printer main unit 2111 may directly acquire from the display data storage unit 1115 without going through the display data distribution unit 1116.

Next, in step S405, the image format conversion units 1112, 1122, and 1132 of the respective apparatuses convert the distributed vector-format display data into the bitmap format according to the specifications of the display device connected to each apparatus. In step S406, the display data converted in bitmap format is displayed on each display device, and the process returns to step S403 to prepare for the next occurrence of the event.

The above-described process allows the distribution of display data in vector format and the display of an image suitable for each display device. Next, an example of displaying an image on each display device by the above-described process is described with reference to FIG. 43. FIG. 43 is a diagram of an example of displaying an image on each display device in the printing system 2100 according to the third embodiment.

Figure 43:
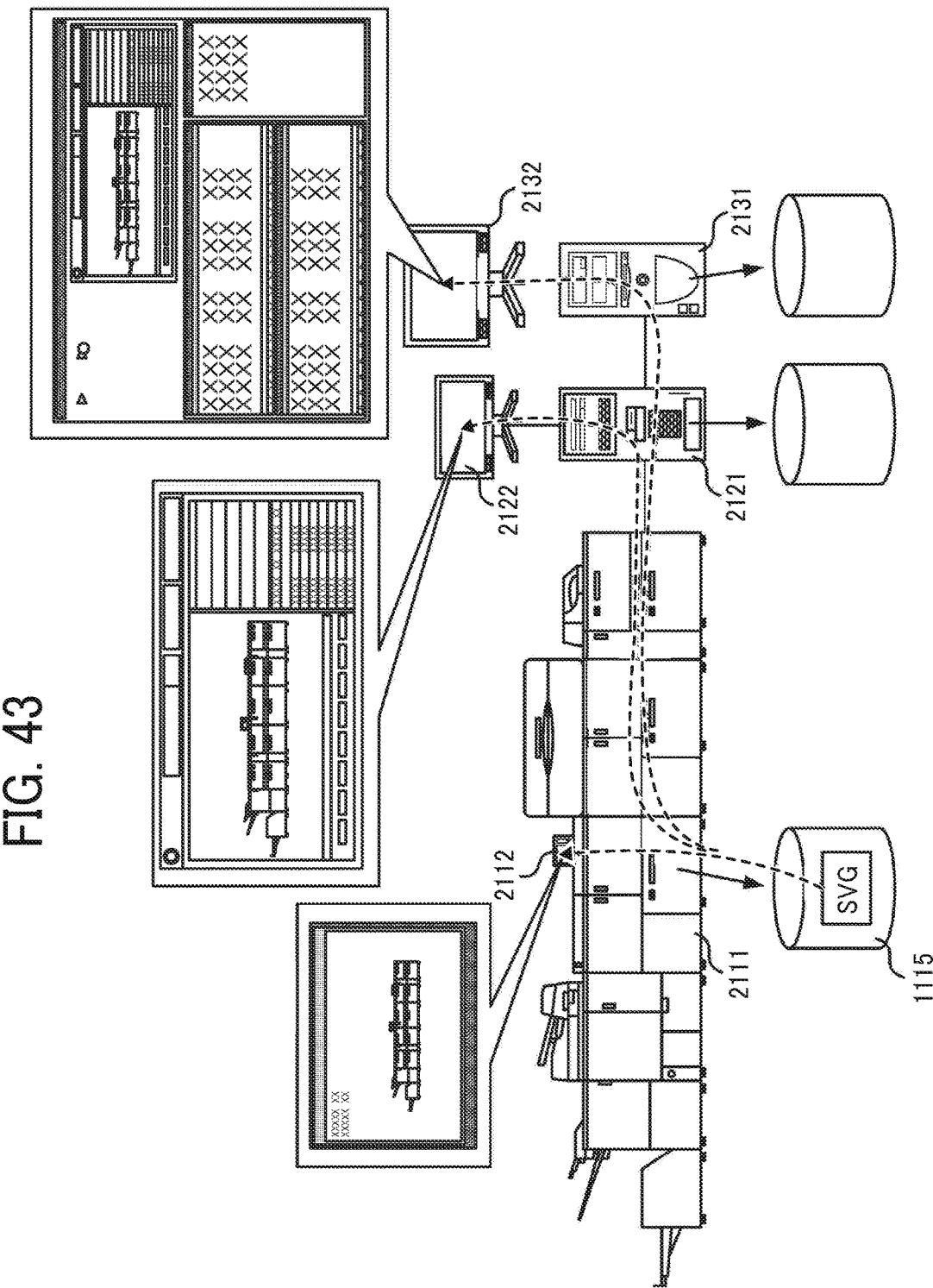
FIG. 43 is a diagram of an example of images displayed on display devices in the printing system of FIG. 41.

As illustrated in FIG. 43, the display data storage unit 1115 of the printer main unit 2111 stores display data in SVG format. By distributing the display data to the DFE 2121 and the workflow PC 2131 and converting the display data into bitmap format, an image suitable for each display device can be displayed.

That is, in the comparative example of FIG. 33, since the storage of the workflow PC 2131C does not hold the display data, the machine configuration diagram is not displayed on the workflow-PC display device 2132C. However, according to the configuration of the present embodiment, an image can be displayed even on a display device connected to an apparatus that does not hold the display data. In addition, since images can be displayed even if the storages of the DFE 2121 and the workflow PC 2131 do not hold the display data, the capacity of each storage can be saved.

According to the first embodiment described above, the image display data in vector format can be distributed to each apparatus and an image conforming to the specification of each display device can be displayed. Further, in the first embodiment, since it is sufficient to store only the image display data in vector format in the display data storage unit 1115, the resources of the storage area can be saved.

Figure 44:
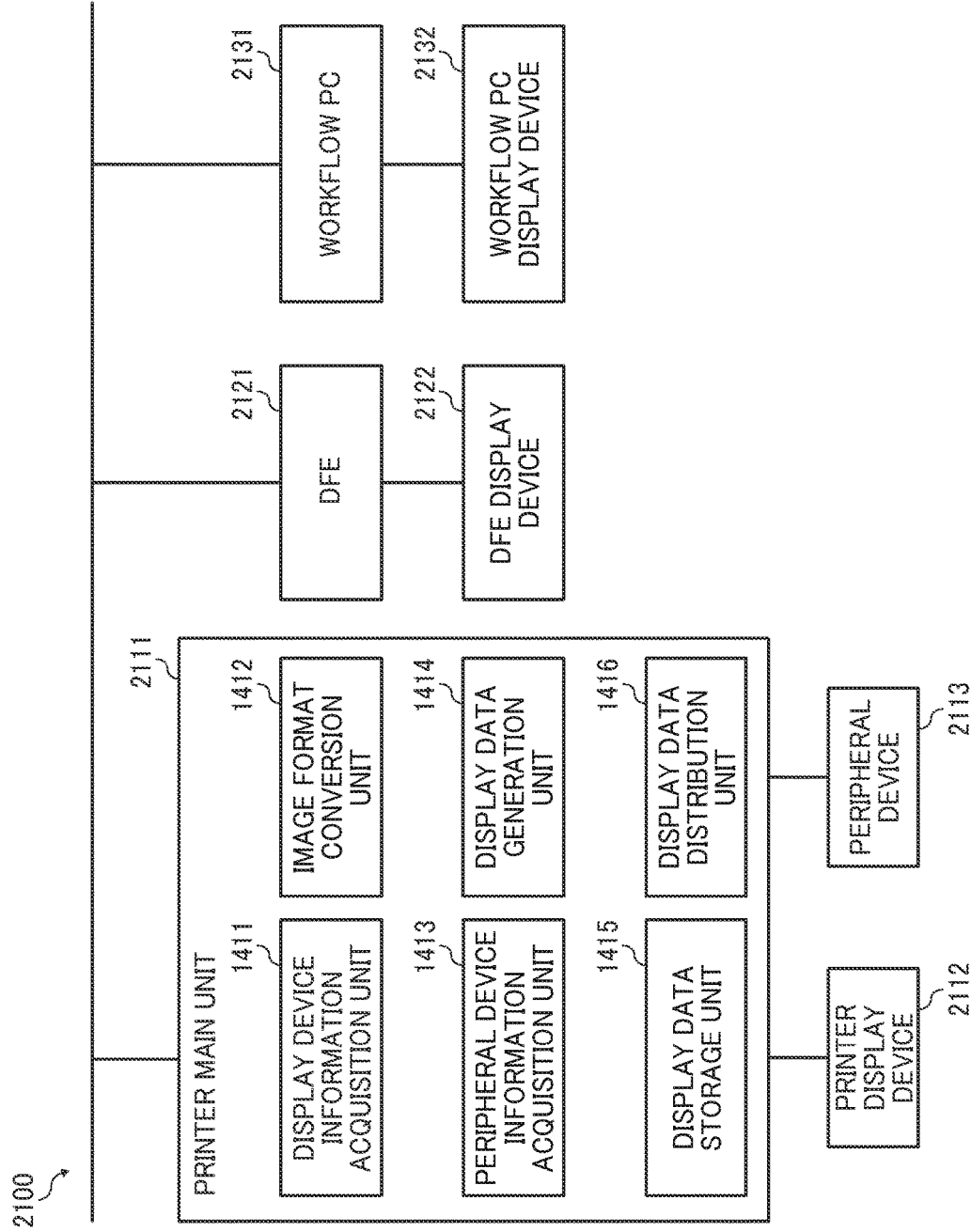
FIG. 44 is a software block diagram of a printing system according to an embodiment of the present disclosure.
Figure 45:
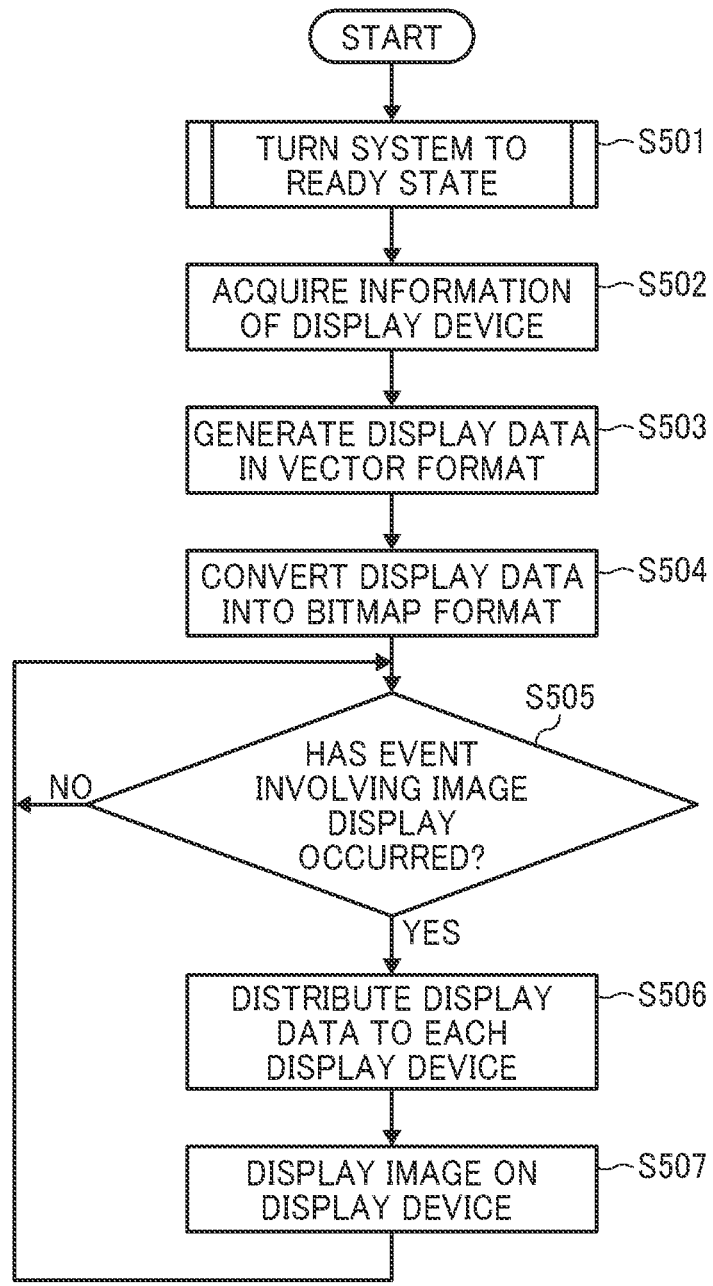
FIG. 45 is a flowchart of a process in which the printing system of FIG. 44 displays an image.

Next, a fourth embodiment is described with reference to FIGS. 44 to 46. FIG. 44 is a software block diagram of the printing system 2100 according to the fourth embodiment.

The printer main unit 2111 includes a display device information acquisition unit 1411, an image format conversion unit 1412, a peripheral device information acquisition unit 1413, a display data generation unit 1414, a display data storage unit 1415, and a display data distribution unit 1416. Each functional block is further described below.

The display device information acquisition unit 1411 acquires, e.g., the specifications of each display device and display device information, such as MAC address, IP address, and terminal name. The display device information acquisition unit 1411 acquires information on the printer display device 2112, the DFE display device 2122, and the workflow-PC display device 2132. Here, the specifications of the display device to be acquired are information, such as the number of pixels, the aspect ratio, and the size.

The image format conversion unit 1412 converts the image display data in vector format generated by the display data generation unit 1414 into bitmap format conforming to the specification of each display device. The display data converted by the image format conversion unit 1412 is stored in the display data storage unit 1415. The image format conversion units 1412 converts the image display data into image display data in bitmap format compatible with each display device, based on the specifications of each display device acquired by the display device information acquisition unit 1411.

Similarly to the peripheral device information acquisition unit 1113 illustrated in FIG. 41, the peripheral device information acquisition unit 1413 acquires information on the peripheral devices 113 that constitute the printing apparatus 2110. For example, in S111 of FIG. 29, the peripheral device information acquisition unit 1413 acquires the model name for specifying the functions of the peripheral device 2113 included in the printing apparatus 2110, and the configuration information, such as the order of connection of the peripheral devices 113 the type name of each peripheral device. The peripheral device information acquisition unit 1413 can also acquire various display data, such as image information for displaying the image of each device, configuration, guide, and jam processing, which are stored in each peripheral device 2113. As described above, by acquiring the information of the peripheral device 2113, the printer main unit 2111 can acquire the image and configuration information of the printing apparatus 2110 including the printer main unit 2111 and can generate various display data, such as the machine configuration diagram of the printing apparatus 2110.

Based on peripheral device information acquired by the peripheral device information acquisition unit 1413 and the configuration information of the printing apparatus 2110, the display data generation unit 1414 combines the images of the printer main unit 2111 and the peripheral devices 113 to generate image display data, such as the machine configuration diagram of the printing apparatus 2110. As one example, the display data generation unit 1414 generates display data of the machine configuration diagram as illustrated in FIG. 32A or 32B in vector format. Note that the images of the peripheral devices 113 may be held in the printer main unit 2111 in advance or the printer main unit 2111 may acquire the images of the peripheral devices 113 from the respective peripheral devices 113.

The display data storage unit 1415 stores the bitmap-format display data converted by the image format conversion unit 1412 and corresponds to the storage area of the printer main unit 2111.

The display data distribution unit 1416 distributes the display data in bitmap format stored in the display data storage unit 1415 to other apparatus to display an image on, e.g., the DFE display device 2122 or the workflow-PC display device 2132. Various communication protocols, such as hyper text transfer protocol (HTTP), file transfer protocol (FTP), server message block (SMB), and network file system (NFS), can be used for distribution of display data. As for the timing of distributing the display data, the display data may be delivered as a trigger, for example, when the printing system 2100 turns into a ready state or when an event accompanying the image display of the printing apparatus 2110 has occurred.

Distributing the bitmap-format display data by the display data distribution unit 1416 described above allows the display of the machine configuration diagram of the printing apparatus 2110 conforming to the specification of each display device.

Next, the processing executed by each of the above-described functional units is described. FIG. 45 is a flowchart of a process in which the printing system 2100 displays an image in the fourth embodiment.

First, when the process starts, in step S501, the printing system 2100 turns into a system ready state. In the processing of step S501, the processing of each of the steps S101 to S116 described with reference to FIG. 29 is executed to turn the printing system 2100 into the system ready state.

Next, in step S502, the display device information acquisition unit 1411 acquires information on each display device. Next, in step S503, the display data generation unit 1114 generates display data, such as the machine configuration diagram of the printing apparatus 2110, in vector format, based on, e.g., the information on the peripheral device 2113 acquired by the peripheral device information acquisition unit 1113 and the configuration information of the printing apparatus 2110.

In step S504, the image format conversion unit 1412 converts the display data generated by the display data generation unit 1414 into bitmap format. The conversion of the image format in step S504 is performed based on the information of each display device acquired in step S502, and the display data converted in bitmap format is stored in the display data storage unit 1415 of the printer main unit 2111.

In step S505, it is determined whether an event involving image display has occurred. Examples of the event involving image display include the occurrence of jam and errors of the apparatus. When such an event occurs, the error content is displayed together with the machine configuration diagram of the printing system 2100, thus facilitating the user to visually grasp the place where the error has occurred. That is, by viewing the displayed configuration diagram, the user can easily grasp where the error has occurred and perform appropriate handling.

When no event involving image display has occurred (NO in step S505), the process returns to step S505 to wait for the occurrence of the event. If an event involving image display has occurred (YES in step S505), the process proceeds to step S506.

In step S506, the display data distribution unit 1416 distributes the display data in bitmap format stored in the display data storage unit 1415 to each apparatus. The display data in bitmap format is distributed for each display device, based on the information on the display device acquired in step S502. The printer main unit 2111 can select which display data to distribute to which device by acquiring the specifications of the respective display devices at the time of starting up the system, and can distribute the display image data so as to conform to the specifications of the display device connected to each apparatus. For example, by acquiring the specifications of the display device connected to each apparatus at the timing of turning into the system ready state in step S116 of FIG. 29, it is possible to determine which bitmap data to distribute to which device.

Next, in step S507, each apparatus displays the distributed bitmap-format display data on each display device connected to the apparatus, and the process returns to step S505 to prepare for the next occurrence of the event.

Through the above-described process, distributing the display data in bitmap format for each display device allows the display of an image conforming to each display device. Next, an example of displaying an image on each display device by the above-described process is described with reference to FIG. 46. FIG. 46 is a diagram of an example of displaying an image on each display device in the printing system 2100 according to the fourth embodiment.

Figure 46:
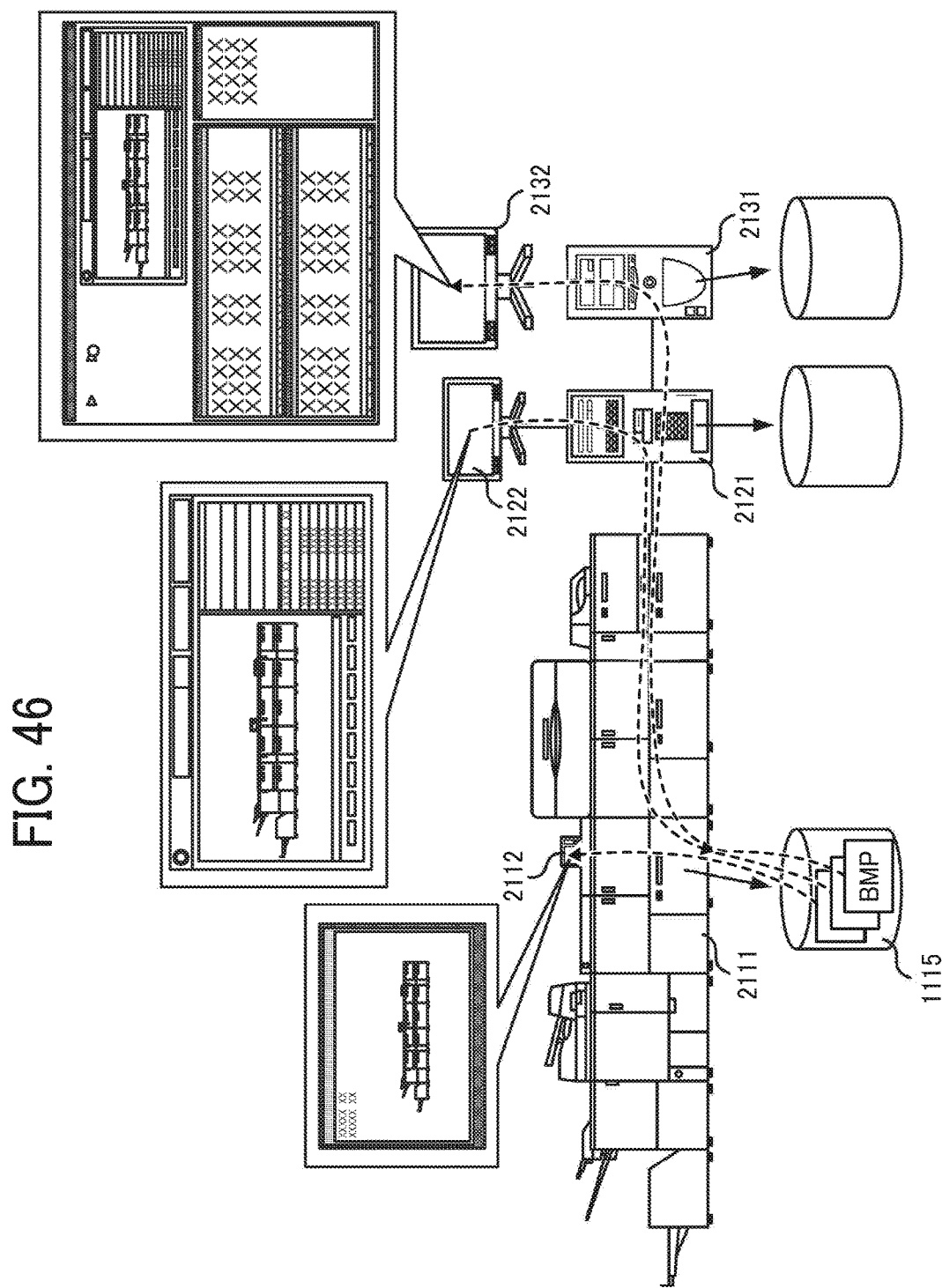
FIG. 46 is a diagram of an example of images displayed on display devices in the printing system of FIG. 44.

As illustrated in FIG. 46, the display data storage unit 1415 of the printer main unit 2111 stores display data in bitmap format. The display data is converted in accordance with the specifications of each of the printer display device 2112, the DFE display device 2122, and the workflow-PC display device 2132. Distributing the display data in bitmap format to each display device allows an image to be displayed on a display device connected to an apparatus that does not hold the display data.

That is, in the comparative example of FIG. 33, since the storage of the workflow PC 2131C does not hold the display data, the machine configuration diagram is not displayed on the workflow-PC display device 2132C. However, according to the configuration of the present embodiment, an image can be displayed even on a display device connected to an apparatus that does not hold the display data. In addition, since images can be displayed even if the storages of the DFE 2121 and the workflow PC 2131 do not hold the display data, the capacity of each storage can be saved.

According to the above-described second embodiment, image display data in bitmap format can be distributed to a plurality of apparatuses in accordance with the specifications of a display device of each apparatus, thus allowing an appropriate image to be displayed on each display device. Further, in the second embodiment, since the image display data in bitmap format is distributed, an image can be displayed without performing conversion processing in each apparatus.

In each of the above-described embodiments, the image information of each device or apparatus may be stored in the display data storage unit 1115 or 1415 in advance. Alternatively, for example, the image information may be held in each peripheral device 2113 included in the printing system 2100, acquired from each peripheral device 2113 at the startup of the printing system 2100, and stored in the display data storage unit 1115 or 1415.

Further, in each of the above-described embodiments, the printer main unit 2111 can distribute the image display data conforming to the configuration of the printing apparatus 2110 by acquiring the configuration information of the printing apparatus 2110 at the startup of the printing system 2100. For example, even if the peripheral device 2113 newly released after the sale of the printing apparatus 2110 is added to the configuration of the printing system 2100, an appropriate image of the peripheral device 2113 can be displayed by storing in advance the image information for displaying its own image in the peripheral device 2113.

By distributing the image display data stored in the display data storage unit 1115 or 1415 of the printer main unit 2111 to the DFE 2121 and the workflow PC 2131 as described above, a screen that is easy for the user to see can be provided regardless of the specifications of the display device. Furthermore, in the present embodiment, since the printer main unit 2111 included in the printing apparatus 2110 holds the display data, there is an advantage that it is easy to acquire the configuration information of the printing apparatus 2110.

Each of the above-described embodiments is described with the case where the occurrence of the event involving the image display acts as a trigger to distribute the display data. However, the trigger for distributing the display data is not limited to such a case. For example, display data may be distributed to each apparatus in advance at the startup of the printing system 2100. In such a case, each apparatus can display an image by receiving a notice that an event has occurred.

Further, the above-described embodiments are described with the example in which conversion is performed based on the number of pixels, the aspect ratio, and the screen size when an image is converted in accordance with the specifications of each display device. However, conversion may be performed based on, for example, the orientation of the screen of each display device (in vertical and horizontal rotation) or the color depth of display color.

According to the above-described embodiment of the present disclosure, there can be provided a printing system, a control device, and a recording medium storing a program that is capable of displaying a common image in an easy-to-see manner regardless of the specifications of the screen, even when the printing system includes a plurality of screens having different specifications.

Note that the software blocks illustrated in FIG. 41 and FIG. 44 correspond to functional units realized by causing each hardware to function by the CPU included in each apparatus that executes the program in the above-described embodiments. All of the functional units described in each embodiment may be realized entirely by software, or a part or the entire thereof may be implemented as hardware providing equivalent functions.

Each function of the above-described embodiments of the present disclosure can be realized by a device executable program described by C, C++, C#, Java (registered trademark), etc. The program of the above-described embodiment can be realized by an HDD, an SSD, and device readable recording media, such as CD-ROM, MO, DVD, flexible disk, EEPROM, EPROM, NOR-FLASH memory, and NAND-FLASH memory, or can be distributed via a network in a format readable by other devices.

The above-described embodiments are illustrative and are not intended to limit the present disclosure. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming output control device comprising:
   circuitry configured to receive instruction information, which is used to output an image being an image forming output target, from a processing execution control apparatus that controls execution of image forming output processing, to compare image information included in a plurality of objects that are unit images constituting the instruction information, and to detect a plurality of duplicate image information objects, in which the image information is duplicate with each other, in the plurality of objects in which identification information for identifying the objects is different from each other,
   the circuitry further configured to generate drawing information to which an image forming apparatus refers to perform image forming output, the circuitry further configured to generate the drawing information according to the instruction information, and the circuitry further configured to store drawing result information being a drawing result of the image information, and to generate the drawing information with the drawing result information of the image information included in the plurality of duplicate image information objects detected.

2. The image forming output control device according to claim 1, wherein:

the circuitry is further configured to rewrite the identification information of the plurality of duplicate image information objects into common identification information when the identification information is different between the plurality of duplicate image information objects.

3. The image forming output control device according to claim 2, wherein:

the circuitry is further configured to search a duplicate image information reference object that is an object referring to the plurality of duplicate image information objects detected, and to rewrite identification information of the duplicate image information reference object to common identification information with the identification information of the plurality of duplicate image information objects to which the duplicate image information reference object refers.

4. The image forming output control device according to claim 1, wherein:

the circuitry is further configured to generate the drawing information according to image information included in one duplicate image information object of the plurality of duplicate image information objects.

5. An image forming output control device comprising:

circuitry configured to generate drawing information to which an image forming apparatus refers to perform image forming output, to receive instruction information, which is used to output an image being an image forming output target, from a processing execution control apparatus that controls execution of image forming output processing, to compare drawing instruction information included in a plurality of objects that cause the circuitry to draw unit images constituting the instruction information, and to detect a plurality of duplicate drawing instruction information objects, in which the drawing instruction information is duplicate with each other, in the plurality of objects in which identification information for identifying the objects is different from each other, the circuitry further configured to generate the drawing information according to the instruction information, to store drawing result information being a drawing result of the drawing instruction information, and to generate the drawing information with the drawing result information of the drawing instruction information included in the plurality of duplicate drawing instruction information objects.

6. The image forming output control device according to claim 5, wherein:

the circuitry is further configured to rewrite the identification information of the plurality of duplicate drawing instruction information objects into common identification information when the identification information is different between the plurality of duplicate drawing instruction information objects.

7. The image forming output control device according to claim 6, wherein:

the circuitry is further configured to search a duplicate drawing instruction information reference object that is an object referring to the plurality of duplicate drawing instruction information objects detected with the duplicate drawing instruction information detector, and to rewrite identification information of the duplicate drawing instruction information reference object to common identification information with the identification information of the plurality of duplicate drawing instruction information objects to which the duplicate drawing instruction information reference object refers.

8. The image forming output control device according to claim 5, wherein:

the circuitry is further configured to generate the drawing information according to image information included in one duplicate drawing instruction information object of the plurality of duplicate drawing instruction information objects.

9. A non-transitory recording medium storing a program to execute a method of controlling image forming output, the method comprising:

receiving instruction information, which is used to output an image being an image forming output target, from a processing execution control apparatus that controls execution of image forming output processing;

comparing image information included in a plurality of objects that are unit images constituting the instruction information;

detecting a plurality of duplicate image information objects, in which the image information is duplicate with each other, in the plurality of objects in which identification information for identifying the objects is different from each other;

generating drawing information to which an image forming apparatus refers to perform image forming output;

generating the drawing information according to the instruction information;

storing drawing result information being a drawing result of the image information; and generating the drawing information with the drawing result information of the image information included in the plurality of duplicate image information objects detected by the detecting.

* * * * *